US007160414B2

(12) United States Patent
Abe et al.

(10) Patent No.: US 7,160,414 B2
(45) Date of Patent: Jan. 9, 2007

(54) METHOD AND APPARATUS OF MANUFACTURING GLUED LAMINATED WOOD

(75) Inventors: Yukio Abe, Aichi (JP); Makoto Isobe, Aichi (JP); Issaku Okamura, Aichi (JP); Hiroshige Oda, Aichi (JP); Akihito Hamaguchi, Aichi (JP); Noriyuki Honda, Aichi (JP)

(73) Assignee: Meinan Machinery Works, Inc., Obu (JP)

( * ) Notice: Subject to any disclaimer, the term of this patent is extended or adjusted under 35 U.S.C. 154(b) by 254 days.

(21) Appl. No.: 10/910,626

(22) Filed: Aug. 4, 2004

(65) Prior Publication Data

US 2006/0027319 A1    Feb. 9, 2006

(51) Int. Cl.
  *B29C 65/00* (2006.01)
(52) U.S. Cl. ............... 156/304.6; 156/182; 156/307.7; 156/304.5; 144/344; 144/348; 144/352
(58) Field of Classification Search ............... 156/182, 156/304.6, 304.5, 307.7, 558, 559; 144/344, 144/345, 346, 347, 348, 352
See application file for complete search history.

(56) References Cited

U.S. PATENT DOCUMENTS

| | | | | |
|---|---|---|---|---|
| 3,963,552 | A * | 6/1976 | Troutner et al. | ............ 156/299 |
| 4,017,248 | A | 4/1977 | Dieffenbacher et al. | |
| 4,608,106 | A | 8/1986 | Lahtinen | ..................... 156/182 |
| 6,280,560 | B1 | 8/2001 | Graf | |
| 6,865,800 | B1 * | 3/2005 | Utecht et al. | ................. 29/711 |

FOREIGN PATENT DOCUMENTS

| | | |
|---|---|---|
| EP | 1 400 327 A1 | 3/2004 |
| JP | 53-018707 | 2/1978 |
| JP | 53-041408 | 4/1978 |
| JP | 53-075313 | 7/1978 |
| JP | 54-011215 | 1/1979 |
| JP | 55-123404 | 9/1980 |

OTHER PUBLICATIONS

J.C. Bohlen; "LVL Lamniated-Veneer Lumber—Development and Economics"; Forest Prod. J. vol. 22, No. 1, 1972 with partial translation.
European Search Report dated Dec. 2, 2003.

* cited by examiner

*Primary Examiner*—Jeff H. Aftergut
*Assistant Examiner*—John L. Goff
(74) *Attorney, Agent, or Firm*—Armstrong, Kratz, Quintos, Hanson & Brooks, LLP

(57) ABSTRACT

A method and apparatus of manufacturing glued laminated wood such as laminated veneer lumber (LVL) are disclosed. The glued laminated wood is made of a number of wood sheets such as veneer sheets which are laminated together by a hot press with a thermosetting adhesive into a continuous length of multiple-layered board of the glued laminated wood wherein wood sheets in each layer of the multiple-layered board are arranged in a staggered relation in the lengthwise direction of the board to wood sheets in an adjacent layer. The hot press has a pair of heating plates arranged substantially in facing relation to each other and an auxiliary heating plate disposed adjacent to one end of each heating plate. The auxiliary heating plate is adapted to press part of wood sheet which extends out beyond the above end of the heating plate.

7 Claims, 39 Drawing Sheets

(a)

(b)

(c)

(d)

(a)

(b)

(c)

(d)

(a)

(b)

(c)

(a)

(b)

(c)

(a)

(b)

(c)

(a)

(b)

(c)

(d)

(a)

(b)

(c)

(d)

(a)

(b)

(c)

(d)

(a)

(b)

(c)

(d)

(a)

(b)

(c)

(d)

(a)

(b)

(c)

(a)

(b)

(c)

(a)

(b)

(c)

(a)

(b)

(a)

(b)

(a)

(b)

(a)

(b)

METHOD AND APPARATUS OF MANUFACTURING GLUED LAMINATED WOOD

BACKGROUND OF THE INVENTION

The present invention relates to a method of manufacturing glued laminated wood made of a number of wood sheets such as veneer sheets which are provided by rotary peeling or otherwise prepared, dried appropriately, clipped into a predetermined length, and laminated together by hot pressing with a thermosetting adhesive in such a way that a continuous length of multiple-layered board of glued laminated wood is made. Wood sheets in each layer of the resulting glued laminated wood board are disposed in a staggered relation to wood sheets in the adjacent layer in the lengthwise direction of the board. The invention also relates to an apparatus for manufacturing such glued laminated wood.

For better understanding of the underlying background of the present invention, firstly reference is made to FIG. 1 which schematically shows a prior art apparatus for manufacturing laminated veneer lumber (LVL), that is a typical glued laminated wood, wherein a number of veneer sheets are laminated together in a staggered manner with the wood grain of each veneer sheet running primarily along the length of the resulting product or LVL board.

The apparatus includes three sets of hot presses X, Y and Z arranged at three different stages spaced at an interval along the direction in which LVL board in process is conveyed as indicated by arrow at the right-hand side on the drawing. Each of the hot presses X, Y and Z has a pair of movable upper and lower heating plates X1, Y1 and Z1 disposed one above the other, respectively. For the sake of description of the apparatus, these three sets of hot presses X, Y and Z will be referred to as the first, second and third hot presses, respectively. Though not shown specifically in the drawing, there are provided three sets of veneer feeders associated with the respective hot presses X, Y and Z, and each set includes upper and lower movable veneer sheet feeders as indicated by arrows which depict the feeding directions. In the drawing, reference symbols A, B and C designate wood veneer sheets each having substantially the same length, width and thickness and disposed in the same orientation with the wood grain thereof extending substantially parallel to each other, i.e. extending along the lengthwise direction of the LVL board in process. It is noted that, for the sake of convenience in illustration, each veneer sheet is illustrated with a thickness which is shown exaggeratedly large relative to its length and also that a conveyer for moving a board in process is omitted from the illustration.

In manufacturing LVL board with the apparatus of FIG. 1, firstly a pair of veneer sheets A depicted by shading is prepared with one surface of either one of such veneer sheets A coated with thermosetting adhesive. These veneer sheets A are fed by the first feeders for the first hot press X and combined together with the adhesive-coated surface interposed between the mating surfaces of the two veneer sheets A and with the ends thereof in an offset or staggered relation as shown in the drawing in such orientation that their wood grain extends generally along the length of LVL board to be produced. These two veneer sheets A thus placed one on the other are conveyed to the first pressing station between the first heating plates X1, where the veneer sheets A are glued together under heat and pressure by the hot press X. After the first hot pressing operation is over and the heating plates X1 are retracted, the laminated veneer sheets A are conveyed toward the second pressing station at the second hot press Y.

On the way to the second pressing station, i.e. at an appropriate position between the first and second pressing stations, another pair of veneer sheets B, indicated by shading, each having on one surface thereof adjacent to the laminated veneer sheets A coated with thermosetting adhesive is fed by the second veneer sheet feeders and laid on the opposite outer surfaces of the previously laminated veneer sheets A in a staggered relation to the veneer sheets A as shown in the drawing. The veneer sheets B thus laid onto the veneer sheets A are conveyed therewith to the second pressing station, where the veneer sheets B are pressed by the second hot press Y to be bonded to the laminated veneer sheets A.

After pressing by the second hot press Y is over, the laminated veneer sheets A and B are conveyed toward third hot press Z at the third station. At an appropriate position between the second and third pressing stations, still another pair of veneer sheets C, indicated by shading, having on the inner surfaces thereof coated with adhesive is fed by the third veneer feeders and laid on the opposite outer surfaces of the veneer sheets B in a staggered arrangement. The veneer sheets C thus placed on the laminated veneer sheets A and B are conveyed to the third pressing station, where they are similarly pressed by the third hot press Z. Thus, an assembly of laminated veneer sheets A, B and C is formed.

Steps of operation including the above veneer sheet feeding, laying, hot pressing and conveying are performed successively at the respective positions and stations, whereby an LVL board with six plies as counted through its thickness is formed. As shown in FIG. 1, any two adjacent veneer sheets A, B or C in each layer are disposed with the ends thereof abutting closely each other to form end joints, and the veneer sheets A, B and C are laid such that the end joints are distributed in a regularly staggered arrangement in the resulting LVL board.

For successful gluing of veneer sheets with the desired bonding strength, heat and pressure should be applied as uniformly as possible to the entire surface of each veneer sheet to be bonded. In bonding a pair of veneer sheets A, B or C by hot pressing according to the method as illustrated in FIG. 1, however, part of the surfaces of the paired veneer sheets fails to receive direct pressing action by the heating plates of the hot press. That is, the areas of veneer sheets A, B and C adjacent to their upstream end portions as viewed in the conveying direction, which are indicated by R, fail to be pressed directly by the heating plates of the hot press, although some heat will be conducted to such area of veneer sheets. As a result, the upstream end portions of veneer sheets will not be bonded with the desired strength, thus affecting the quality of the resulting LVL product.

If veneer sheets are laid in such a staggered array that the area R is narrowed or reduced with an attempt to obviate the above drawback, the end joints in any two adjacent layers of the LVL board will be disposed closer to each other, thereby rendering the board weaker against bending.

Therefore, it is an object of the present invention to provide a method and apparatus of manufacturing glued laminated wood such as LVL which can solve the above-described problem.

SUMMARY OF THE INVENTION

According to the present invention, there is provided an auxiliary heating plate adjacent to one end of a heating plate of a hot press. The use of the auxiliary heating plate of the present invention makes possible pressing the entire surface area of a wood sheet in manufacturing glued laminated wood such as laminated veneer lumber (LVL) using a number of wood sheets such as veneer sheets.

Features and advantages of the present invention will become more apparent to those skilled in the art from the following description of a preferred embodiment according to the invention, which description is made with reference to the accompanying drawings, wherein:

DESCRIPTION OF THE EMBODIMENTS

The following will describe a preferred embodiment of apparatus of manufacturing laminated veneer lumber (LVL) as the glued laminated wood according to the present invention while having reference to FIGS. 2 through 11.

It is noted that all veneer sheets for use in the embodiment have been dried appropriately and have substantially the same dimensions, i.e. a thickness of about 4 mm, a length of about 1,000 mm as measured along the general wood grain orientation of veneer sheet and a width of about 1,000 mm as measured across the sheet length.

Figure 1:
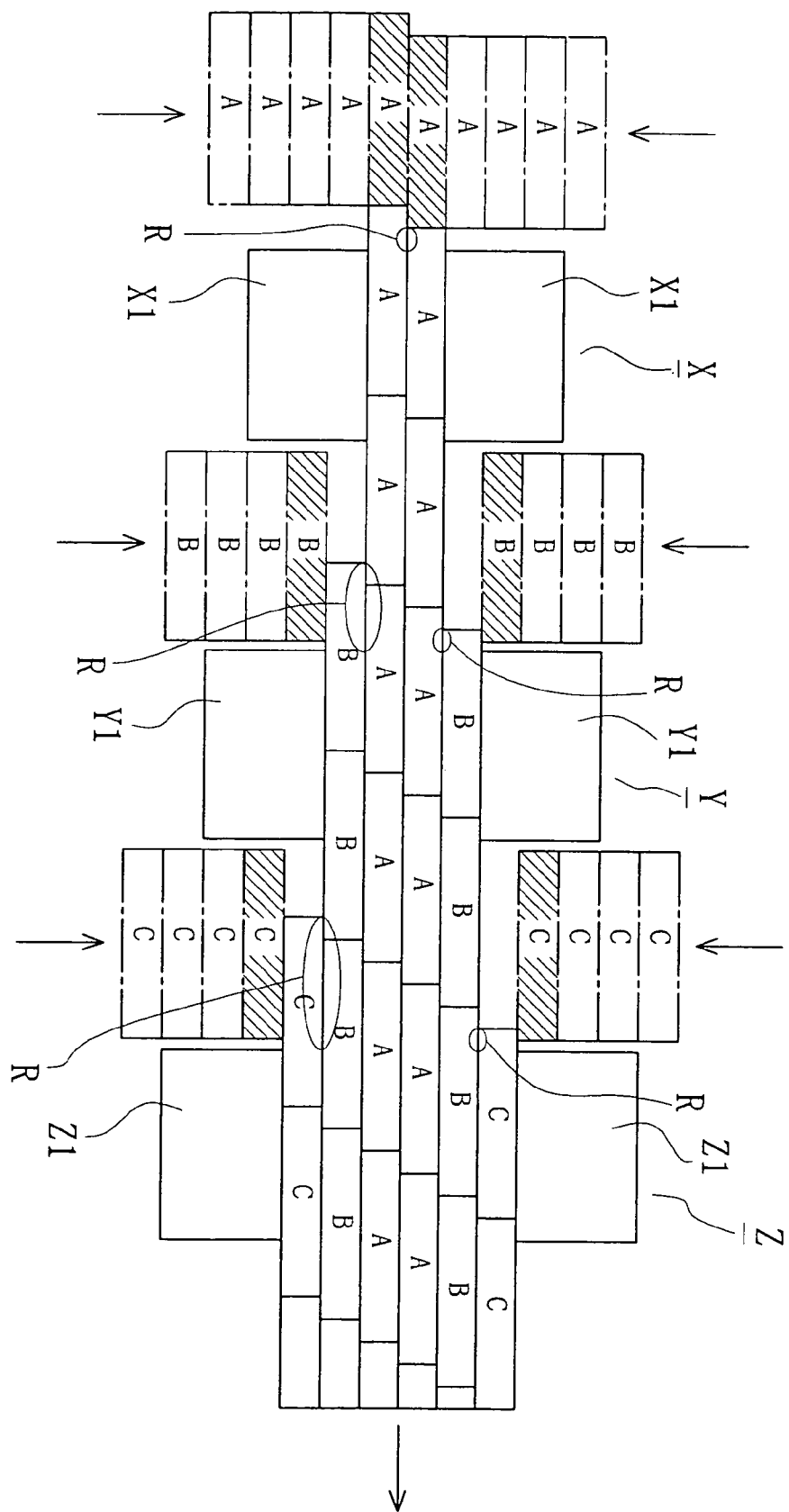
FIG. 1 is a schematic illustrative view showing a prior art apparatus for manufacturing LVL as an example of glued laminated wood.
Figure 2:
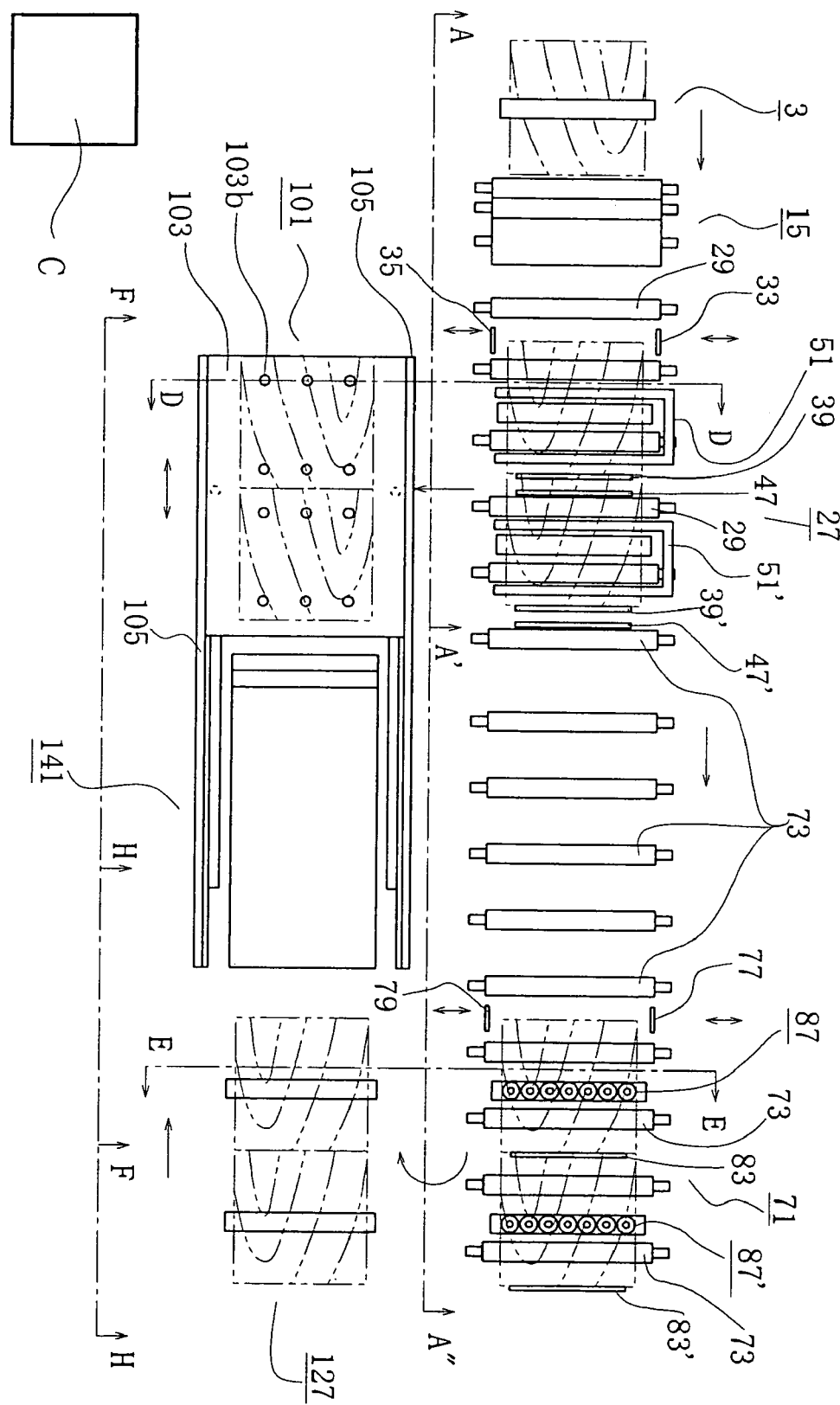
FIG. 2 is a schematic plan view showing an overall view of a preferred embodiment of apparatus of manufacturing LVL according to the present invention.

Referring firstly to FIG. 2, the apparatus has several working stations including veneer sheet feeding station 3, glue spreading station 15, first veneer sheet supply station 27, second veneer sheet supply station 71, veneer sheet loading station 101, base material positioning station 127 (FIG. 10), and hot pressing station 141. As will be described in detail in later part hereof, veneer sheets are moved or conveyed generally rightward as seen in FIG. 2 from the veneer sheet feeding station 3 along conveyer rolls 29, 73, as indicated by arrows at the top of the drawing. The apparatus further includes a control unit C which receives detection signals from various sensors and rotary encoders and generates command signals for controlling the operation of respective actuators such as cylinders, drives such as motors and other devices of the apparatus, as will be described in detail later.

Figure 3:
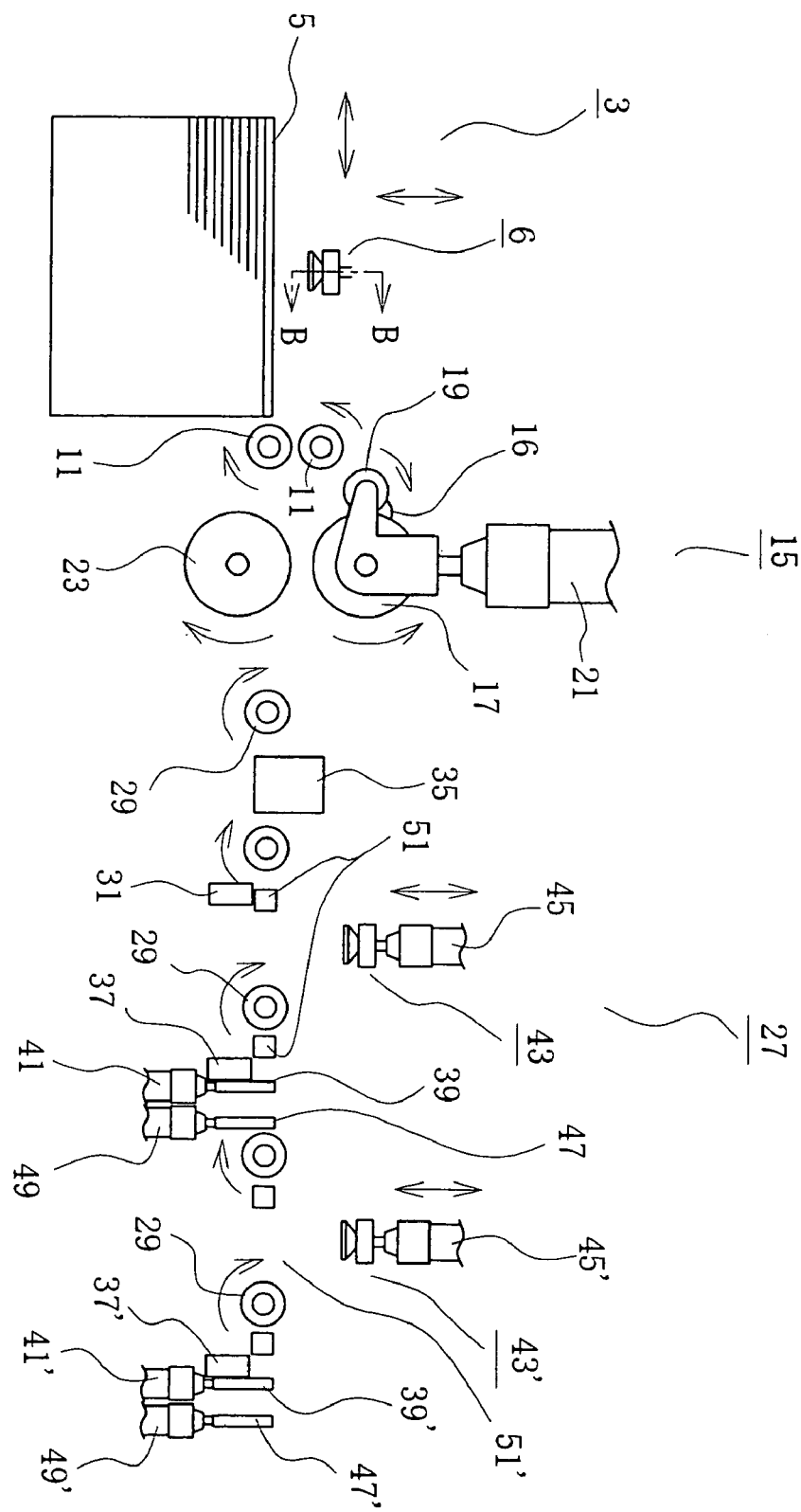
FIG. 3 is a schematic side view as seen from A–A' of FIG. 2.

In the veneer sheet feeding station 3, there is provided a pile of veneer sheets 5 each of which is disposed in the pile with the wood grain thereof extending generally in lateral direction as viewed in the drawings of FIGS. 2 and 3, as clearly seen from the wood grain pattern of the uppermost veneer sheet in the pile shown in FIG. 2. Though not shown in the drawings, the pile of veneer sheets 5 is supported by any suitable elevator which is operable to set the veneer sheet pile in such a way that the uppermost veneer sheet always maintains substantially the same height. For this purpose, there is provided a suitable sensor (not shown) for detecting the height of the veneer sheet pile.

Figure 4:
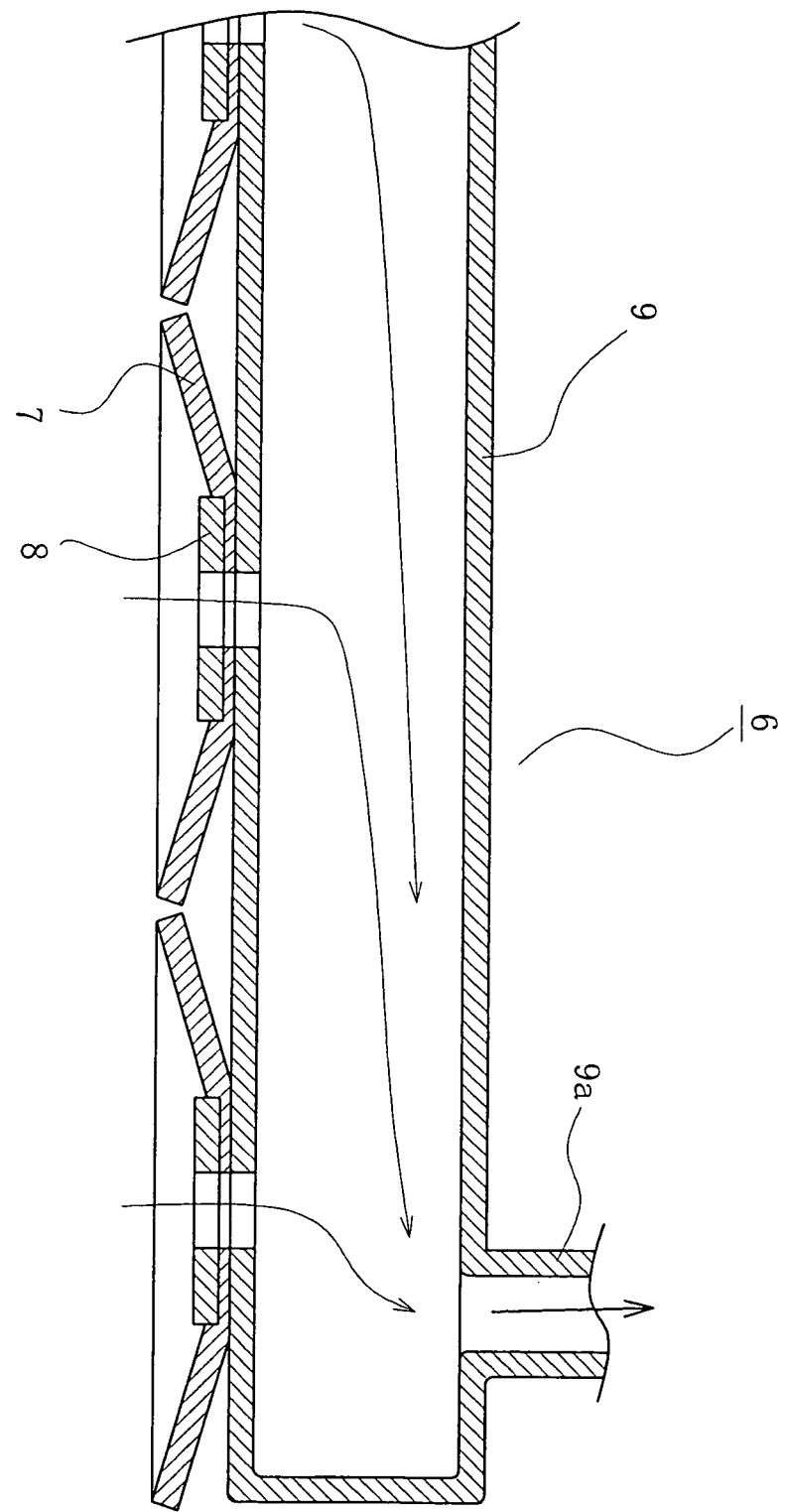
FIG. 4 is a partially cross-sectional view of a suction head as seen from B—B of FIG. 3.

Immediately above the pile of veneer sheets 5 is provided a suction head 6 for picking one veneer sheet 5 at a time from the pile. As shown in FIG. 4, the suction head 6 includes an elongated hollow box 9 disposed extending across the width of veneer sheets 5 and a plurality of suction cups 7 arranged along the extension of the box 9 and each fixed to the box 9 by a retainer 8. As shown in FIG. 4, a hole is formed through each suction cup 7, its associated retainer 8 and the box 9 so that the atmosphere and the box interior communicate through such hole. The suction cups 7 are made of elastic material such as synthetic rubber or sponge having a good contact with the surface of wood veneer sheet. The interior of the suction box 9 is connected through a port 9*a* to any suitable source of vacuum such as blower (not shown) by way of a controllably operable shutter (not shown). When the shutter is open, air flows as indicated by arrows in FIG. 4 and suction force is created, accordingly. As indicated by two double-headed arrows in FIG. 3, the suction head 6 is reciprocally movable by any suitable means such as cylinder (not shown) in both vertical and horizontal directions.

As shown in FIG. 3, immediately downstream of the veneer sheet pile as seen in the conveying direction of veneer sheets is located a pair of rolls 11 rotatable in arrow directions for feeding a veneer sheet 5 picked up by the suction head 6 toward the subsequent glue spreading station 15.

The glue spreading station 15 has a movable roll assembly including a pair of glue roll 17 and doctor roll 19 rotatable in arrow directions as shown in FIG. 3 for applying a predetermined volume of thermosetting adhesive 16 to the upper surface of veneer sheet 5. In the illustrated embodiment, the doctor roll 19 is so adjusted that about 210 grams of adhesive is applied to an area of about 1 m$^2$ of veneer sheet surface. Below the paired glue roll 17 and the doctor roll 19 is provided a stationary roll 23 rotatable in arrow direction. Reference numeral 21 designates a cylinder for moving the roll assembly 17, 19 toward and away from the stationary roll 23. Specifically, the cylinder 21 is operable to move the roll assembly 17, 19 between the lowered or glue spreading position where the spaced distance between the peripheral surfaces of the glue roll 17 and the stationary roll 23 is slightly smaller than the thickness of veneer sheet and the elevated or standby position where the roll assembly 17, 19 are retracted so that the peripheral surface of the glue roll 17 is spaced sufficiently away from the stationary roll 23.

Downstream of the glue spreading station 15 is arranged a number of rotatable conveying rolls including a first group of rolls 29 and a second group of rolls 73 arranged in juxtaposed relation to each other for conveying veneer sheets 5 successively along a conveying pass defined by such rolls 29, 73.

Though detailed description will be provided later, a veneer sheet having its upper surface coated with adhesive and moved in arrow direction by the first rolls 29 is stopped at a predetermined position along the conveying pass, centered there with respect to the conveying pass and then moved laterally across the conveying pass at the first veneer sheet supply station 27. For this purpose, the first veneer sheet supply station 27 has the following arrangement.

A sensor 31 is provided (FIG. 3) in the veneer sheet conveying pass for detecting the arrival of the leading end of a veneer sheet being moved by the rolls 29 at the position defined by the sensor 31. At a distance of about 500 mm upstream of the sensor 31 is located a pair of centering plates 33, 35 movable reciprocally by air cylinders (not shown) in the directions as indicated by double-headed arrows in FIG. 2. More specifically, these centering plates 33, 35 are movable by the air cylinders between the retracted position where the plates 33, 35 are spaced away from each other at a distance greater than 1,000 mm, i.e. the width of veneer sheet, so that veneer sheet being conveyed by the rolls 29 is clear of the plates 33, 35, and the centering position where the plates 33, 35 are moved toward each other at a spaced interval of about 1,000 mm so that a veneer sheet then placed between the plates 33, 35 is straightened and centered with respect to the veneer sheet conveying path.

As shown in FIG. 3, a sensor 37 is located downstream of the sensor 31 for detecting the arrival of veneer sheet at the position defined by the sensor 31. Immediately downstream of this sensor 37 is disposed a first stop plate 39 which is movable by a cylinder 41 between its operative position where the stop plate 39 is extended to stop the movement of veneer sheet by contact with the leading end of the veneer sheet being conveyed by the rolls 29 and its inoperative position where the stop plate 39 is retracted as shown in FIG. 3. A similar second stop plate 47 is located spaced about 120 mm downstream of the first stop plate 39 and moved by a cylinder 49 between the extended operative and retracted inoperative positions.

A suction head 43, which is similar to the aforementioned suction head 6, is provided at a position upstream of the first stop plate 39 and above the veneer sheet conveying path. The suction head 43 is vertically movable by a cylinder 45, as indicated by double-headed arrow in FIG. 2.

Figure 5:
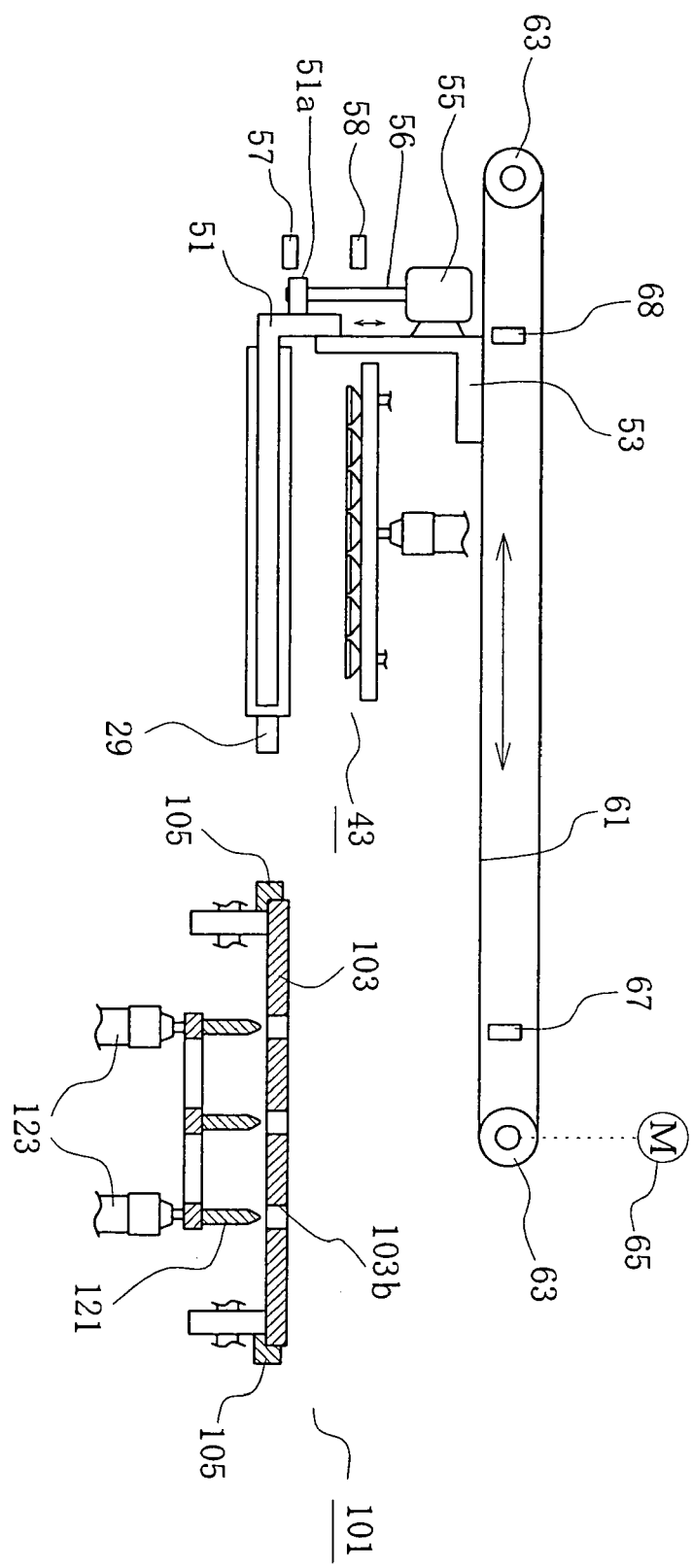
FIG. 5 is a schematic end view of the apparatus as seen from D—D of FIG. 2.

Upstream of the stop plates 39, 47 is arranged a first device for traversing a veneer sheet or moving a veneer sheet across the conveying path toward the veneer sheet loading station 101. As shown in FIGS. 2, 3 and 5, the first veneer sheet traversing device includes a lifting bar 51 having two long bar portions extending across the veneer sheet conveying path and a short bar portion connecting one ends of the two long bars, thereby presenting a channel shape as seen from the top as shown in FIG. 2. As shown in FIG. 5, the lifting bar 51 has fixed thereto at the closed end of its channel shape a block 51a which has formed vertically therethrough a threaded hole. An electric motor 55 fixedly mounted on a support block 53 has a threaded shaft 56 driven by the motor 55 and engaged with the threaded hole in the block 51a, so that rotation of the shaft 56 by the motor 55 causes the lifting bar 51 to move up and down relative to the support block 53. Reference numerals 57, 58 designate reflection type sensors for determining the lowermost and uppermost positions of the lifting bar 51, respectively, by detecting the block 51a movable with the lifting bar 51. As shown in FIG. 5, the support block 53 is fixed at its top to a belt 61 trained between a pair of pulley 63 one of which is positively driven by a motor 65, so that the block 53 and its associated parts including the lifting bar 51 are movable reciprocally as indicated by double-headed arrow. Reference numerals 67, 68 designate reflection type sensors for detecting the respective ends of the movable range of the support block 53 and hence of the lifting bar 51.

Downstream of and spaced at about 1,000 mm from the first veneer sheet traversing device is provided a second veneer sheet traversing device which is substantially identical in structure and arrangement to the first traversing device described above. Like component parts or elements of the second traversing device are designated by like numerals with a prime, e.g. 43' for suction head, 51' for lifting bar, 39' and 47' for first and second stop plates, 53' for support block and 65' for motor, etc.

A veneer sheet having its upper surface coated with adhesive and moved forward by the second conveying rolls 73 is stopped at a predetermined position along the conveying pass, centered and then moved laterally across the conveying pass at the second veneer sheet supply station 71. For this purpose, the second veneer sheet supply station 71 has the following arrangement.

Figure 6:
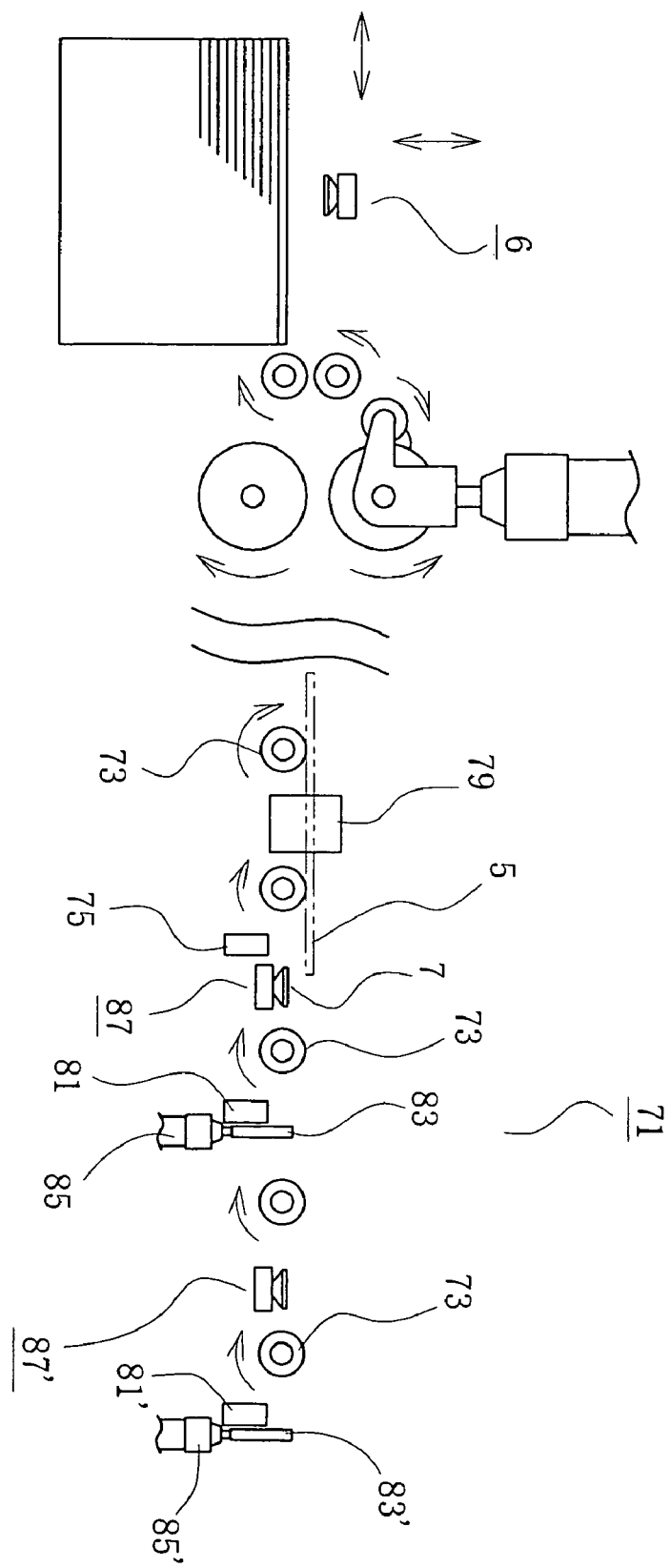
FIG. 6 is a schematic partial side view of the apparatus as seen from A–A" of FIG. 2.
Figure 7:
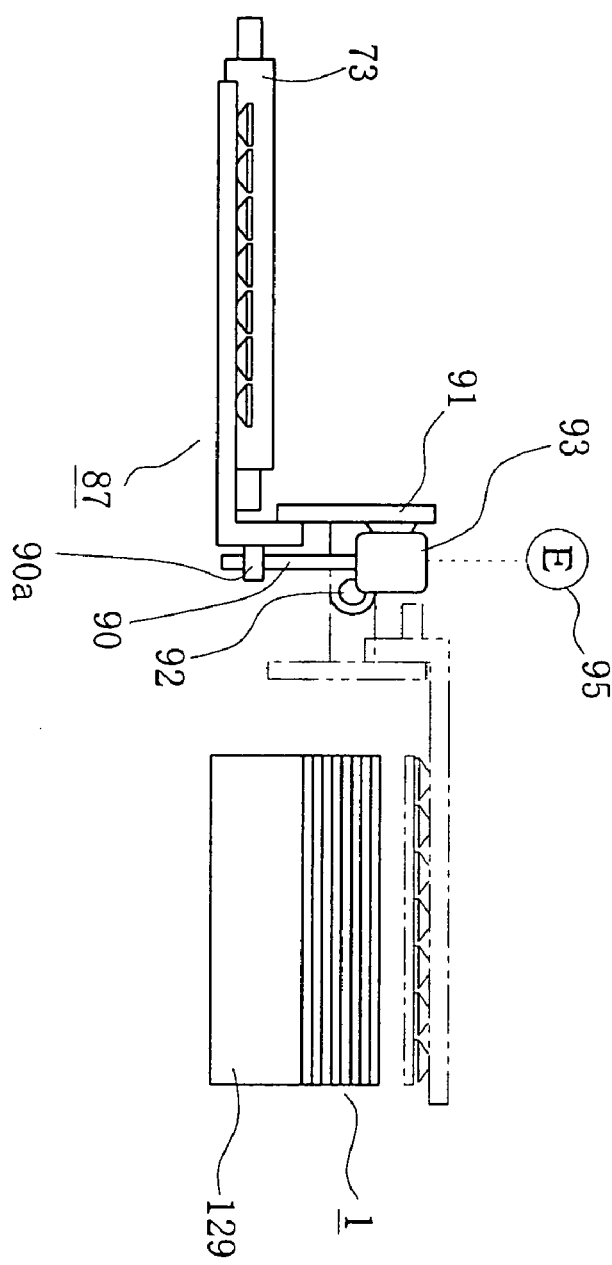
FIG. 7 is a schematic end view of the apparatus as seen from E—E of FIG. 2.

Referring to FIGS. 2, 6 and 7, the second veneer sheet supply station 71 includes a sensor 75 (FIG. 6) for detecting the arrival of the leading end of a veneer sheet being conveyed by the second rolls 73 at the position defined by the sensor 75 and a pair of second centering plates 77, 79 provided at a distance of about 500 mm upstream of the sensor 75. These centering plates 77, 79 are identical in structure and operation to the aforementioned first centering plates 33, 35 described with reference to the first veneer sheet supply station. Another sensor 81 is located slightly downstream of the sensor 75 as shown in FIG. 6 for detecting the arrival of the leading end of a veneer sheet at the position which is defined by the sensor 81. Immediately downstream of this sensor 81 is disposed a stop plate 83 which is movable by a cylinder 85 in the same manner as the aforementioned stop plates 39, 47.

About 500 mm upstream of the stop plate 83 is disposed a first suction head 87 similar in structure to the suction head 6 of FIG. 4 and having a plurality of suction cups 7. As shown in FIG. 6, the suction head 87 is located below the veneer sheet conveying path with the suction cups 7 thereof facing upward. As shown in FIG. 7, the suction head 87 has fixed thereto a block 90a which has formed therethrough a threaded hole. An electric servo motor 93 fixedly mounted on a support block 91 has a threaded shaft 90 driven by the motor 93 and engaged with the threaded hole in the block 90a, so that rotation of the shaft 90 by the motor 93 causes the suction head 87 to move up and down relative to the support block 91. In FIG. 7, reference numeral 92 designates a shaft on which the motor support 91 is pivotally supported so that the motor support 91 and hence the suction head 87 is swung by a motor (not shown) for about 180 degrees between the standby position shown by solid line and the inverted position indicated by dash-dot line. Additionally, a rotary encoder 95 is connected to the servo motor 93 which counts the rotation angle of the motor 93 thereby to determine the current position of the suction head 87 with respect to a reference position which will be described in later part hereof, thus making it possible to controllably position the suction head 87.

About 1,000 mm downstream of the first suction head 87 is provided a second suction head 87' and its associated parts and devices which are identical in structure and operation to the corresponding counterparts of the suction head 87 described with reference to FIG. 7. Such devices and parts for the second suction head 87' will be referred to by like reference numerals with a prime, such as threaded shaft 90', servo motor 93', rotary encoder 95', etc.

The veneer sheet loading station 101 will be now described while having reference to FIGS. 2, 5, 8 and 9. The device at the station 101 includes a veneer sheet carrier plate 103 which carries thereon two veneer sheets disposed as shown by dash-dot line in FIG. 2 and is reciprocally movable in arrow directions for transferring such veneer sheets toward the hot pressing station 141. A pair of guide members 105 is disposed on opposite sides of the veneer sheet carrier plate 103 at a spaced interval of at about 1,300 mm for guiding the movement of the sheet carrier plate 103.

Figure 8:
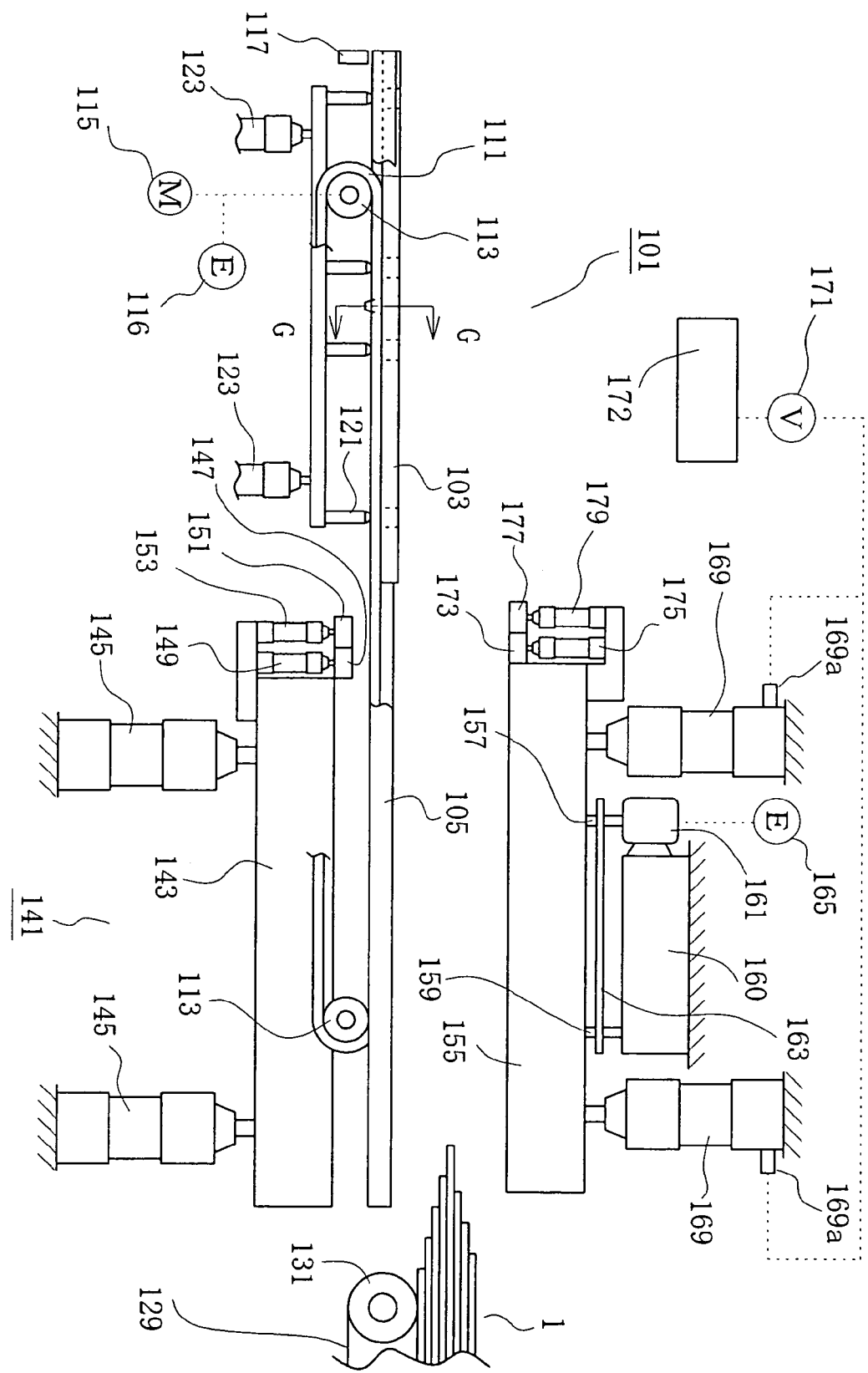
FIG. 8 is a schematic side view of the apparatus as seen from F—F of FIG. 2.
Figure 9:
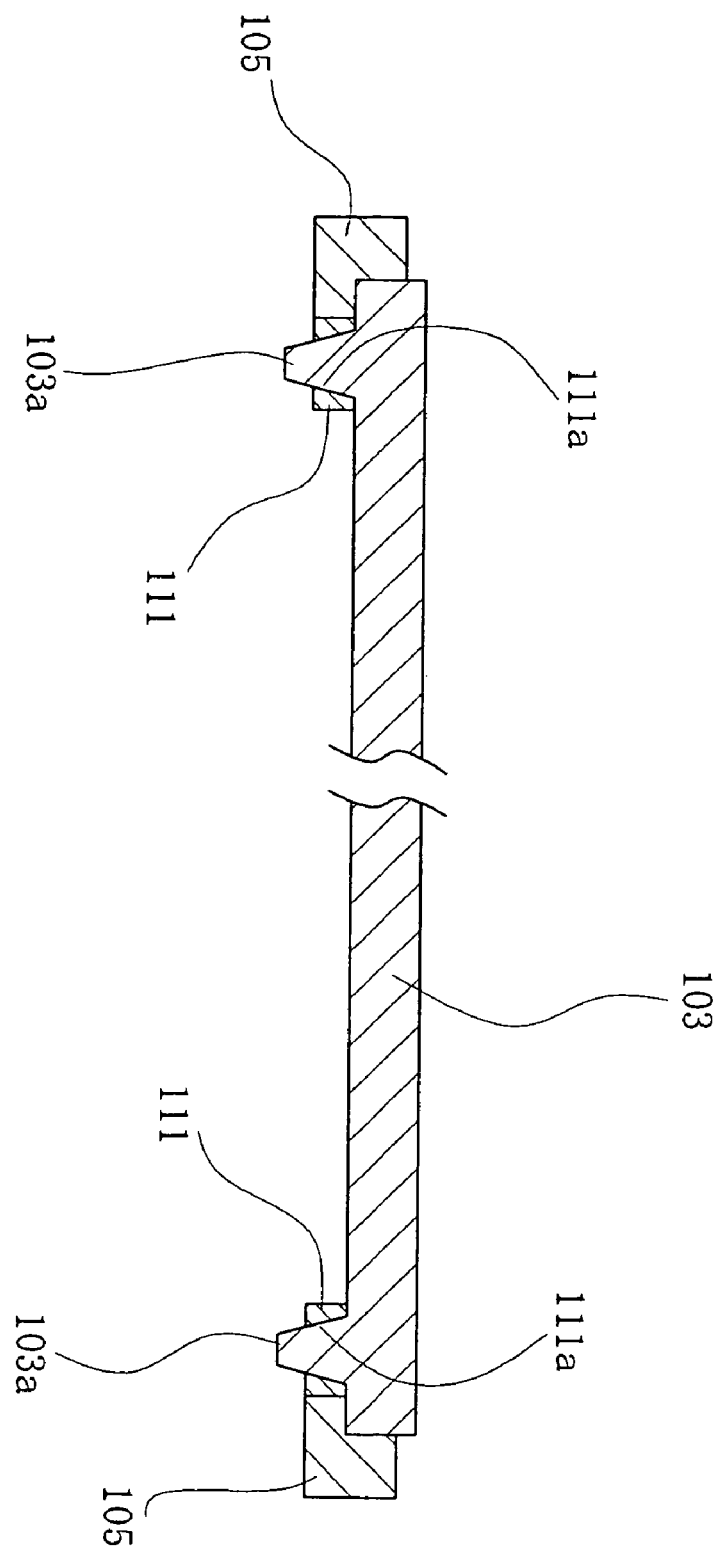
FIG. 9 is a schematic view as seen from G—G of FIG. 8.

The veneer sheet carrier plate 103 is driven to move by a pair of belts 111 trained between a pair of pulleys 113 one of which is driven reversibly by a servo motor 115 as shown in FIG. 8. The servo motor 115 is connected to a rotary encoder 116 which counts the rotation angle of the servo motor 115 thereby to determine the current position of the sheet carrier plate 103 with respect to a predetermined reference position of the apparatus and make possible controllably positioning the carrier plate 103. As shown in FIG. 9, each belt 111 is formed with upwardly divergent holes 111a which are engageable with complementary conical projections 103a formed on the veneer sheet carrier plate 103. With the projections 103a of the veneer sheet carrier plate 103 received in the holes 111a of the belts 111, the carrier plate 103 is engaged with and held by the belts 111 so that the plate 103 is moved along the guide members 105 the by the belts 111. The veneer sheet carrier plate 103 can be disengaged from the belts 111 by moving upwardly the inserting sheet 103. The carrier plate 103 should desirably be made material of high thermally conduction such as aluminum or copper. Reference numeral 117 in FIG. 8 designate a sensor for detecting the arrival of the veneer sheet carrier plate 103 at start position where veneer sheets transferred by the veneer sheet traversing devices are placed onto the carrier plate 103.

As shown in FIGS. 2 and 5, the veneer sheet carrier plate 103 has formed through its thickness a plurality of holes 103b. Specifically, the carrier plate 103 has as many as 12 holes 103b which are arranged in such a way that six holes 103 are covered by each of two veneer sheets placed on the carrier plate 103, as most clearly seen in FIG. 2. With the veneer sheet carrier plate 103 located at the aforementioned start position (FIG. 2), there are provided immediately below the carrier plate 103 upstanding rods 121 located in alignment with the respective holes 103b in the carrier plate 103 so that rods 12 which are movable by cylinders 123 are insertable though the holes 103b.

Figure 10:
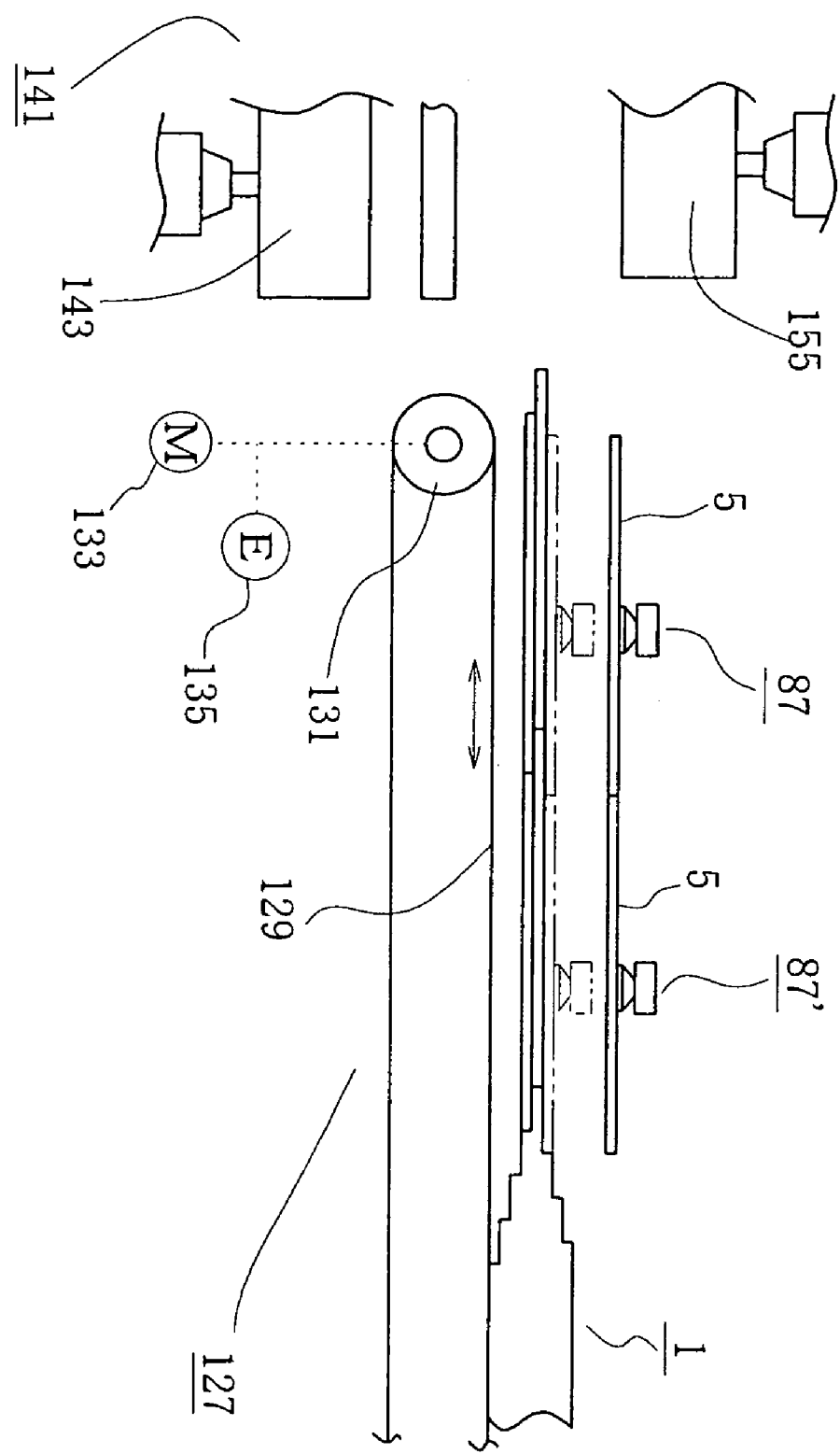
FIG. 10 is a schematic partial side view of the apparatus as seen from H—H of FIG. 2.

Referring to FIG. 10, the base material positioning device at the station 127 will be described. Base material 1 (FIG. 10) which is to be positioned by the device will be described in detail in later part hereof with reference to FIG. 11. The positioning device includes a chain conveyer 129 trained between pulleys (only one pulley 131 being shown) and having a substantially flat conveying upper leg. The pulley 131 is connected to a servo motor 133 for driving the chain conveyer 129 reversibly as indicated by double-head arrow. A rotary encoder 135 is connected to the servo motor 133 for counting the rotation angle of the servo motor 113 thereby to determine the current position of the chain conveyer 129 which carries thereon a base material 1 from one end of which a continuous length of LVL board is to be made. Thus, it is made possible to controllably position the base material with respect to a heating plate of hot press which will be described below.

The hot pressing station 141 will be now described with reference to FIG. 8. A hot press is provided in this working station 141, which includes a lower heating plate 143 having a length of about 2,120 mm as measured laterally on the drawing of FIG. 8 and a width of about 1,100 mm. This lower heating plate 143 is heated constantly by steam to a temperature of 170 to 190° C. and movable vertically by hydraulic cylinders 145 between its retracted inoperative position as shown in FIG. 8 and its elevated operative position.

On the left hand side of the lower heating plate 143 as seen in FIG. 8, or on the side adjacent to the veneer sheet loading station 101, are provided a pair of first and second auxiliary lower heating plates 147, 151 each having a length of about 120 mm and the same width as the lower heating plate 143, or about 1,100 mm. Both auxiliary heating plates 147, 151 are heated by steam to the same temperature as the lower heating plates 143 and movable vertically by hydraulic cylinders 149, 153 between their retracted inoperative positions as shown in FIG. 8 and the elevated operative positions, respectively. It is noted that each auxiliary heating plate is moved by two hydraulic cylinders disposed across the width of the heating plate and, therefore, only one cylinder is shown for each heating plate in FIG. 8. The first auxiliary heating plate 147 in its retracted position (FIG. 8) has its top surface located at a position which is higher than the top surface of the lower heating plate 143 by a distance corresponding to the thickness of the veneer sheet carrier plate 103. The cylinders 149 elevate the first auxiliary heating plate 147 for a distance of about 4 mm, i.e. the distance corresponding to the thickness of veneer sheet. On the other hand, the second auxiliary lower heating plate 151 in its retracted position has its top surface located at the position as the first auxiliary heating plate 147, but it is elevated by the cylinders 153 for a distance of about 8 mm, i.e. the distance corresponding to twice the thickness of veneer sheet.

The hot press further includes an upper heating plate 155 located above and in facing relation to the lower heating plates 143. The upper heating plate 155 has the same dimensions and heated to the same temperature as the lower heating plate 143. It is noted that the lower and upper heating plates 143, 155 are disposed in an offset relation to each other. Specifically, the upper heating plate 155 is positioned about 70 mm leftward, or toward the station 101, with respect to the lower plate 143, as most clearly seen, e.g. in FIGS. 20(b) and 20(c) which show the heating plates 143, 155 in their closed state.

The upper heating plate 155 has formed in the top surface thereof a pair of threaded holes (not shown) which receive therein screws 157, 159, respectively. The screw 157 is operatively connected to a servo motor 161 mounted to a support block 160 which is in turn fixed to a frame of the apparatus, while the other screw 159 is freely rotatably mounted to the block 160. The screws 157, 159 have sprockets (not shown) which are connected by an endless chain 163 so that the rotation of the screw 157 driven by the servo motor 161 is transmitted to the screw 159 and both screws 157, 159 are rotated in a synchronous manner. The servo motor 161 has a rotary encoder 165 which counts the rotation angle of the servo motor 161 thereby to determine the current position of the upper heating plate 155 with respect to the reference position mentioned previously with reference to the suction head 87 and make it possible to controllably position the upper heating plate.

The upper heating plate 155 has a pair of hydraulic cylinders 169 whose rods are connected to the heating plate 155 for holding the heating plate 155 at the desired position as will be described in detail hereinafter. Each cylinder 169 has a fluid port 169*a* which is connected to an oil reservoir 172 through an electromagnetic valve 171. The valve 171 is normally opened to allow the upper heating plate 155 to move up or down, but it is kept closed while the heating plate 155 is to be held at the desired position.

First and second auxiliary upper heating plates 173, 177 are provided on the left hand side of the upper heating plate 155 as seen in FIG. 8, or the side adjacent to the station 101. These auxiliary heating plates 173, 177 are similar to the auxiliary heating plates 147, 151 for the lower heating plates 143 in shape, dimensions and manner of heating. The upper auxiliary heating plates 173, 177 are moved vertically by cylinders 175, 179, respectively, (only one cylinder being shown for each auxiliary heating plate) between the retracted inoperative position as shown in FIG. 8 and the lowered operative position. The first and second auxiliary upper heating plate 173, 177 in their retracted position have their bottom surfaces located substantially flush with the bottom surface of the upper heating plate 155. The first auxiliary heating plate 173 is lowered by the cylinders 175 for a distance of about 4 mm, i.e. the distance corresponding to the thickness of veneer sheet, while the cylinders 179 lowers the second auxiliary heating plate 177 for a distance of about 8 mm, i.e. the distance corresponding to twice the thickness of veneer sheet.

As shown in FIG. 2, the above upper and lower heating plates 155, 143 and their associated auxiliary heating plates 173, 177 and 147, 151 are all disposed within a range between the paired guide members 105.

In the above-described apparatus, the sensors and the rotary encoders are operable to generate detection signal or rotation angle count signal to the control unit C which, responding such signal, generates various command signals for controlling the operation of various drives and actuators such as motors, cylinders and other devices of the apparatus (including those motors and cylinders which are not shown in any drawing).

As mentioned earlier, the rotary encoders 95, 95' and 165 connected to the motors 93, 93' and 161 are operable to determine the current position of the suction heads 87, 87' and the upper heating plate 155, respectively, with respect to a predetermined reference position. In the illustrated embodiment, such reference position is established at any suitable position in the base material 1 placed on the chain conveyer 129, e.g. at mid-position of the base material 1 as measured across its thickness, i.e. a position between veneer sheets of the fourth and fifth layers of the base material 1, and data of such reference position is stored in a suitable memory of the control unit C.

Figure 11:
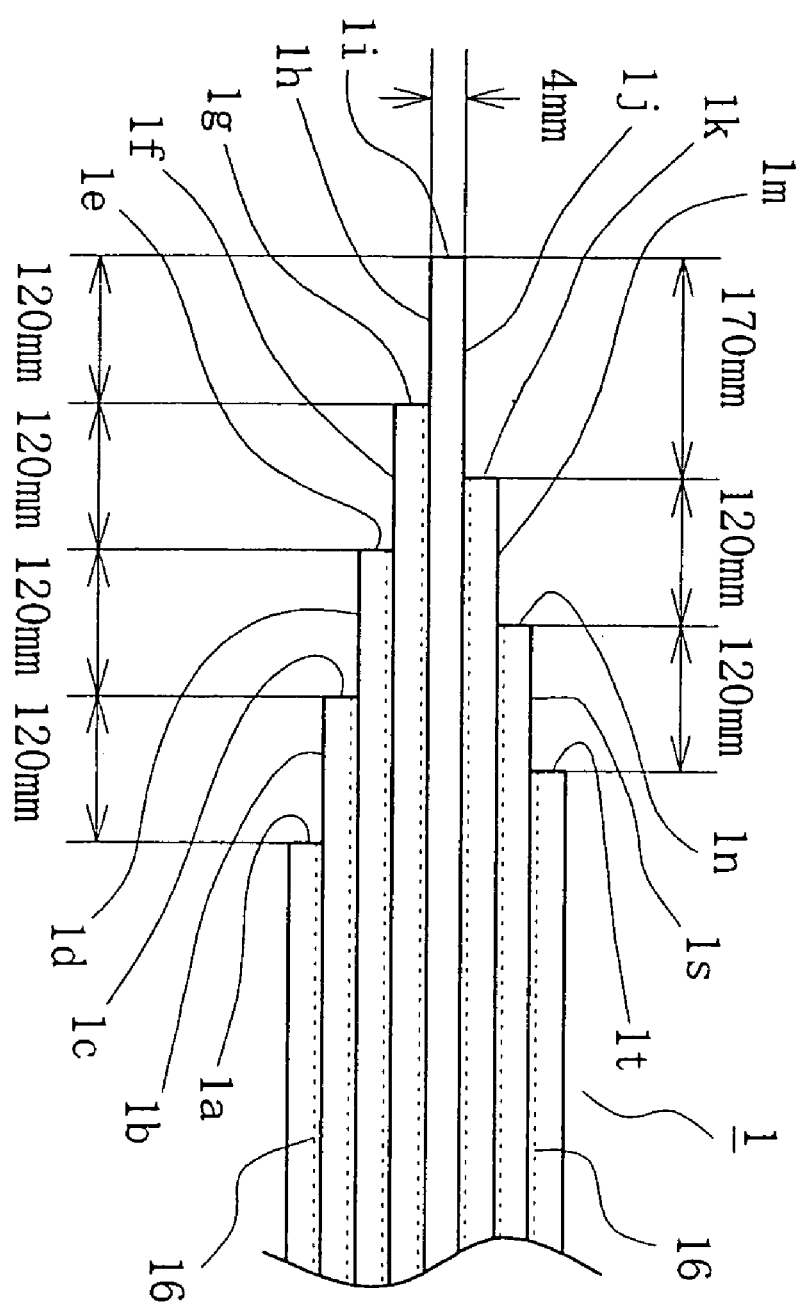
FIG. 11 is schematic illustrative partial view showing an initial base material made of veneer sheets, from one end of which a continuous length of LVL board is to be made.

In manufacturing laminated veneer lumber (LVL) using the above-described apparatus, an initial base material 1 in the form of a laminated veneer assembly as shown in FIG. 11, from one end of which a continuous length of LVL board is to be made, is prepared in advance. The initial base material 1 is made of a plurality of veneer sheets, each having a thickness of about 4 mm, which are laid and glued together by adhesive 16. All veneer sheets are disposed in the base material 1 with the wood grain thereof extending generally in lateral direction as viewed on the drawing. As clearly seen from FIG. 11, the initial base material 1 is of eight-layer configuration, having eight layers of veneer sheets including the first sheet through the eighth sheet as counted from the lowermost veneer sheet. The veneer sheets in the base material 1 are laid in such a regular staggered arrangement that the ends of any two adjacent layers of veneer sheets are spaced at a length of about 120 mm, except 170 mm between the ends of the fifth and sixth veneer sheets, and also that the end portion of the base material 1 is shaped in the form of flights of steps, namely one flight of steps formed by the fifth through eighth veneer sheets and facing upward and the other flight of steps formed by the first through fifth veneer sheet and facing downward.

Specifically, the initial base material 1 has first end face 1*a*, second end face 1*c*, third end face 1*e*, fourth end face 1*g*, fifth end face 1*i*, sixth end face 1*k*, seventh end face in and eighth end face it each having a dimension of about 4 mm as measured vertically as seen in the drawing that corresponds to the veneer sheet thickness, and has further first face 1*b*, second face 1*d*, third face 1*f*, fourth face 1*h*, sixth face 1*m* and seventh face 1*s* each having a dimension of about 120 mm as measured along the general grain orientation of the veneer sheets, and fifth face 1*j* having a dimension of about 170 mm as measured in the same direction.

Having reference to FIGS. 12 through 37, the following will describe a method of manufacturing laminated veneer lumber (LVL) as the glued laminated wood by using the above-described apparatus.

The initial base material 1 is placed on the chain conveyer 129 in advance. The paired feeding rolls 11, the paired glue roll 17 and the doctor roll 19 and the stationary roll 23 are started and kept rotated in the respective arrow directions. Manufacture of an LVL board using the initial base material 1 in the apparatus begins with supplying of a veneer sheet which need not be applied with adhesive and is to be arranged in the fifth layer an LVL board to be made. For this purpose, the glue roll 17 is then placed in its retracted inoperative position away from the stationary roll 23, as shown in FIG. 12(*a*).

Figure 12:
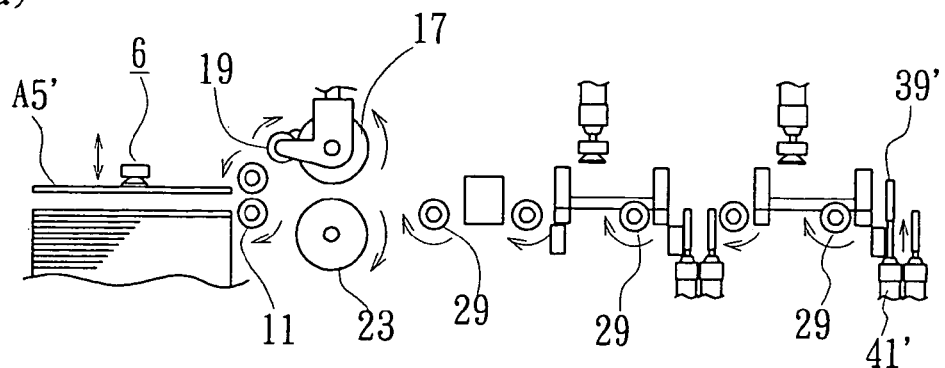
FIGS. 12 through 37 are illustrative views showing respective steps of operation of the apparatus for manufacturing the continuous length of LVL board.
Figure 12:
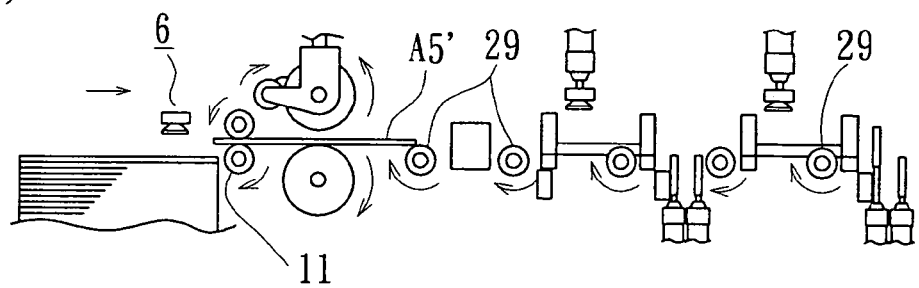
Figure 12:
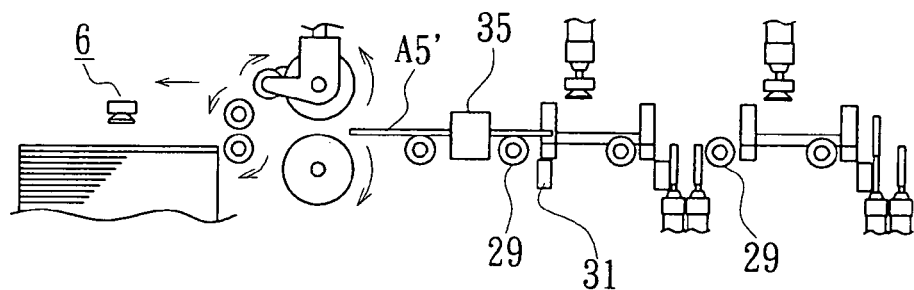
Figure 12:
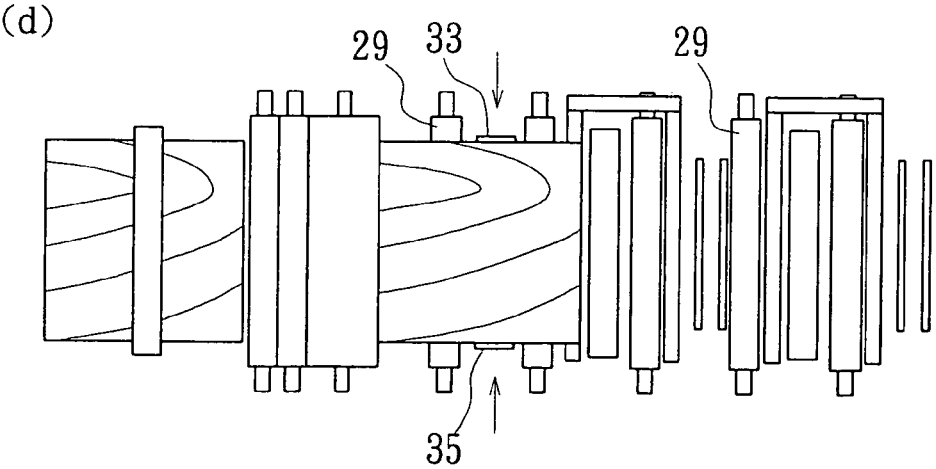
Figure 13:
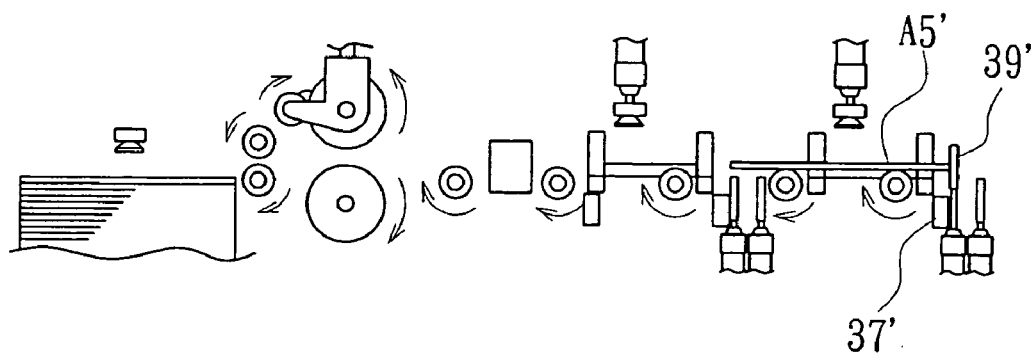
Figure 14:
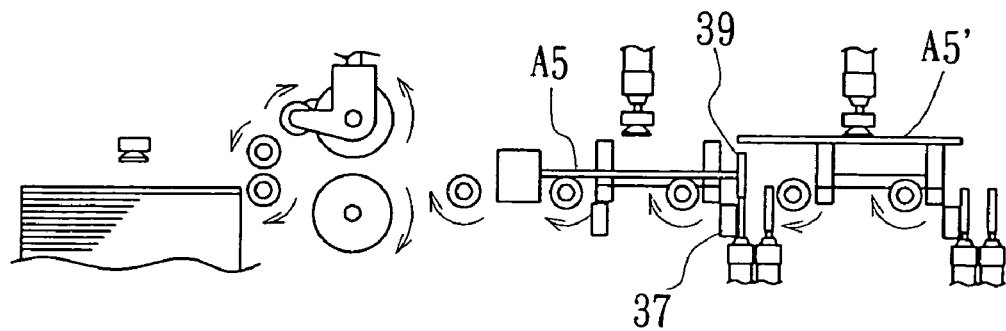
Figure 14:
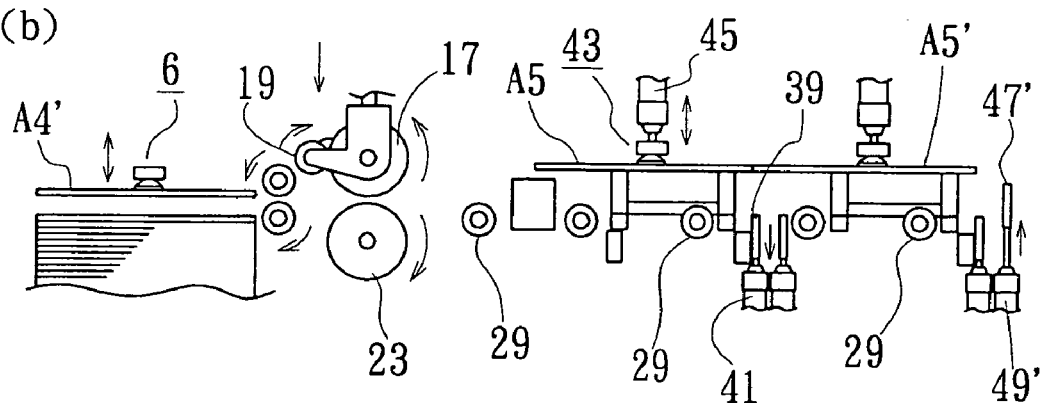
Figure 14:
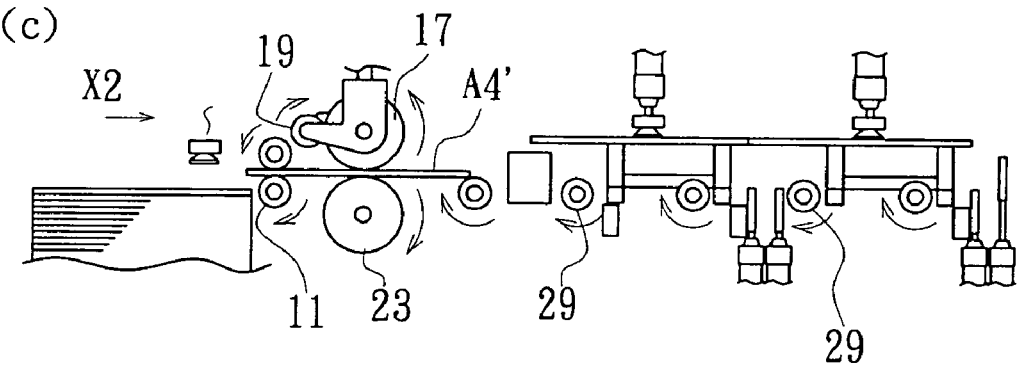
Figure 14:
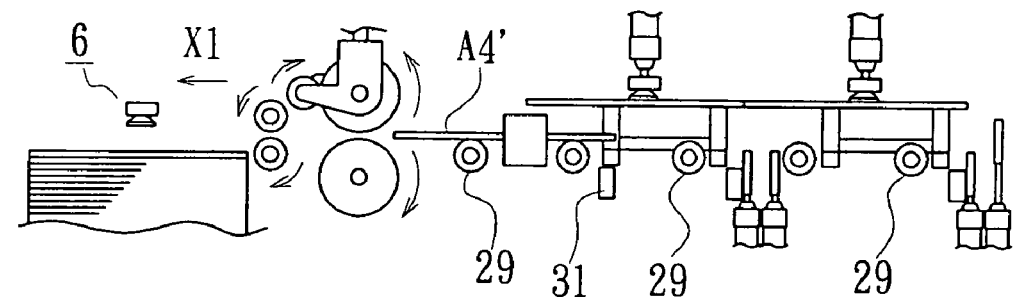
Figure 15:
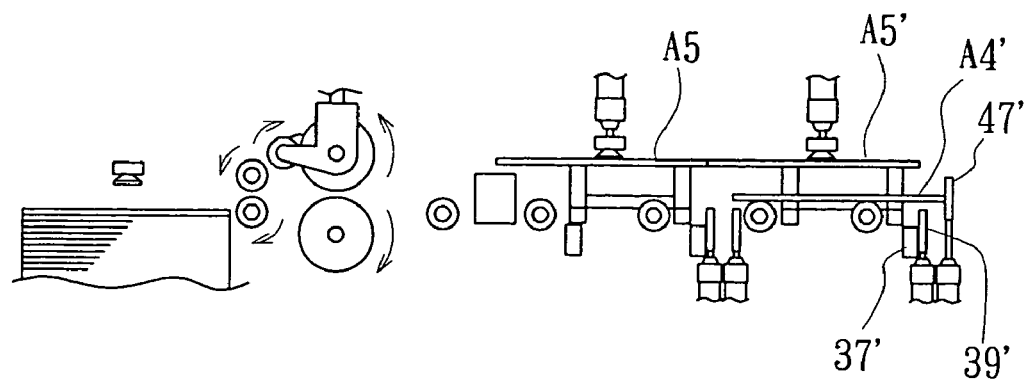
Figure 15:
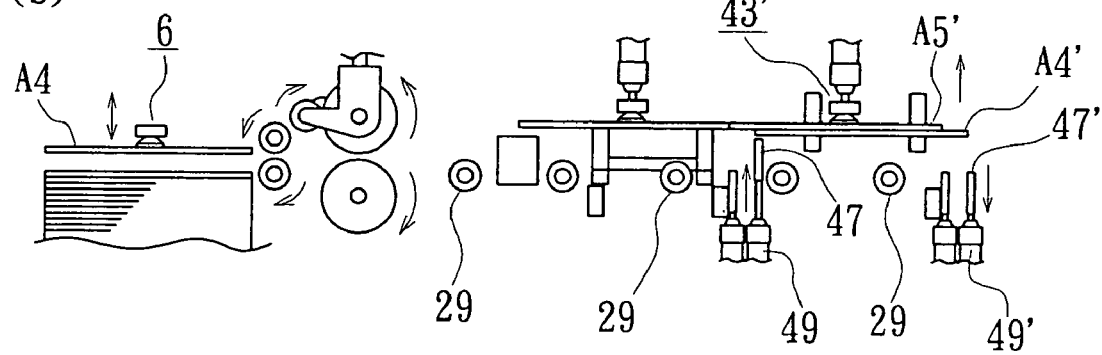
Figure 15:
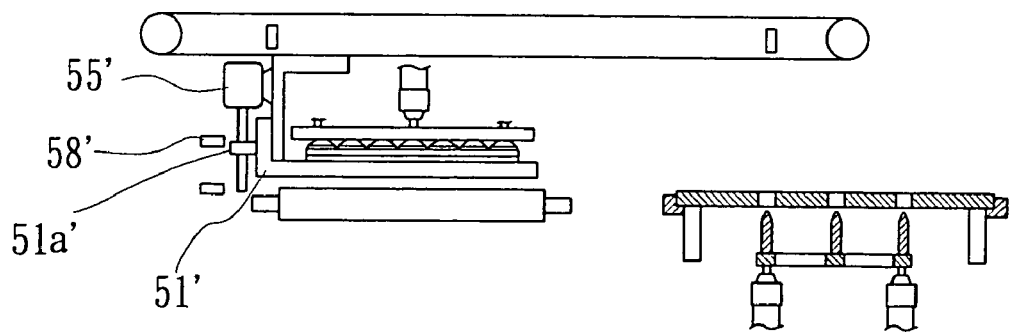
Figure 16:
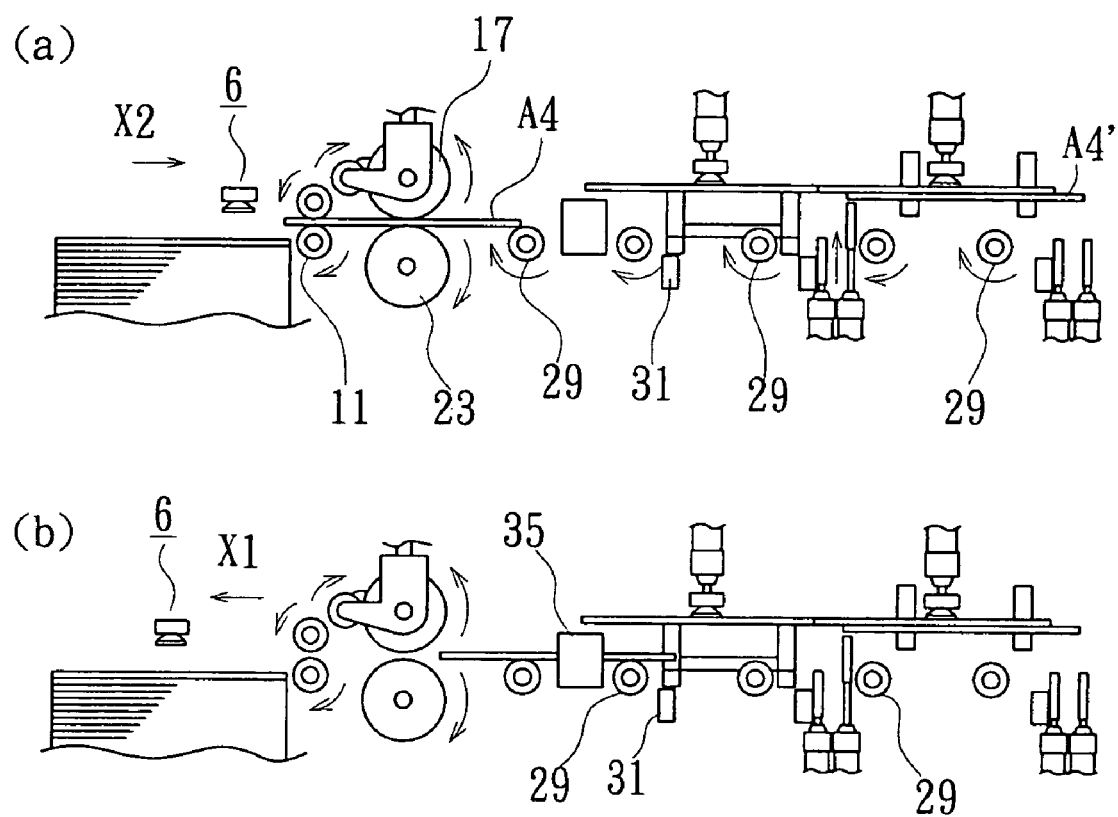
Figure 17:
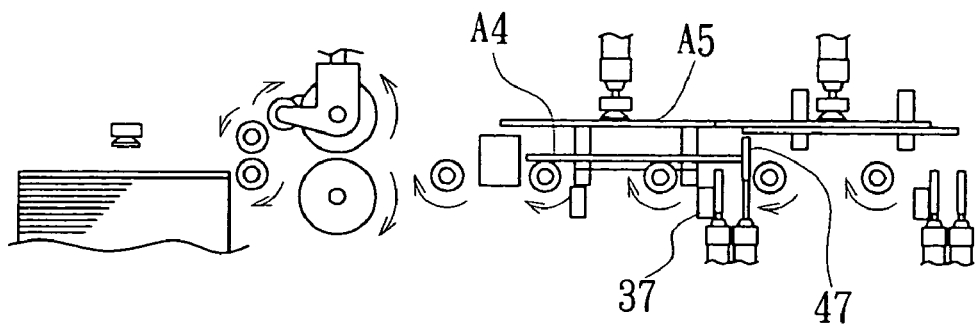
Figure 17:
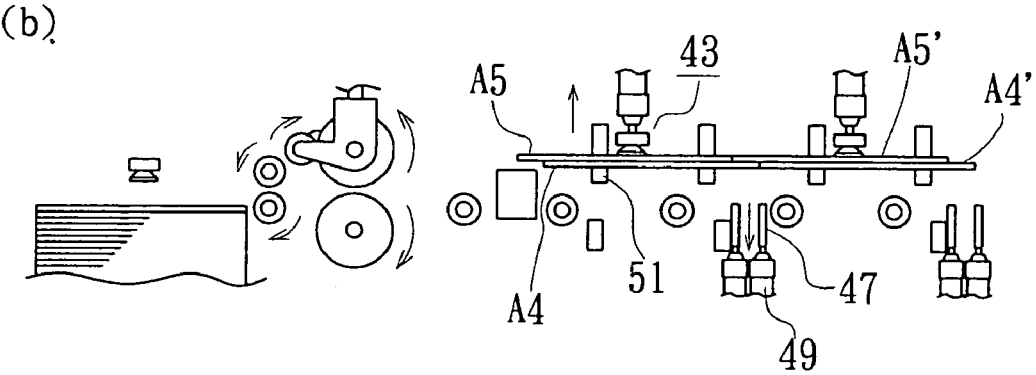
Figure 17:
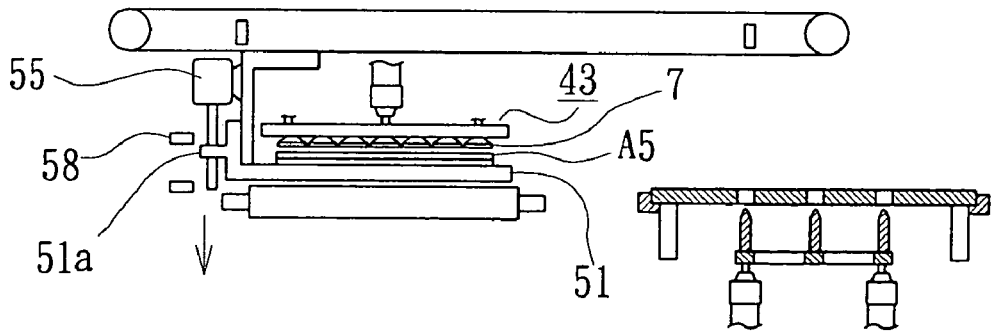
Figure 18:
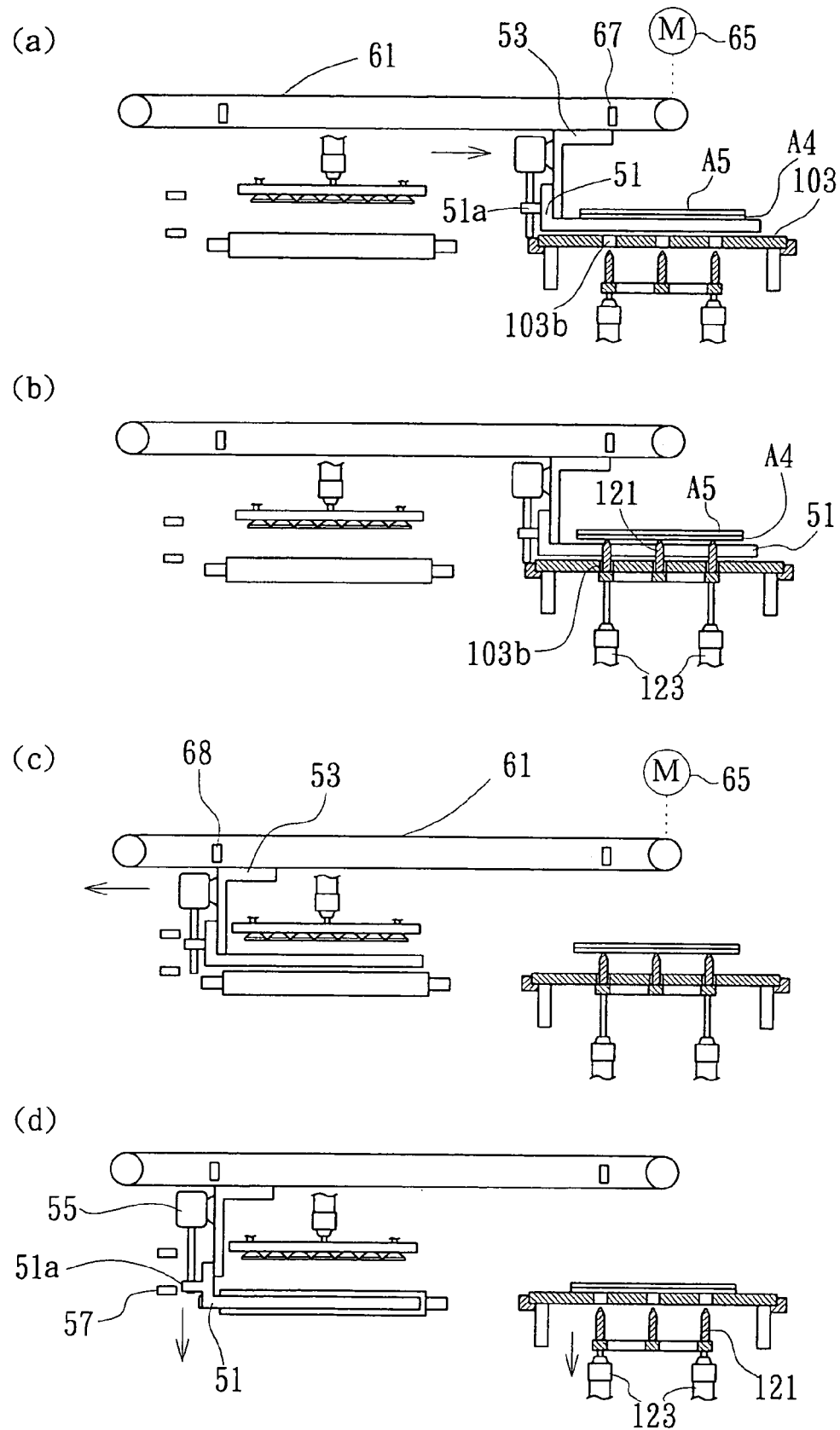
Figure 19:
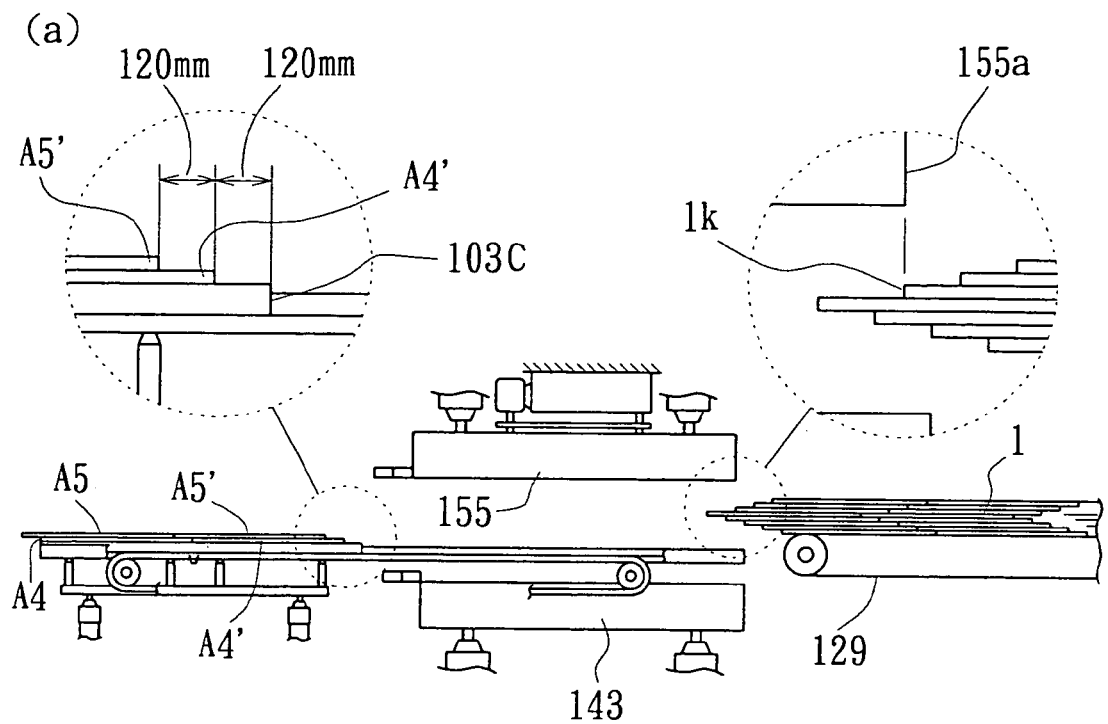
Figure 19:
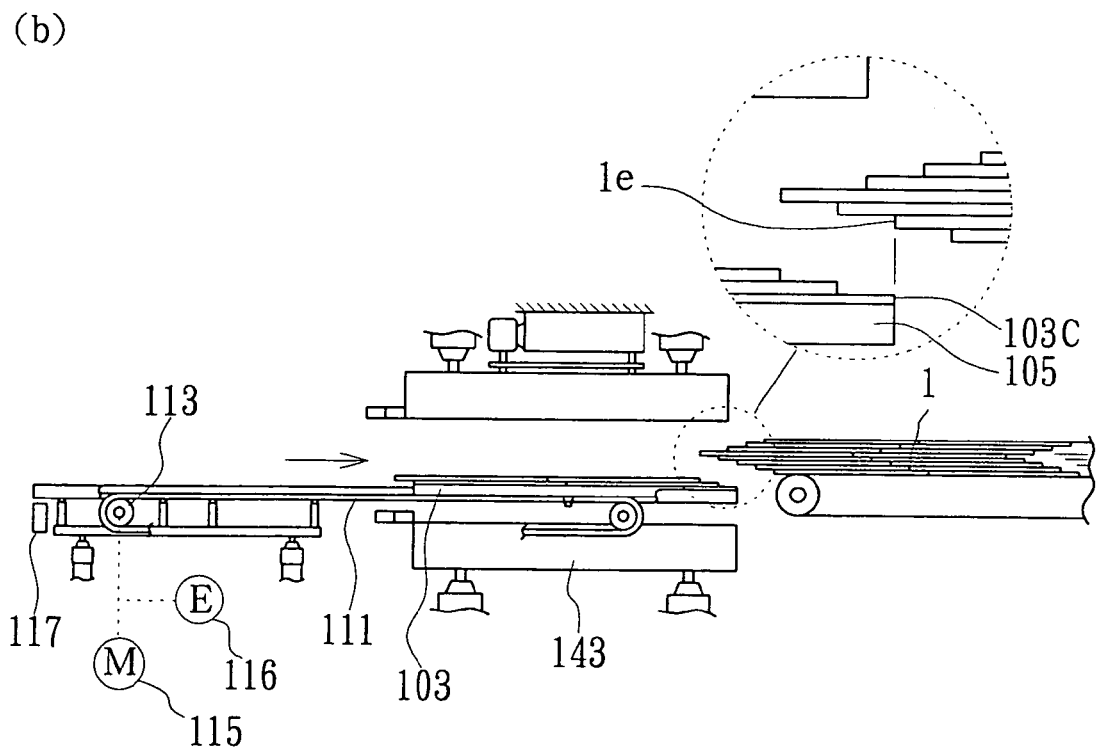

When the control unit C receives a start signal, it generates a signal to start the first conveyer rolls 29 to rotate in arrow direction and simultaneously activate the cylinder 41' thereby to move the stop plate 39' to its extended position as shown in FIG. 12(*a*). Simultaneously, the suction head 6 is operated to pick up the uppermost veneer sheet A5' from the pile as indicated double-headed arrow in FIG. 12(*a*) and then moved in arrow direction, or rightward as seen on the drawing, to allow the leading end of the veneer sheet A5' to be caught and then transferred forward by the feeding rolls 11 and the first conveyer rolls 29, as shown in FIG. 12(*b*). The suction head 6 is deactivated when the veneer sheet A5' is caught at its leading end by the rolls 11. When the veneer sheet A5' moving past the stationary roll 23 comes to a position where its leading end is detected by the sensor 31, a detection signal is generated by the sensor 31 to the control unit C, which then transmits a signal to stop the first conveyer rolls 29, as shown in FIG. 12(*c*). The same signal causes the suction head 6 to move in arrow direction back to its original standby position as shown in FIG. 12(*c*). In response to a further signal generated by the control unit C after the elapse of a predetermined length of time since the stop of the first conveyer rolls 29, the centering plates 33, 35 are activated to move toward each other until they are brought into contact with the lateral opposite edges of the veneer sheet A5', with the result that the veneer sheet A5' is straightened and centered with respect to the veneer sheet conveying path as shown in FIG. 12(*d*). The centering plates 33, 35 are moved away from each other to their retracted position after the elapse of a predetermined length of time since the activation of the centering plates 33, 35 that is long enough for the veneer sheet to be properly centered and, simultaneously, the conveyer rolls 29 are rotated again to move forward the veneer sheet A5'.

As the veneer sheet A5' comes to a position where its leading end is detected by the sensor 37' as shown in FIG. 13(a), the control unit C provides a signal which causes the conveyer rolls 29 to stop after the elapse of a predetermined length of time since the detection by the sensor 37' that is long enough for the leading end to be brought into contact with the stop plate 39', as shown in FIG. 13(a). The cylinder 41' is operated so as to move the stop plate 39' to its retracted position. Subsequently the control unit C provides a signal which operates the cylinder 45' so as to lower the suction head 43' for picking up the veneer sheet A5' and then to raise the suction head 43' with the veneer sheet A5' at the standby position, as shown in FIG. 13(b). Simultaneously with the raising of the suction head 43', the cylinder 41 is operated so as to move the stop plate 39 to its extended operative position, and the suction head 6 at the veneer sheet feeding station 3 is operated to pick up the uppermost veneer sheet A5 from the veneer sheet pile, as shown in the same drawing.

The first conveyer rolls 29 are then activated again and the suction head 6 moves the sheet A5 between the feed rolls 11, as shown in FIG. 13(c), so that the second veneer sheet A5 is moved forward in the same manner as the veneer sheet A5'. As the leading end of the veneer sheet A5 is detected by the sensor 31, the control unit C responding to a detection signal from the sensor 31 generates a signal which causes the conveyer rolls 29 to stop and the suction head 6 to move back to its retracted position, as shown in FIG. 13(d). The centering plates 33, 35 are operated so as to straighten and center the veneer sheet A5 in the same manner as the veneer sheet A5'. The centering plates 33, 35 are moved away from each other to their retracted position after the elapse of a predetermined length of time and, simultaneously, the conveyer rolls 29 are rotated again to move forward the veneer sheet A5.

As the veneer sheet A5 comes to a position where its leading end is detected by the sensor 37, the conveyer rolls 29 are stopped after the elapse of a predetermined length of time so that the leading end are brought into contact with the stop plate 39', as shown in FIG. 14(a). The cylinder 41 is activated so as to move the stop plate 39 to its retracted position. Then, the cylinder 45 is operated so as to lower the suction head 43 for picking up the veneer sheet A5 and then to raise the suction head 43 with the veneer sheet A5, as shown in FIG. 14(b). Subsequently, the cylinder 49' is operated so as to move the stop plate 47' to its extended position and, simultaneously, the cylinder 21 (shown in FIG. 2) is operated so as to lower the roll assembly 17, 19 to the glue spreading position, as shown in FIG. 14(b). The suction head 6 is operated so as to pick up the third veneer sheet A4' and the first conveyer rolls 29 are rotated. The veneer sheet A4' is passed through the feed rolls 11 and then between the glue roll 17 and the stationary roll 23, as shown in FIG. 14(c), so that the veneer sheet A4' is coated on its upper surface with adhesive. Veneer sheet having its upper surface thus coated with adhesive will be referred to as "coated veneer sheet" hereinafter. After the veneer sheet A4' has passes through the feed rolls 11, the suction head 6 returns to its original standby position, as shown in FIG. 14(d).

As the coated veneer sheet A4' comes to a position where its leading end is detected by the sensor 31, the conveyer rolls 29 are stopped and the centering plates 33, 35 are operated for straightening and centering the veneer sheet A4'. The centering plates 33, 35 are moved away from each other to their retracted position after the elapse of a predetermined length of time and, simultaneously, the conveyer rolls 29 are rotated again to move further forward the veneer sheet A4'.

As the leading end of the coated veneer sheet A4' is detected by the sensor 37', the conveyer rolls 29 are stopped after the elapse of a predetermined length of time for the leading end to be brought into contact with the stop plates 47', as shown in FIG. 15(a). In the state of FIG. 15(a), the coated veneer sheet A4' is located below the veneer sheet A5' at position offset downstream therefrom, or rightward as seen in the drawing, by a distance of about 120 mm that corresponds to the spaced distance between the first and second stop plates 39' and 47'. After the coated veneer sheet A5' has been thus positioned by the stop plate 47', the stop plate 47' is retracted, as shown in FIG. 15(b).

The motor 55' for the second veneer sheet traversing device is operated so as to move the lifting bar 51' upward until its block 51a' is detected by the sensor 58', as shown in FIG. 15(c). By so doing, the coated veneer sheet A4' is placed below the veneer sheet A5' in offset relation wherein the adjacent ends of the two veneer sheets A4', A5' are staggered by the above distance of about 120 mm, as shown in FIG. 15(b). The cylinder 49 is operated to extend the stop plate 47 to its operative position. Subsequently, the suction head 43' is deactivated by closing the shutter (not shown), so that the coated veneer sheet A5' is supported with the veneer sheet A4' by the lifting bar 51'.

Subsequently, operating the first conveyer rolls 29 and the suction head 6, a fourth veneer sheet A4 is picked up from the pile, coated with adhesive and conveyed forward in the same manner as the veneer sheet A4', as shown in FIG. 16(a), until its leading end is detected by the sensor 31. As the movement of the veneer sheet A4 is stopped, the suction head 6 is retracted and the veneer sheet A4 undergoes centering by the centering plates 33, 35, as shown in FIG. 16(b), which is followed by reactivation of the first conveyer rolls 29.

When the leading end of the coated veneer sheet A4 moved by the conveyer rolls 29 is detected by the sensor 37, the conveyer rolls 29 are stopped after the elapse of a predetermined length of time since the detection by the sensor 37 so that the leading end of the coated veneer sheet A4 is brought into contact with the stop plate 47, as shown in FIG. 17(a). The coated veneer sheet A4 with its leading end placed in contact with the stop plate 47 is located at a position below the veneer sheet A5 and offset downstream therefrom by a distance of about 120 mm that corresponds to the spaced distance between the first and second stop plates 39 and 47. The cylinder 49 is then operated so as to retract the stop plate 47, as shown in FIG. 17(b).

The motor 55 for the first veneer sheet traversing device is operated so as to move the lifting bars 51 upward in the same manner as the lifting bar 51'. Thus, the coated veneer sheet A4 is placed below the veneer sheet A5 in an offset relation with the adjacent ends of the two veneer sheets A4, A5 staggered by about 120 mm, as shown in FIG. 17(b). The suction head 43 is deactivated by closing its associated shutter (not shown), so that the coated veneer sheet A5 is released from the suction head 43 and supported with the veneer sheet A4 by the lifting bar 51', as shown in FIG. 17(b).

Then, the motors 55, 55' are operated simultaneously so as to lower the lifting bars 51, 51' until the sensors 58, 58' detect the blocks 51a, 51a' no more, as shown in FIG. 17(c), although the drawing shows only the first veneer sheet traversing device. Thus, the veneer sheets A5, A5' are positioned with a slight clearance from the suction heads 43, 43', respectively, as shown in FIG. 17(c) (only veneer sheet A5 being shown in this drawing).

Subsequently, the motors 65, 65' for the first and second veneer sheet traversing devices are activated. Though the following will describe the movement of the lifting bar 51 and the related operation of the first veneer sheet traversing device with reference to FIGS. 18(a) through 18(d), the same operation takes place simultaneously for the second veneer sheet traversing device.

The motor 65 drives the belt 61 to move the support block 53, to which the lifting bar 51 is fixed, rightward as indicated by arrow in FIG. 18(a) until the block 53 is detected by the sensor 67, where the lifting bar 51 carrying thereon the veneer sheets A4, A5 is located immediately above the veneer sheet carrier plate 103, as shown in the same drawing. The cylinders 123 are then activated to raise the upstanding rods 121 until they are inserted through the holes 103b formed in the veneer sheet carrier plate 103 so that the combined veneer sheets A4, A5 are pushed upward by the rods 121 to be clear of the lifting bar 51, as shown in FIG. 18(b). The belt 61 is driven by the motor 65 so as to move back the support block 53 until it is detected by the sensor 68, as shown in FIG. 18(c). Subsequently, the cylinders 123 are operated to retract their rods 121 so that the veneer sheets A4, A5 are placed onto the carrier plate 103, and lifting bar 51 is lowered by the motor 55 to its original position where the block 51a is detected by the sensor 57, as shown in FIG. 18(d).

As shown in FIG. 19(a), two veneer sheets A4, A4' or A5, A5' thus placed on the carrier plate 103 are disposed one next the other with the adjacent ends thereof set in facing relation to each other. The carrier plate 103 is so sized and arranged that the veneer sheets A4, A5, A4', A5' are placed on the carrier plate 103 by the operation of the first and second veneer sheet traversing devices as described above in such a way that one end of the coated veneer sheet A4' adjacent to the heating plates 143, 155 of the hot press is spaced from the adjacent end face 103c of the carrier plate 103 at a distance of about 120 mm, as shown in the left enlarged view of FIG. 19(a).

The servo motor 133 is activated to move the chain conveyer 129 to a position where the sixth end face 1k (FIG. 11) of veneer sheet in the sixth layer of the initial base material 1 placed on the chain conveyer 129 is substantially in alignment with the adjacent end face 155a of the upper heating plate 155, as shown in the right enlarged view of FIG. 19(a). Subsequently, the motor 115 is activated to move the belts 111 with the veneer sheet carrier plate 103 until a position is reached where the end face 103c of the carrier plate 103 is substantially in alignment with the third end face 1e of veneer sheet in the third layer of the initial base material 1 as shown in enlarged view of FIG. 19(b). The position where the belts 111 and hence the carrier plate 103 should be stopped is determined by the control unit C which controls the operation of the motor 115 in response to a signal from the rotary encoder 116 which determines the current position of the carrier plate 103 with respect to a predetermined reference position of the apparatus by counting the rotation angle of the motor 115.

Then, the electromagnetic valve 171 connected to the cylinders 169 through the fluid ports 169a is opened and the servo motor 161 is activated so as to lower the upper heating plate 155 until the lower surface of the heating plate 155 comes to a position spaced away from the aforementioned reference position of the base material 1 at a distance corresponding to the thickness of veneer sheet, i.e. to a position where the lower surface of the upper heating plate 155 is brought into contact with the fifth face 1j of veneer sheet in the fifth layer of the initial base material 1, as shown in FIG. 20(a). The position where the upper heating plate 155 should be stopped is determined by the control unit C which controls the operation of the servo motor 161 in response to a signal from the rotary encoder 165 which determines the current position of the upper heating plate 155 with respect to the aforementioned predetermined reference position of the base material 1 by counting the rotation angle of the motor 161. The electromagnetic valve 171 is closed after the motor 161 is stopped.

Then, the hydraulic cylinders 145, 145 are activated to raise the lower heating plate 143. While the lower heating plate 143 is moved upward, the carrier plate 103 carrying thereon veneer sheets A4, A5, A4', A5' is disengaged from the belts 111 and moved further upward together with the heating plate 143 until the veneer sheets are pressed as shown in FIG. 20(b). Four veneer sheets A4, A4', A5, A5' are pressed between the heating plates 155, 143 in the same positional relation as that shown in FIG. 19(a) and also such that the right ends of the coated veneer sheets A4', A5' adjacent to the initial base material 1 are set in facing relation to the fourth and fifth end faces 1g an 1i of veneer sheet in the fourth and fifth layers of the initial base material 1, respectively, as shown in FIG. 20(c). Additionally, the entire surface area of the coated veneer sheets A4, A4' receives pressure from the lower heating plate 143 and the same entire surface area is backed up or supported by the upper heating plate 155 during pressing. This hot pressing is done at a pressure of about 1 MPa and continued for about three minutes. It is noted that during this hot pressing the auxiliary heating plates 147, 151, 173, 177 do not contribute to hot pressing of veneer sheets.

The control unit generates at an appropriate time during this hot pressing a command signal to initiate a series of operation steps which are to be performed during the three minutes of the above hot pressing for preparation of the next set of veneer sheets. Namely, the second conveyer rolls 73, as well as the first conveyer rolls 29, are driven to rotate and the cylinder 85' is operated so as to extend the stop plate 83', as shown in FIG. 21(a). Simultaneously, the suction head 6 is operated to pick up and feed a veneer sheet A6' through the glue spreader 17, 23, as shown in FIG. 21(b). As the coated veneer sheet A6' is detected at its leading end by the sensor 75, the second conveyer rolls 73 are stopped and the second centering plates 77, 79 (only one plate 79 being shown) are operated to straighten and center the coated veneer sheet A6', as shown in FIG. 21(c). After the centering is over, the second conveyer rolls 73 are rotated again to move the coated veneer sheet A6' forward. As the veneer sheet A6' comes to a position where its leading end is detected by the sensor 81', the second conveyer rolls 73 are stopped after the elapse of a predetermined length of time since the detection by the sensor 81' that is long enough for the leading end to be brought into contact with the stop plate 83', as shown in FIG. 21(d).

Figure 22:
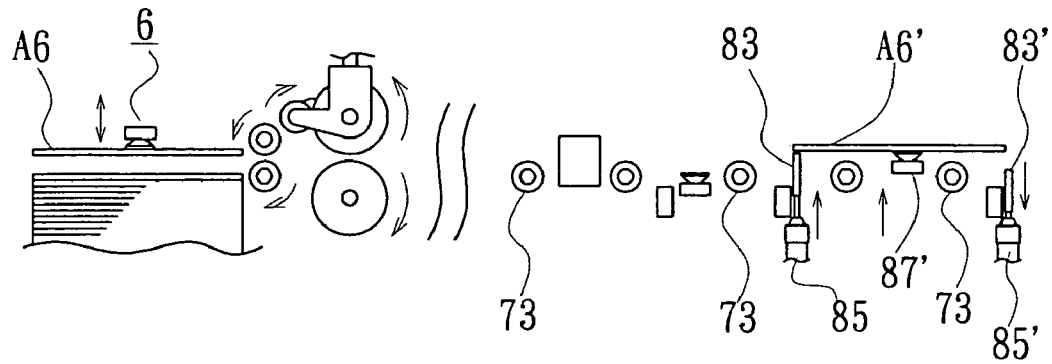
Figure 22:
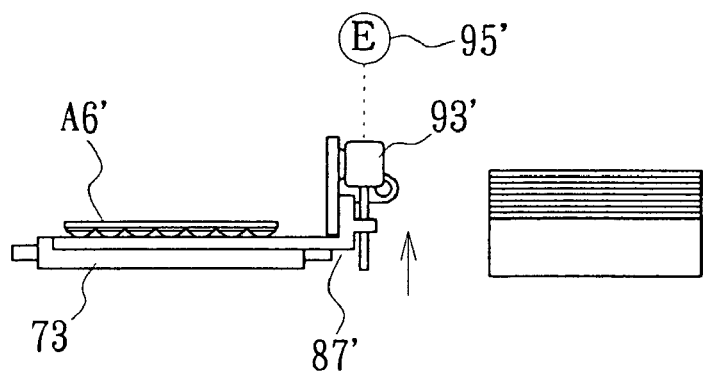
Figure 22:
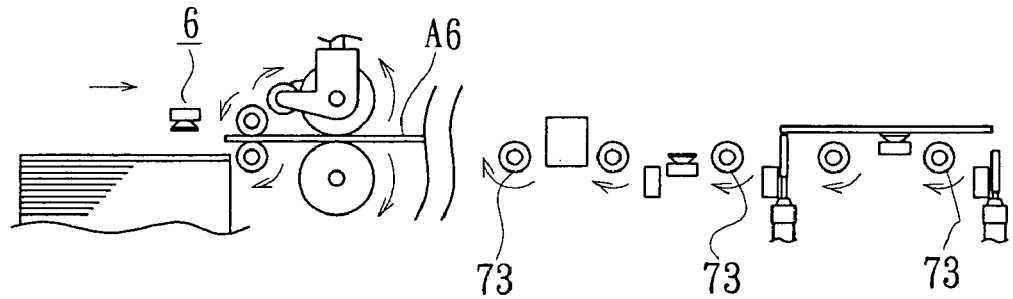
Figure 22:
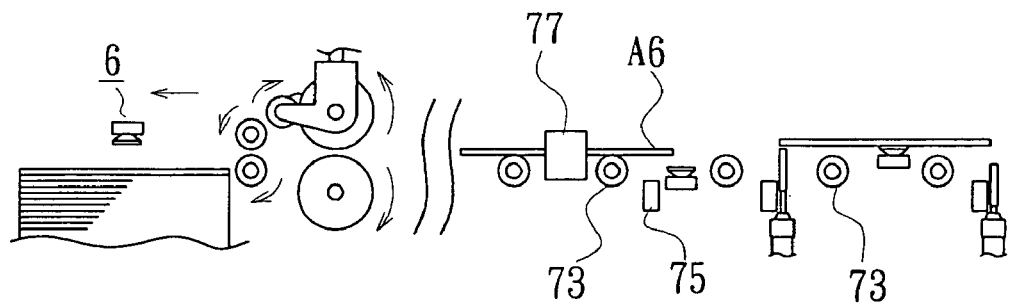

The cylinder 85' is activated to move the stop plate 83' to its retracted position as shown in FIG. 22(a), and the servo motor 93' is operated to raise the second suction head 87' for holding by suction and then raising the coated veneer sheet A6' until a predetermined position above the veneer sheet conveying path is reached by the suction head 87', as shown in FIGS. 22(a) and 22(b). Operation of the servo motor 93' is controlled by the control unit C responding to a signal from the rotary encoder 95' which is operable in the same manner as, for example, the encoder 165 for the motor 161. Then, the cylinder 85 is activated so as to extend the stop plate 83, as shown in FIG. 22(*a*). Simultaneously, the second conveyer rolls 73 are rotated again and the suction head 6 is operated to pick up a veneer sheet A6 and allow it to pass through the glue spreader 17, 23, as shown in FIGS. 22(*a*) and 22(*c*). As the coated veneer sheet A6 comes to a position where its leading end is detected by the sensor 75, the conveyer rolls 73 are stopped and the coated veneer sheet A6 is centered by the centering plates 77, 79, as shown in FIG. 22(*d*). Subsequently, the conveyer rolls 73 are rotated again to move forward the coated veneer sheet A6.

Figure 23:
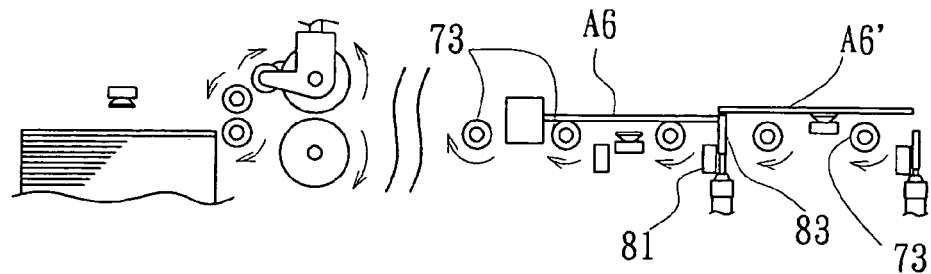
Figure 23:
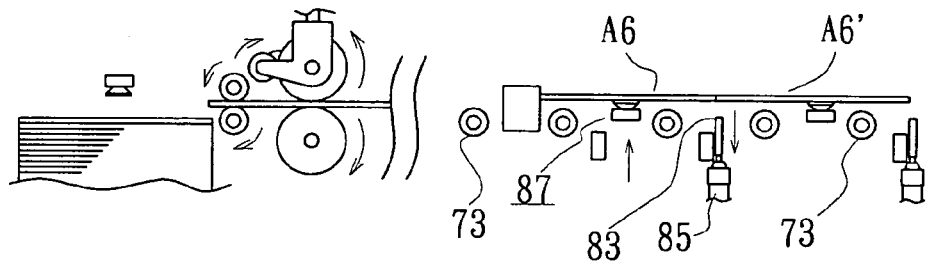
Figure 23:
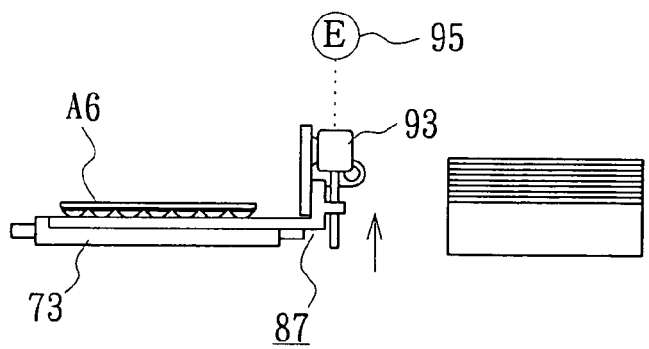
Figure 23:
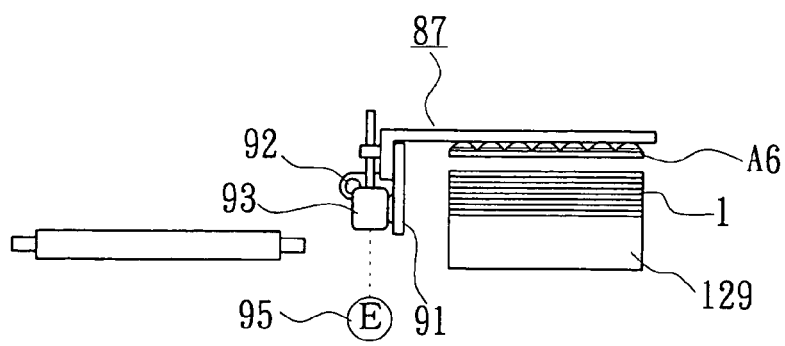

As the coated veneer sheet A6 moves to a position where its leading end is detected by the sensor 81, the conveyer rolls 73 are stopped after the elapse of a predetermined length of time so that the leading end of the veneer sheet A6 is brought into contact with the stop plate 83, as shown in FIG. 23(*a*), and the cylinder 85 is activated to move the stop plate 83 to its retracted position, as shown in FIG. 23(*b*). Similarly to the operation described with reference to FIGS. 22(*a*) and 22(*b*), the servo motor 93 is operated to raise the suction head 87 to the predetermined position above the veneer sheet conveying path, as shown in FIGS. 23(*b*) and 23(*c*). When both veneer sheets A6' and A6 are thus placed at the predetermined positions as shown in FIG. 23(*b*), the control unit C generates a command signal to activate the motors (not shown) to rotate the pivotal shafts 92, 92' for swinging the motor supports 91, 91' and hence the suction heads 87, 87' for about 180 degrees so that the veneer sheets A6, A6' are placed with their coated surfaces disposed immediately above the base material 1, as shown in FIG. 23(*d*).

Figure 24:
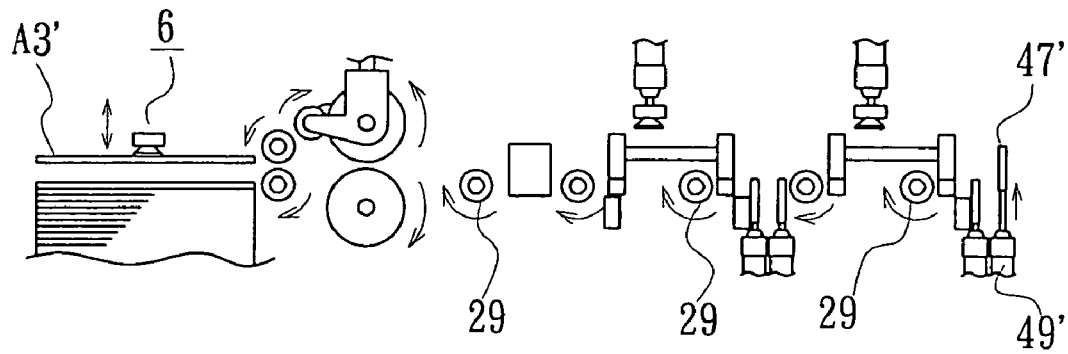
Figure 24:
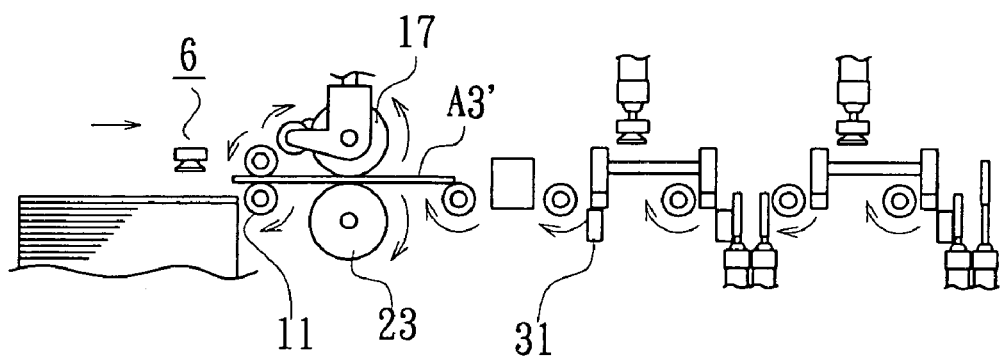
Figure 24:
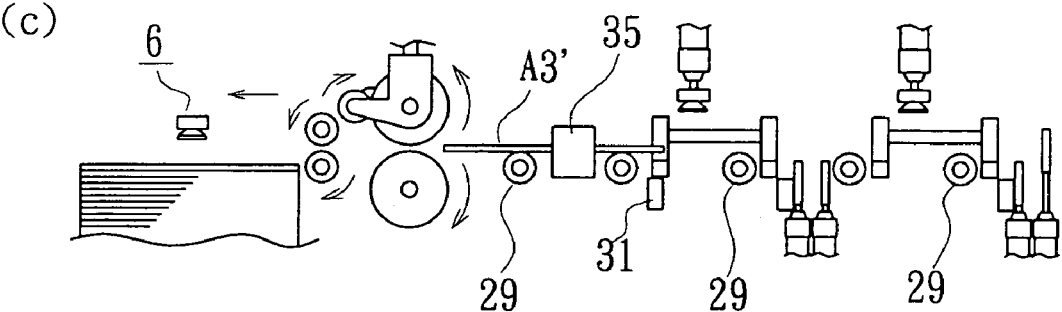
Figure 24:
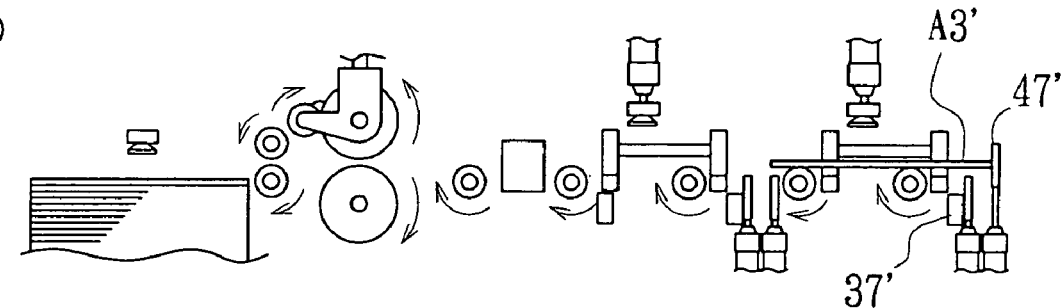

With the first conveyer rolls 29 rotated in arrow direction and the stop plate 47' extended by operating the cylinder 49', as shown in FIG. 24(*a*), the suction head 6 is operated to pick up and feed a veneer sheet A3' through the glue spreader 17, 23, as shown in FIG. 24(*b*), and moved forward until the leading end of the coated veneer sheet A3' is detected by the sensor 31, as shown in FIG. 24(*c*). In the position of FIG. 24(*c*), the coated veneer sheet A3' is centered by the centering plates 33, 35, whereupon the conveyer rolls' 29 are rotated again and the coated veneer sheet A3' is moved forward until it is brought into contact with the stop plate 47' in the same manner as described above, e.g., with reference to the veneer sheet A5'.

Figure 25:
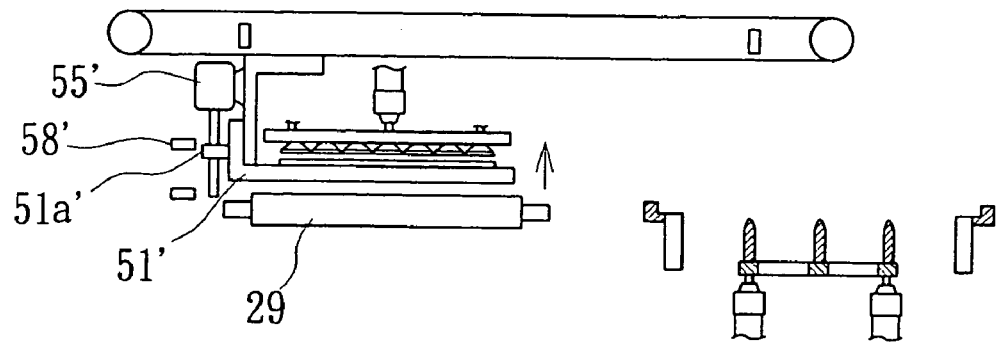
Figure 25:
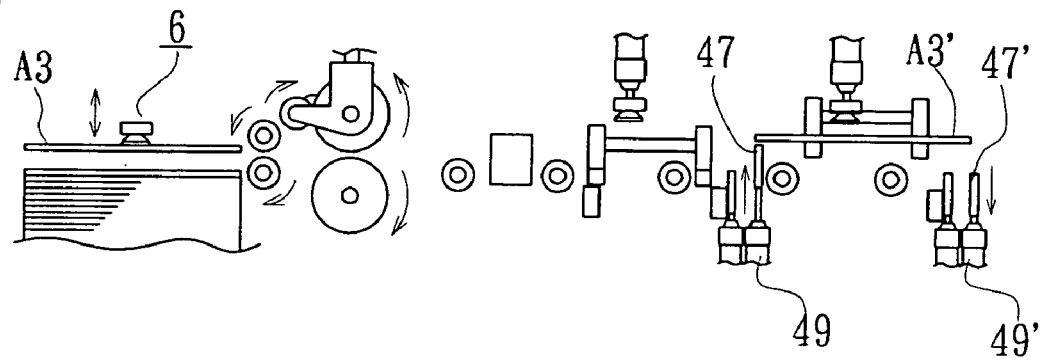
Figure 25:
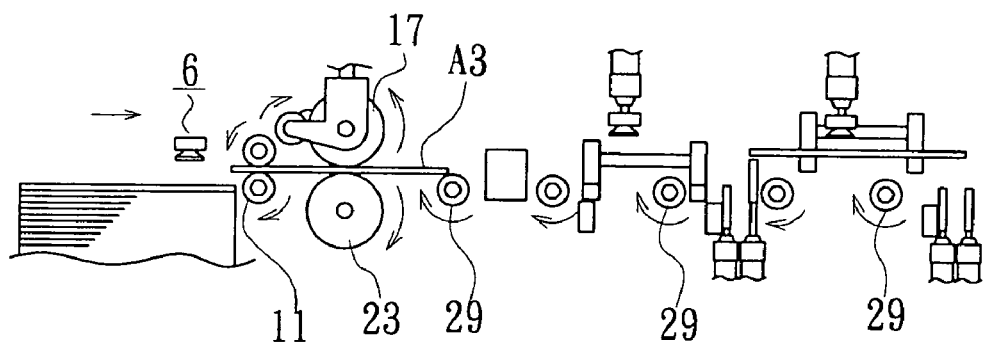
Figure 25:
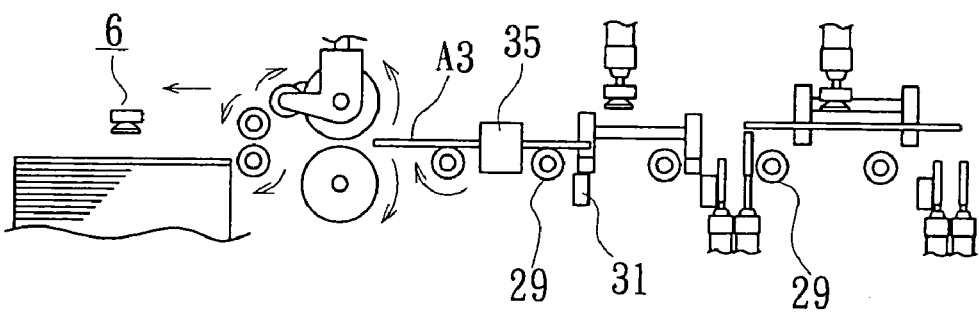

The motor 55' is operated to elevate the lifting bar 51' until its block 51*a*' is detected by the sensor 58' so that the coated veneer sheet A3' is held at a position above the veneer sheet conveying path, as shown in FIG. 25(*a*). Then operating the cylinders 49' and 49, the stop plate 47' is retracted while the stop plate 47 is extended, as shown in FIG. 25(*b*). With the first conveyer rolls 29 rotated, the suction head 6 is operated to pick up and feed a veneer sheet A3 through the glue spreader 17, 23, as shown in FIGS. 25(*b*) and 25(*c*), and the veneer sheet A3 is moved forward until its leading end is detected by the sensor 31, as shown in FIG. 24(*d*), where the coated veneer sheet A3 is centered by the centering plates 33, 35.

Figure 26:
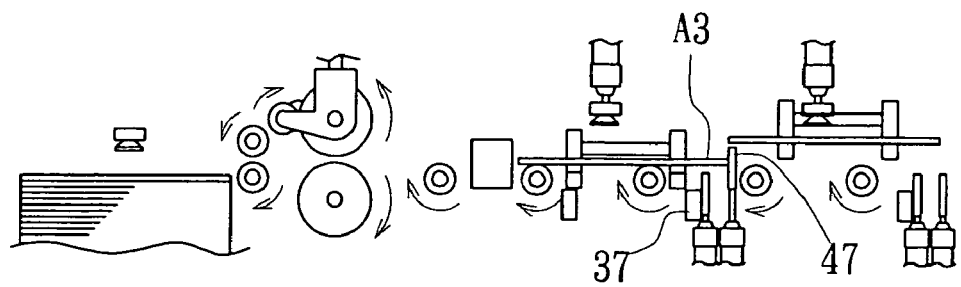
Figure 26:
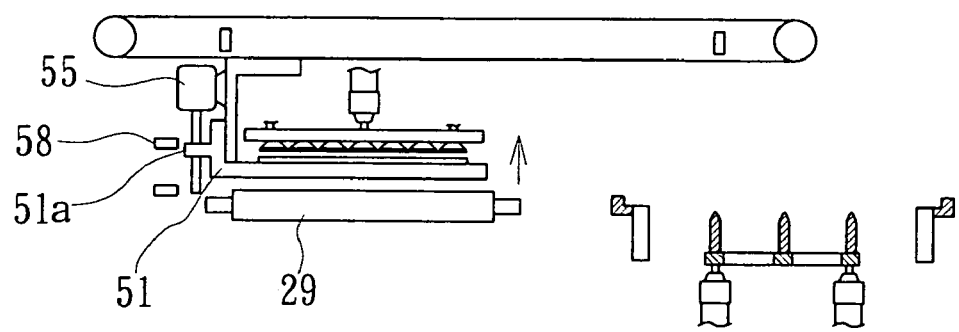
Figure 26:
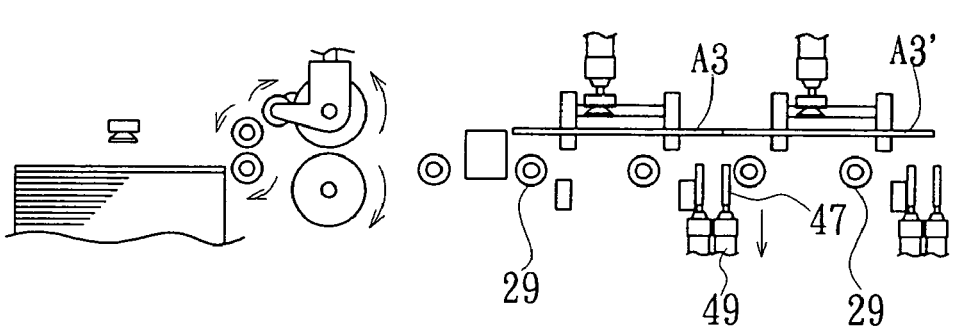
Figure 26:
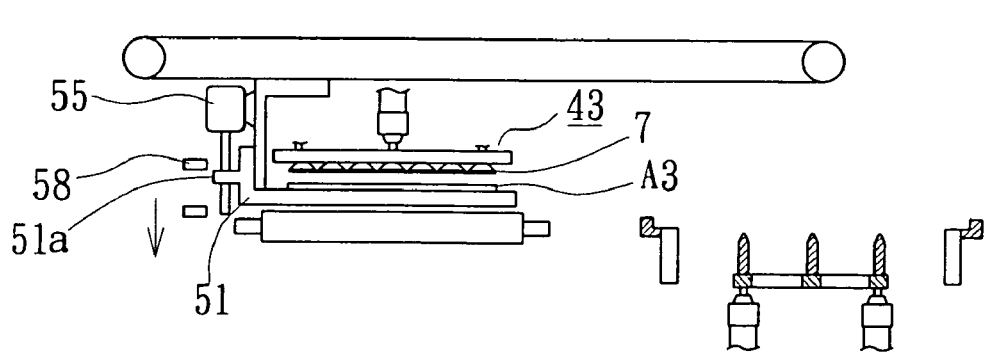

The conveyer rolls 29 are rotated again to move the coated veneer sheet A3 forward. As the veneer sheet A3 comes to a position where its leading end is detected by the sensor 37, the conveyer rolls 29 are stopped after the elapse of a predetermined length of time since the detection so that the leading end of the veneer sheet 3 is brought into contact with the stop plate 47, as shown in FIG. 26(*a*). The motor 55 is operated so as to raise the lifting bar 51 until the block 51*a* is detected by the sensor 58, as shown in FIG. 26(*b*). The cylinder 49 is activated to move the stop plate 47 to its retracted position, as shown in FIG. 26(*c*). Then, the motors 55, 55' are operated simultaneously so as to lower the lifting bars 51, 51' until the sensors 58, 58' detect the blocks 51*a*, 51*a*' no more, as shown in FIG. 26(*d*), although the drawing shows only the first veneer sheet traversing device. Thus, the veneer sheets A3, A3' are positioned with a slight clearance from the suction heads 43, 43', respectively, as shown in FIG. 26(*d*).

Figure 20:
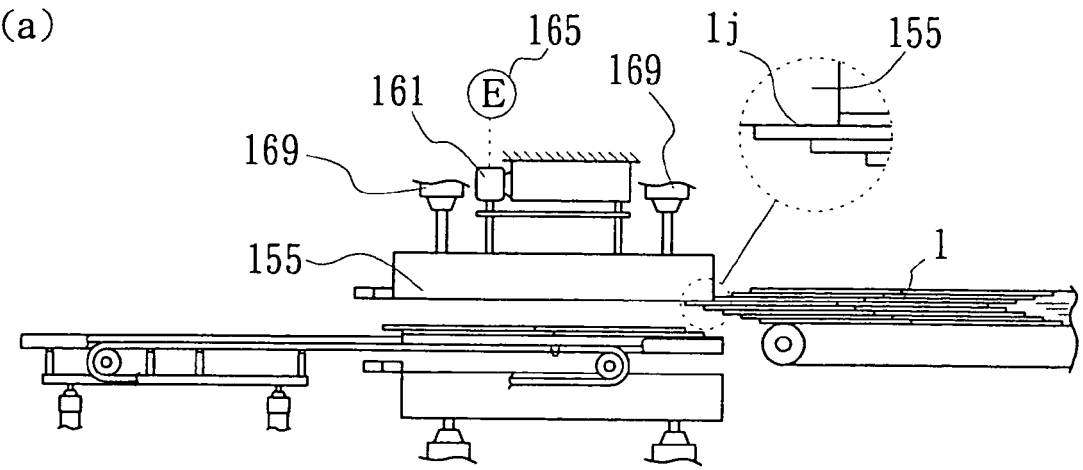
Figure 20:
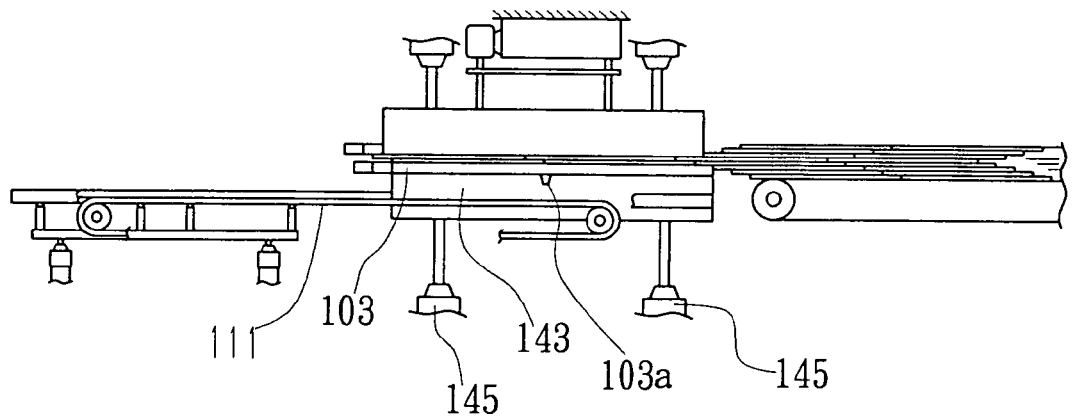
Figure 20:
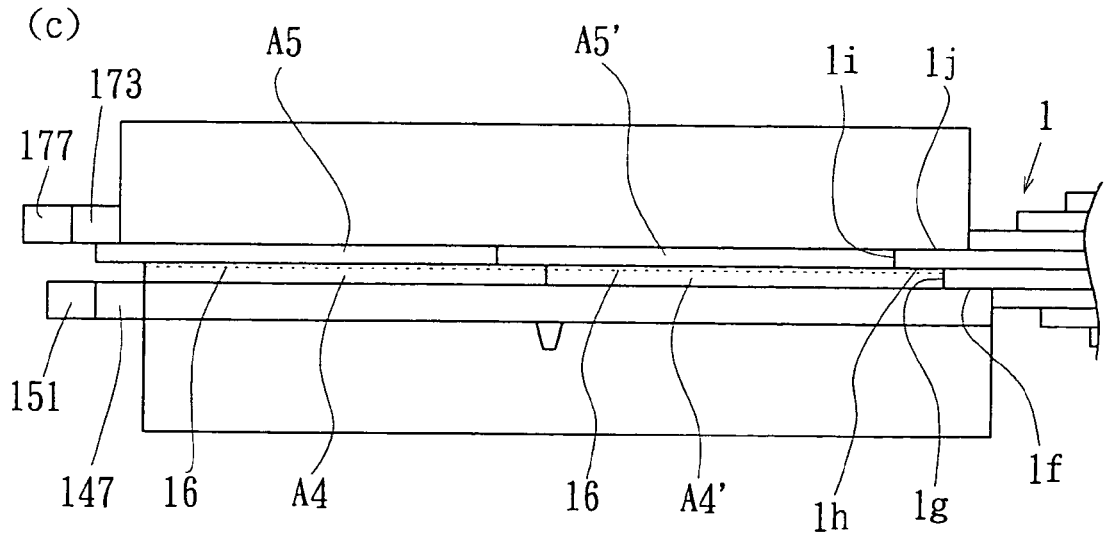
Figure 21:
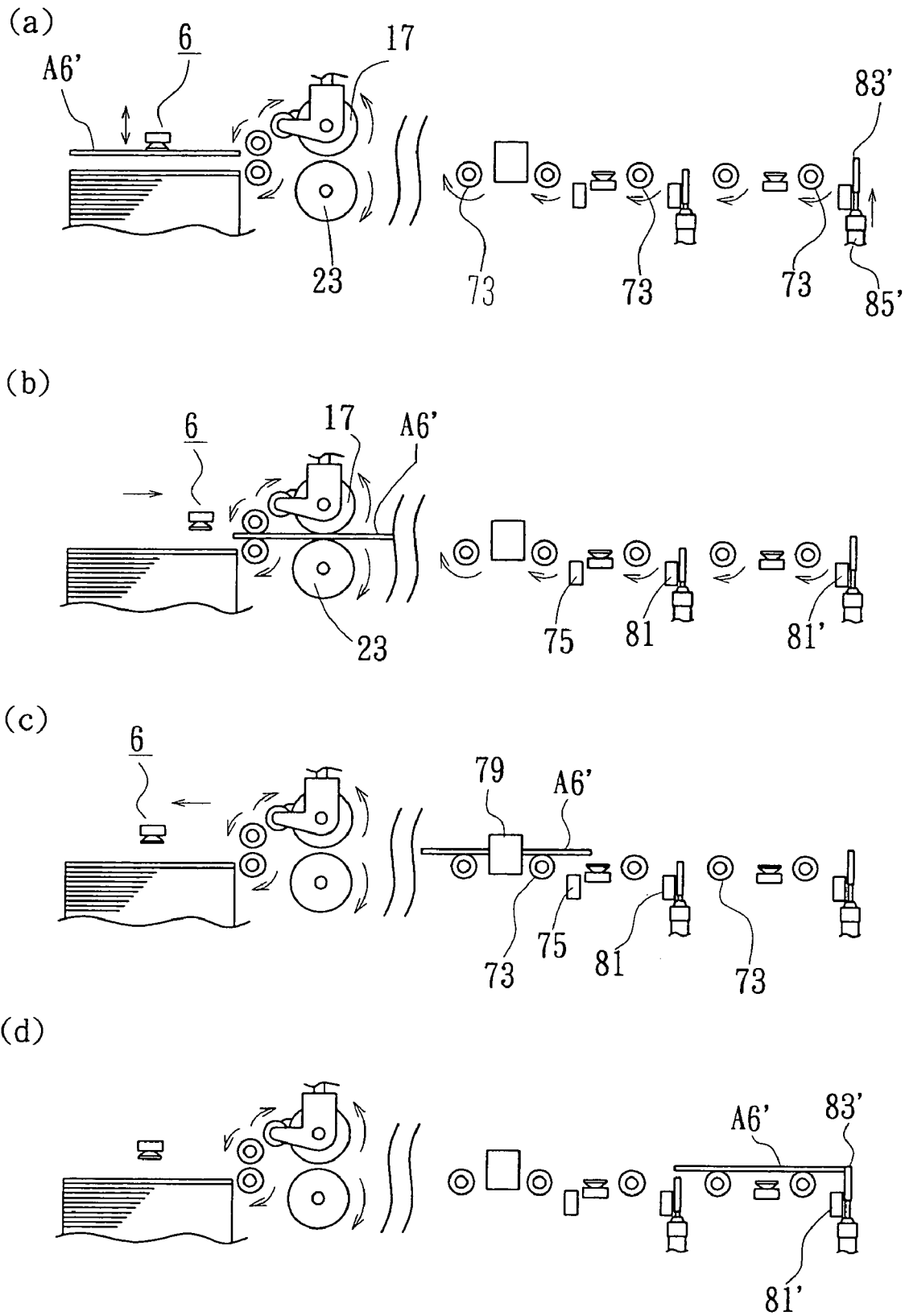

The above steps of operation described with reference to FIGS. 21 through 26 are performed during the three minutes of hot pressing operation of FIG. 20(*c*). The adhesive is set enough during this hot pressing to bond two sets of veneer sheets A4, A4' and A5, A5' to each other, as well as to the initial base material 1. By so doing, a new base material which includes the added veneer sheets A4, A4', A5, A5' is formed. For the sake of the description, such base material will be referred to by reference numeral 1-1.

Figure 27:
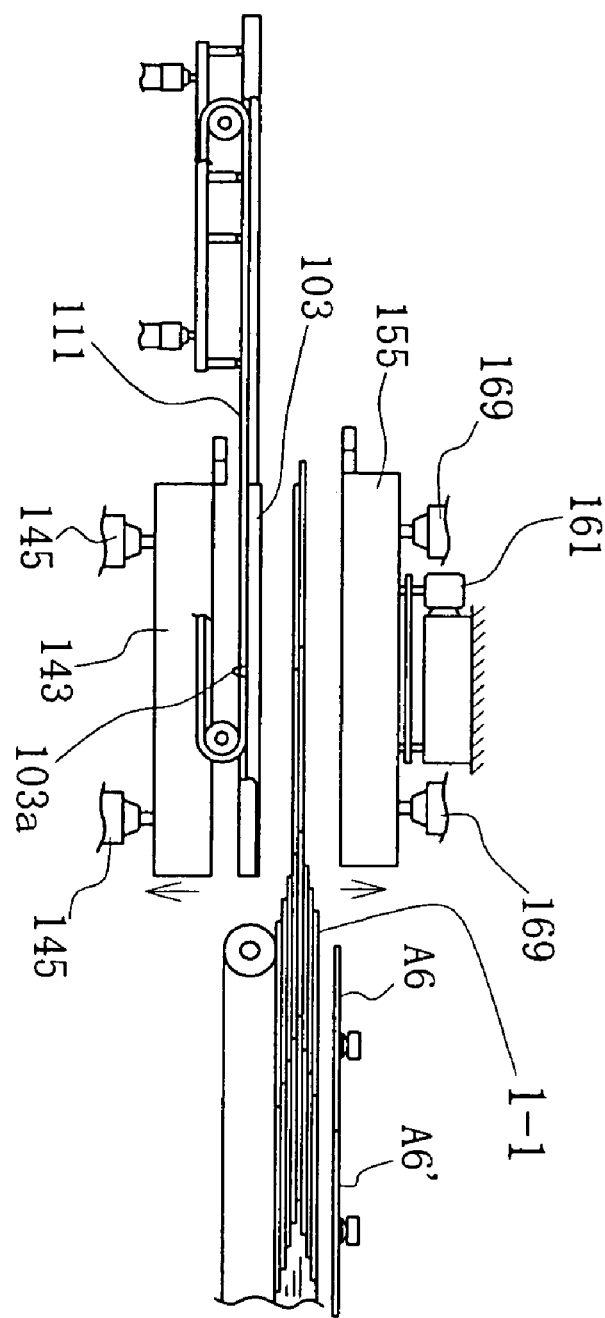

When the three minutes have passed, the control unit C generates a signal which firstly causes the electromagnetic valve 171 (FIG. 8) to open and then the servo motor 161 to operate so as to move the upper heating plate 155 upward to its original standby position, and actuates the hydraulic cylinders 145 so as to move the lower heating plate 143 to its original standby position, as shown in FIG. 27. The carrier plate 103 is lowered with the lower heating plate 143 until it engages with the belts 111 with the projections 103*a* of the carrier plate 103 received in the holes 111*a* in the belts 111.

Figure 28:
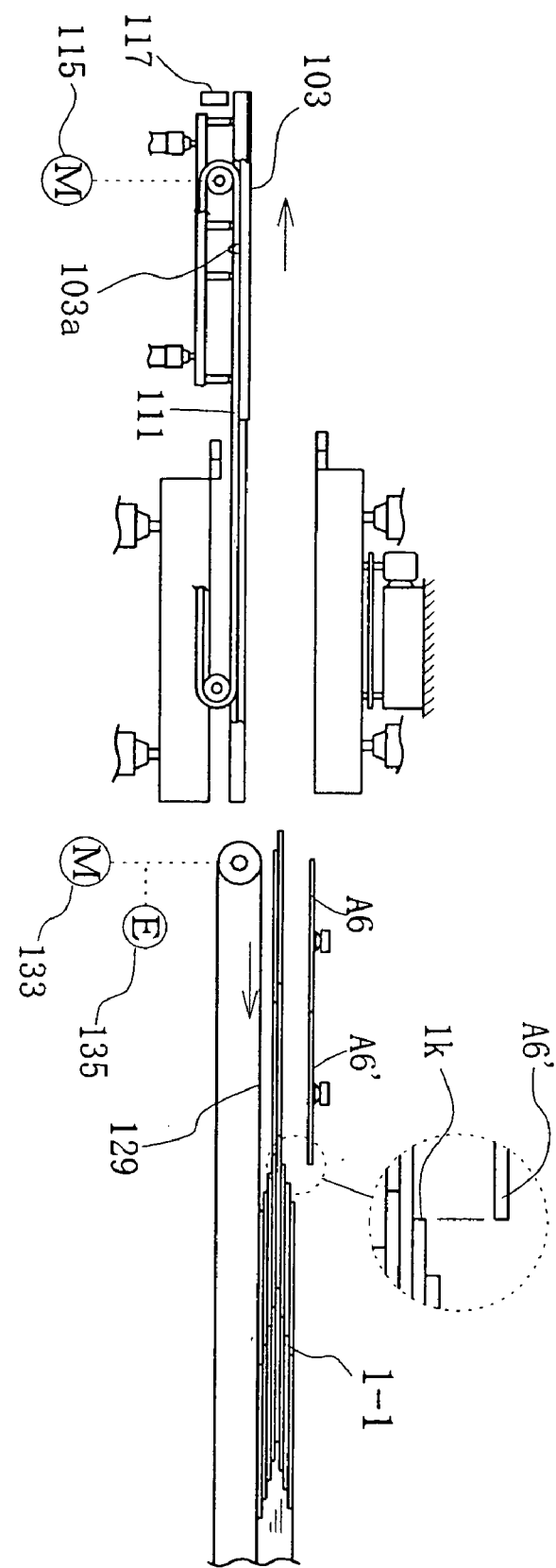

Then, the motor 115 is activated to drive the belts 111 so that the carrier plate 103 engaged with the belts 111 is moved in arrow direction as shown in FIG. 28 until the left end (as seen in FIG. 28) of the carrier plate 103 is detected by the sensor 117. Simultaneously, the motor 133 is also activated to drive the chain conveyer 129 for moving the base material 1-1 in arrow direction to a position where the sixth end face 1*k* of veneer sheet in the sixth layer of the base material 1-1 is substantially in alignment with the adjacent end face of the coated veneer sheet A6' as shown in the enlarged view of FIG. 28.

Subsequently, the motors 65, 65' for the first and second veneer sheet traversing devices are activated. Though the following will describe the movement of the lifting bar 51 and the related operation of the first veneer sheet traversing device with reference to FIGS. 29(*a*) through 29(*d*), the same operation takes place simultaneously for the second veneer sheet traversing device.

Figure 29:
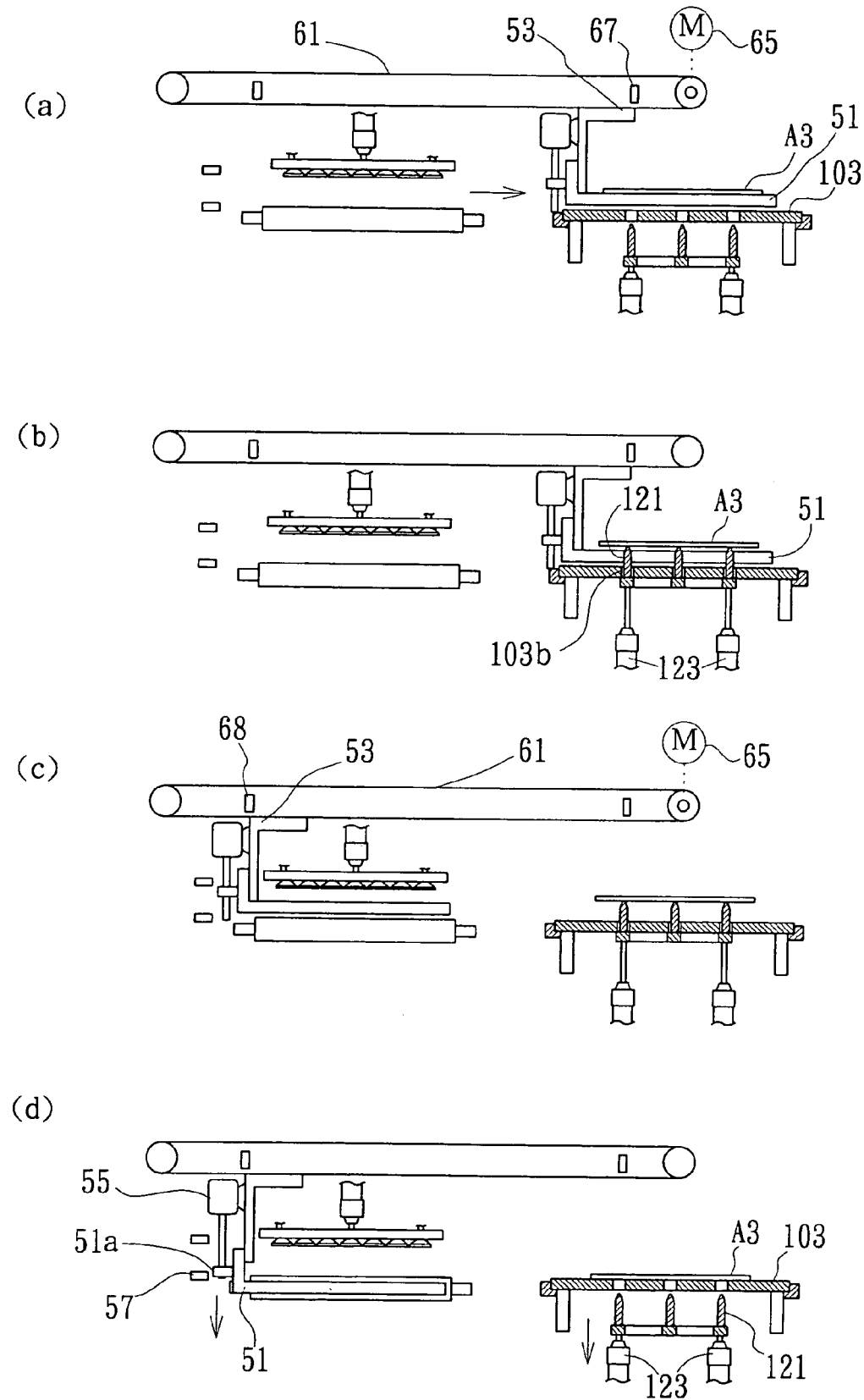
Figure 30:
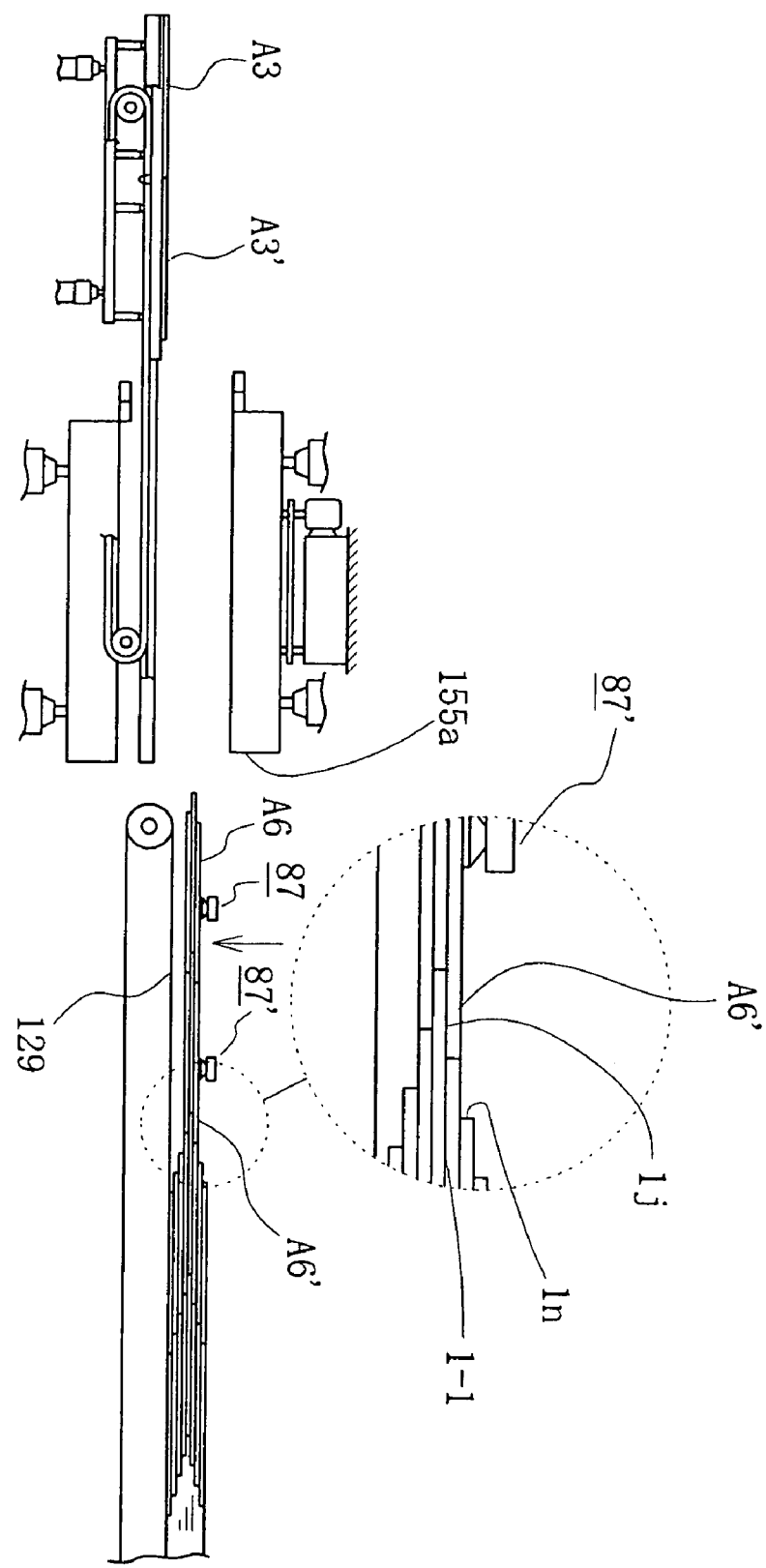
Figure 31:
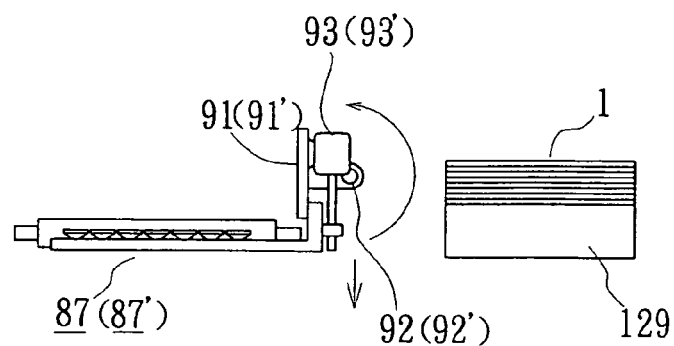
Figure 31:
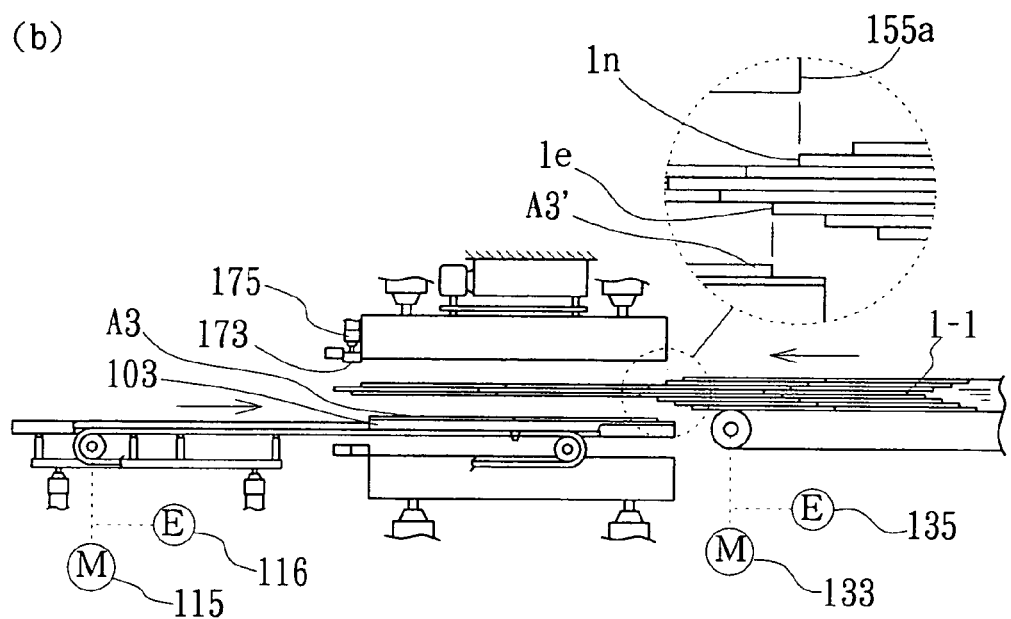
Figure 31:
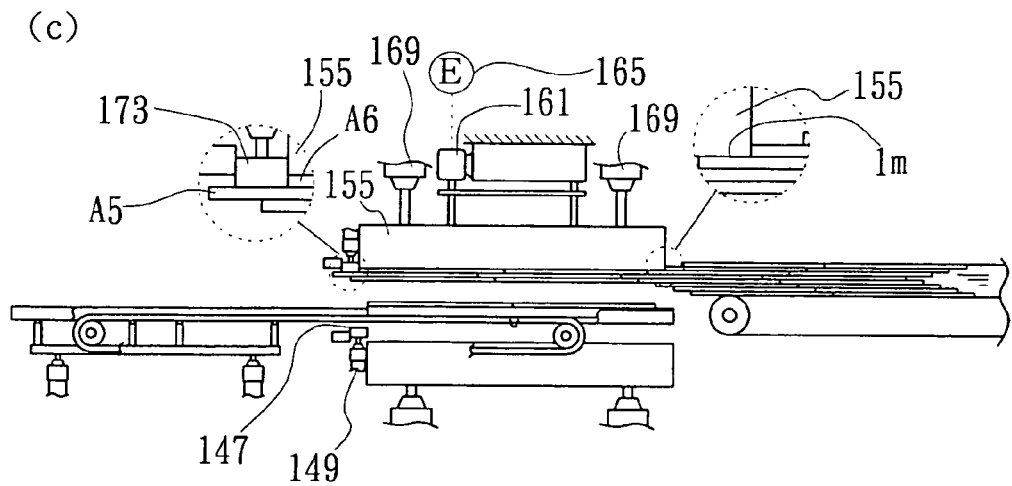
Figure 32:
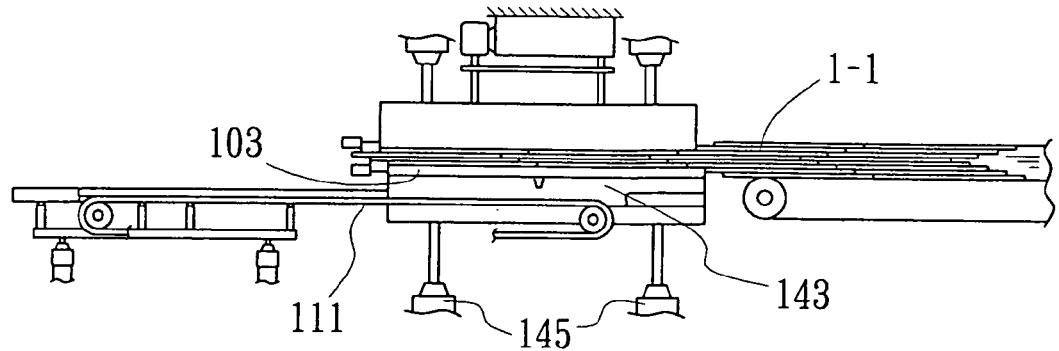
Figure 32:
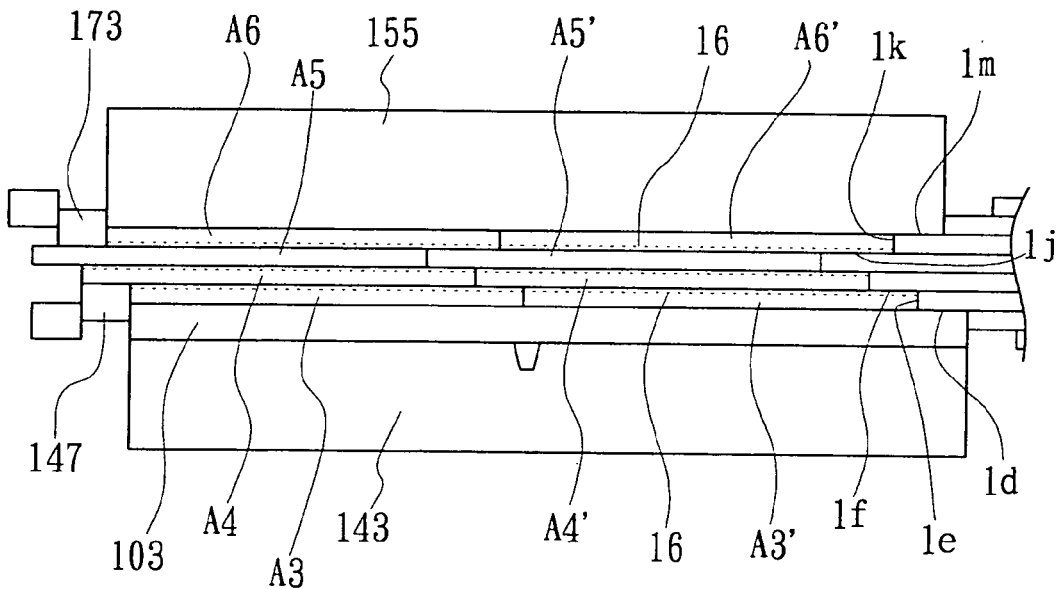
Figure 32:
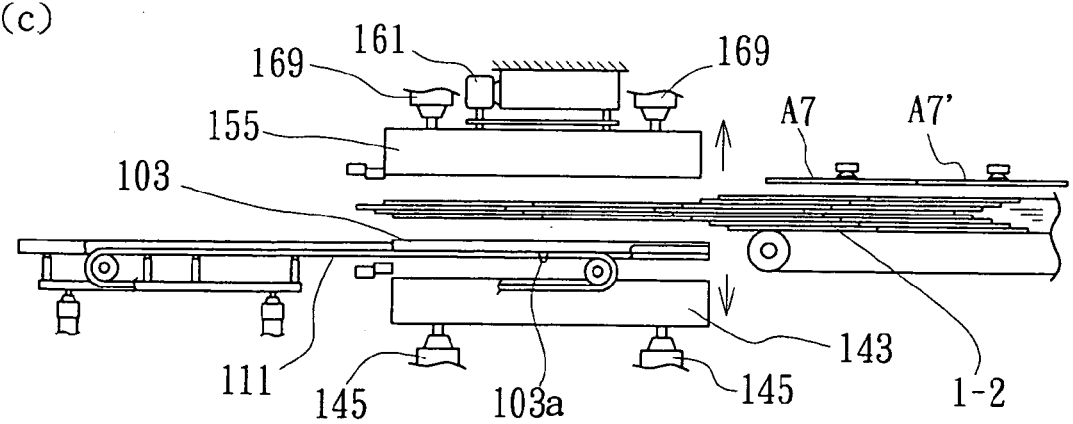

The motor 65 drives the belt 61 to move the support block 53, to which the lifting bar 51 is fixed, rightward as indicated by arrow in FIG. 29(*a*) until the block 53 is detected by the sensor 67, where the lifting bar 51 carrying thereon the veneer sheets A3 is located immediately above the veneer sheet carrier plate 103, as shown in the same drawing. The cylinders 123 are then activated to raise the upstanding rods 121 until they are inserted through the holes 103*b* in the veneer sheet carrier plate 103 so that the veneer sheet A3 is pushed upward by the rods 121 to be clear of the lifting bar 51, as shown in FIG. 29(*b*). The belt 61 is driven by the motor 65 so as to move back the support block 53 until it is detected by the sensor 68, as shown in FIG. 29(*c*). Subsequently, the cylinders 123 are operated to retract their rods 121 so that the veneer sheet A3 is placed onto the carrier plate 103, and lifting bar 51 is lowered by the motor 55 to its original position where the block 51*a* is detected by the sensor 57, as shown in FIG. 29(*d*). As mentioned above, a series of the same steps of operation is performed for the second veneer sheet traversing device so that the coated veneer sheet A3' is placed on the carrier plate 103. As shown in FIG. 30, two veneer sheets A3, A3' placed on the carrier plate 103 are disposed one next the other with the adjacent ends thereof set in facing relation to each other.

Then, the servo motors 93, 93' are activated so as to lower the suction heads 87, 87' as indicated by arrow in FIG. 30 until the coated veneer sheets A6, A6' are positioned where they are brought just into contact with the surfaces of previously laminated veneer sheets A5, A5' and the fifth face 1j of veneer sheet in fifth layer of the base material 1-1, as shown in enlarged view of FIG. 30. After the motors 93, 93' are stopped, the suction heads 87, 87' are deactivated by closing their associated shutters (not shown), so that the coated veneer sheet A6, A6' are placed on the base material 1-1.

The pivotal shafts 92, 92' are rotated for swinging the motor supports 91, 91' and hence the suction heads 87, 87' for about 180 degrees and then the servo motor 93, 93' are rotated so as to move the suction heads 87, 87' back to their original standby positions, as shown in FIG. 31(a)

The servo motor 133 is activated to drive the chain conveyer 129 for moving the base material 1-1 thereon to a position where the seventh end face in of veneer sheet in the seventh layer of the base material 1-1 is substantially in alignment with the adjacent end face 155a of the upper heating plate 155, as shown in the enlarged view of FIG. 31(b). Subsequently, the servo motor 115 for driving the belt 111 is operated to move the carrier plate 103 in arrow direction of FIG. 31(b) until a position is reached where the face of the leading end (or right-hand end as seen in the drawing) of the coated veneer sheet A3' on the carrier plate 103 is substantially in alignment with the third end face 1e of veneer sheet in the third layer of the base material 1-1, as shown in the same enlarged view of FIG. 31(b).

Then, the cylinders 175 are activated to lower the first auxiliary upper heating plate 173 for about 4 mm, as shown in FIG. 31(b).

The electromagnetic valve 171 is opened and the servo motor 161 is activated to lower the upper heating plate 155 until the lower surface of the upper heating plate 155 comes to a position away from the reference position of the base material 1-1 by a distance corresponding to two times the veneer thickness, i.e. to a position where the lower surface of the upper heating plate 155 is just brought into contact with the sixth face 1m of veneer sheet in the sixth layer of the base material 1-1, as shown in the right enlarged view of in FIG. 31(c). The electromagnetic valve 171 is closed after the upper heating plate 155 is positioned and the servo motor 161 is stopped. In the above position of the upper heating plate 155, part of the upper surface of the veneer sheet A5 is held in contact with the first auxiliary upper heating plate 173, as shown in the left enlarged view of FIG. 31(c).

Then, the cylinders 149 are activated to raise the first auxiliary lower heating plate 147 for about 4 mm, as shown in FIG. 31(c), and the hydraulic cylinders 145, 145 are activated to raise the lower heating plate 143 with the auxiliary lower heating plate 147. By so doing, the carrier plate 103 carrying thereon the veneer sheets A3, A3' are disengaged from the belt 111 and moved upward together with the heating plate 143 until the veneer sheets A3, A3', A6, A6' are pressed to the base material 1-1, as shown in FIGS. 32(a) and 32(b).

As shown in detail in FIG. 32(b), the coated veneer sheet A3' is arranged with its right end in facing relation to the third end face 1e of veneer sheet in the third layer of the base material 1-1 and extends over the third face 1f of veneer sheet in the fourth layer and part of the previously laminated veneer sheet A4' of the base material 1-1. Similarly, the veneer sheet A6' is arranged with its right end in facing relation to the sixth end face 1k of veneer sheet in the sixth layer of the base material 1-1 and extends over the fifth face 1j of veneer sheet in the fifth layer and part of the previously laminated veneer sheet A5' of the base material 1-1. Additionally, during this hot pressing, the entire surface area of the coated veneer sheets A3, A3' is pressed by the lower heating plate 143 and the same entire surface area is supported by the upper heating plate 155. On the other hand, the entire surface area of the coated veneer sheets A6, A6' received pressure form the upper heating plate 155. Major part of the same entire surface area is supported by the lower heating plate 143, while the remaining part thereof which extends beyond the left end face of the lower heating plate 143 is supported by the first auxiliary lower heating plate 147. Hot pressing as shown in FIG. 32(b) is continued for about one minute under the same pressure of about 1 MPa.

During this one-minute hot pressing, two coated veneer sheets A7, A7' are prepared in the same manner as the veneer sheets A6, A6' and placed above the base material 1-1 as shown in FIG. 32(c) and two coated veneer sheets A2, A2' are prepared in the same manner as the veneer sheets A3, A3', for example, as shown in FIG. 26(c).

As the one-minute hot pressing is over, the control unit C generates a signal which causes the lower and upper heating plates 143, 155 to move to their retracted positions, as shown in FIG. 32(c). The carrier plate 103 is lowered with the lower heating plate 143 until it engages with the belts 111. After this hot pressing, the base material 1-1 and the veneer sheets A3, A3', A6, A6' are integrated by gluing although the adhesive is yet to be cured completely. Thus, a new base material which includes the added veneer sheets A3, A3', A6, A6' is formed, which will be referred to by reference numeral 1-2.

Figure 33:
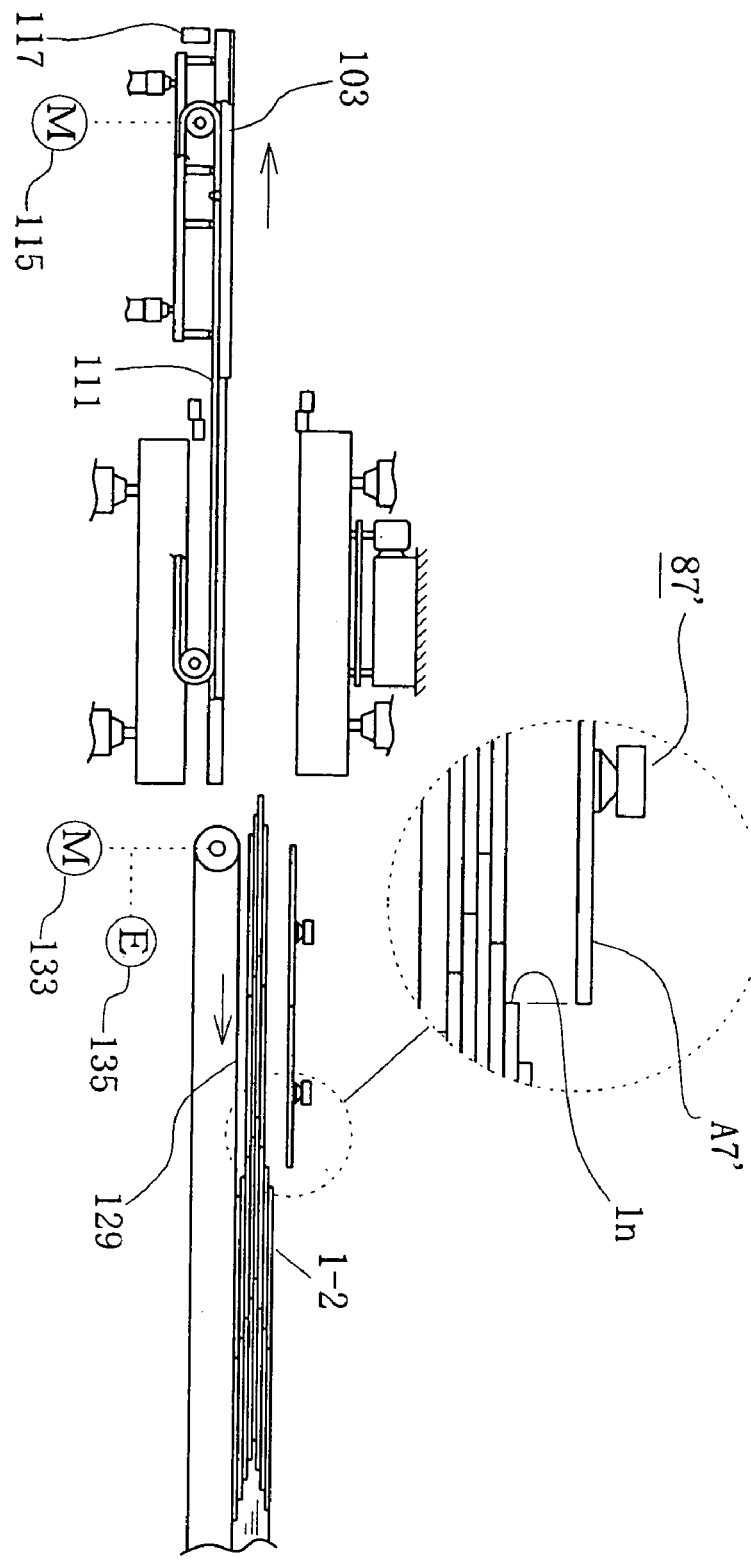

Then, the motor 115 is activated to drive the belt 111 so as to move the carrier plates 103 in arrow direction as shown in FIG. 33 until the left end of the carrier plate 103 is detected by the sensor 117. Simultaneously, the motor 133 is activated to drive the chain conveyer 129 for moving the base material 1-2 to a position where the seventh end face in of veneer sheet in the seventh layer of the base material 1-2 is substantially in alignment with the right end face of the coated veneer sheet A7', as shown in enlarged view of FIG. 33.

Figure 34:
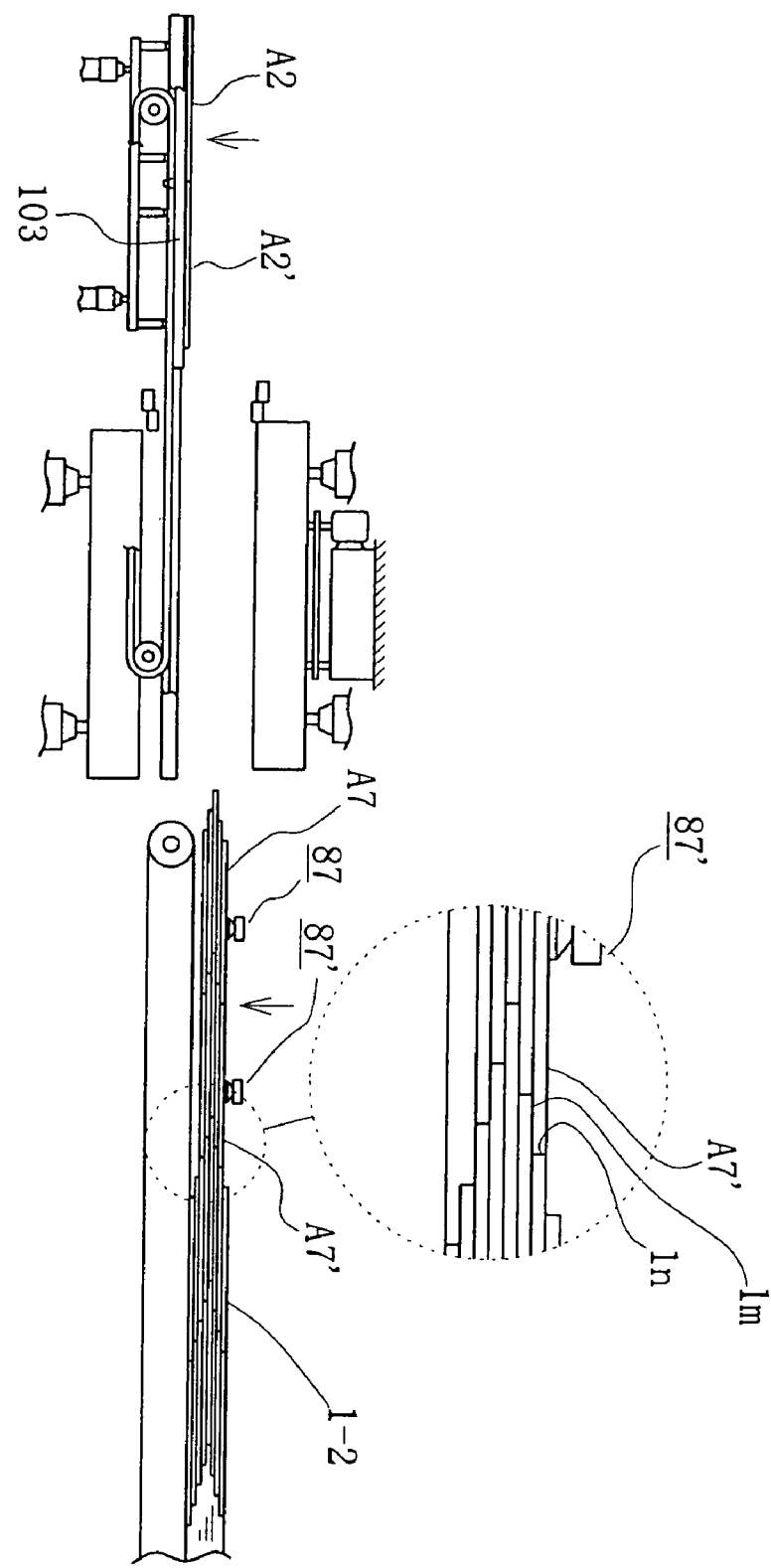
Figure 35:
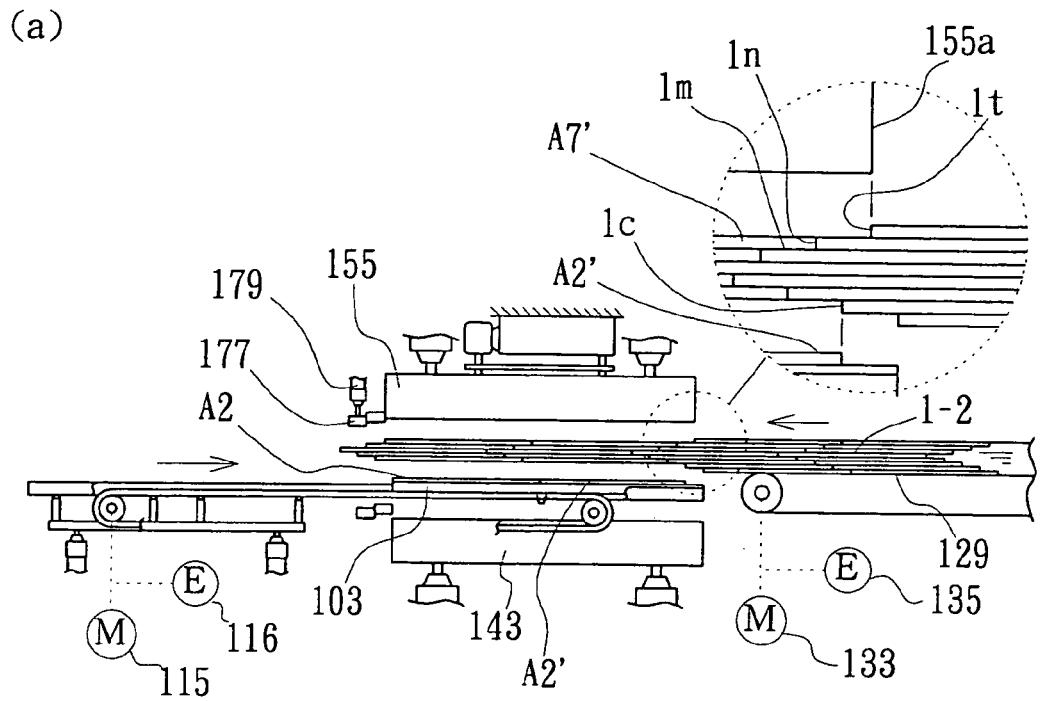
Figure 35:
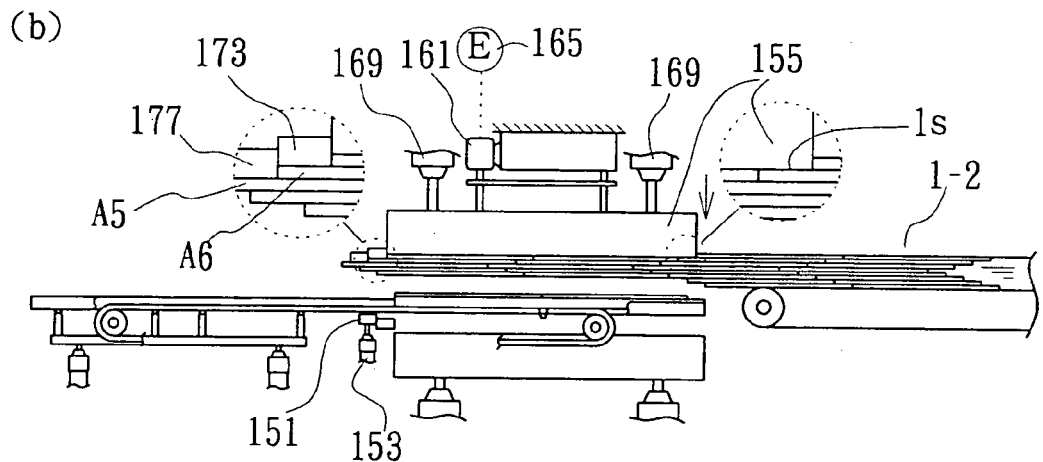
Figure 35:
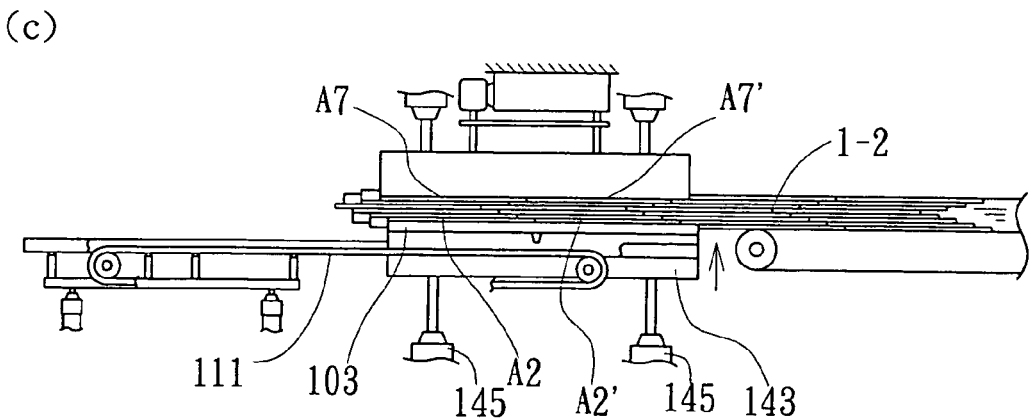
Figure 36:
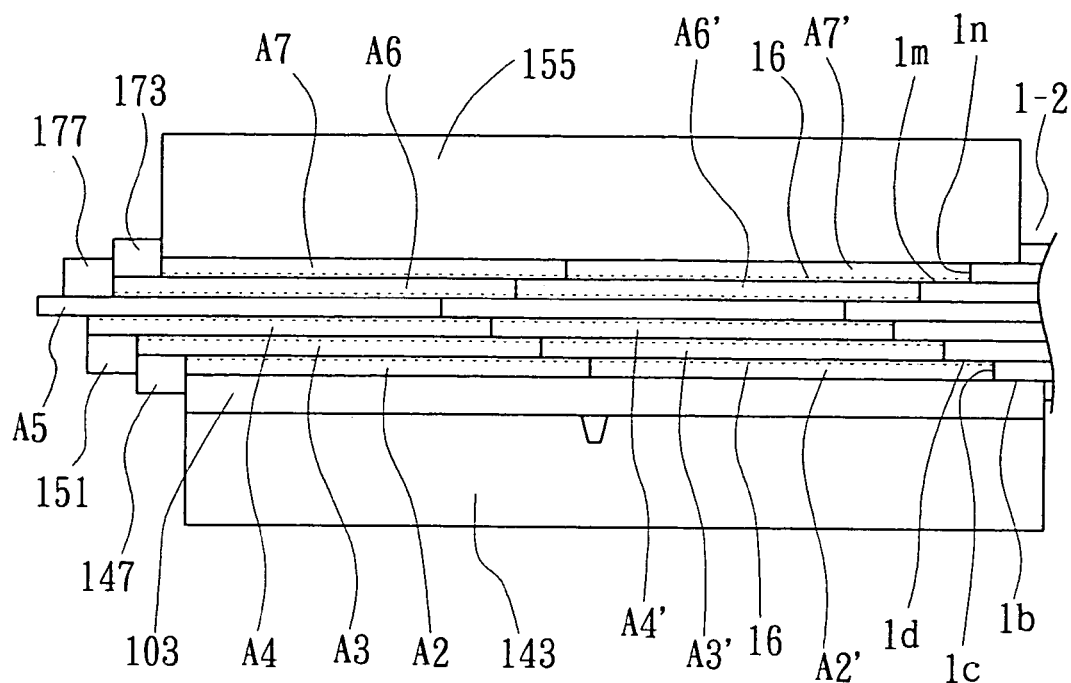
Figure 36:
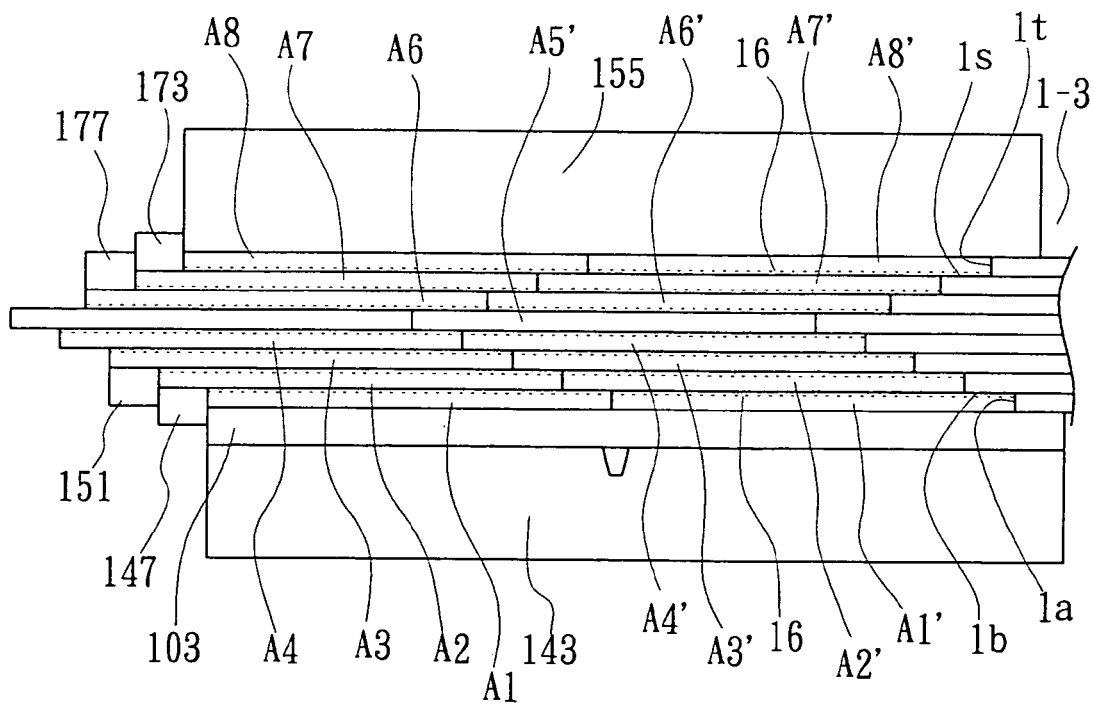
Figure 37:
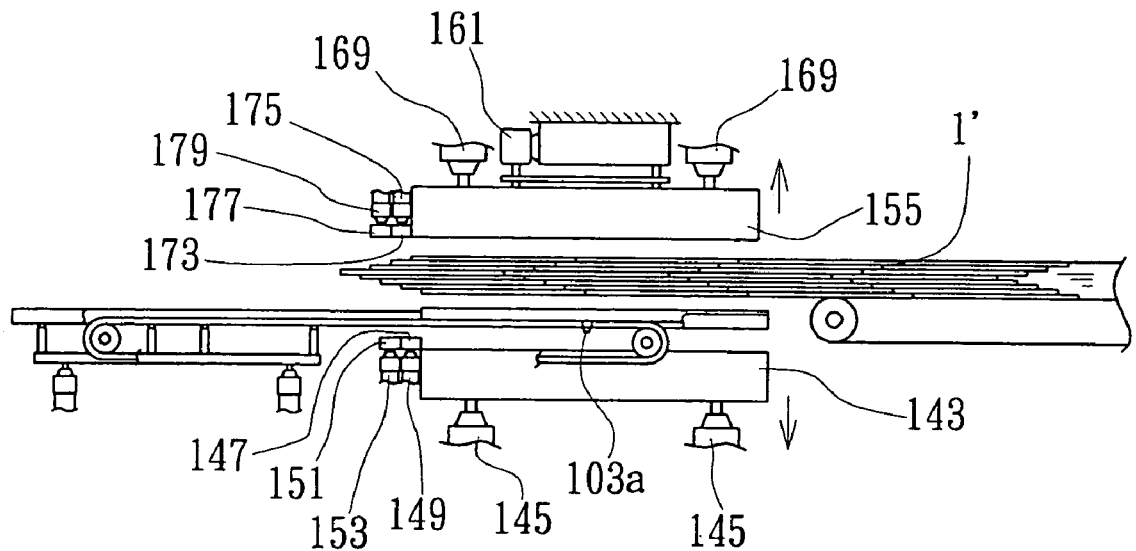
Figure 37:
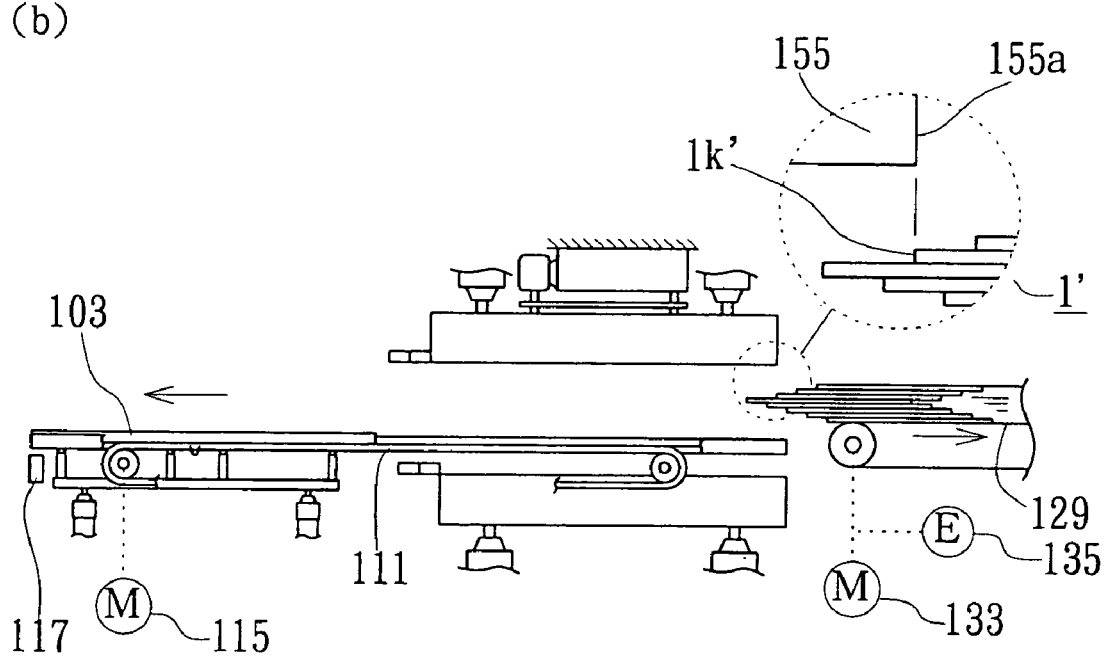

With the base material 1-2 thus positioned, the motors 93, 93' are operated to lower the suction heads 87, 87' as indicated by arrow until the coated veneer sheets A7, A7' are positioned where they are brought just into contact with the surfaces of previously laminated veneer sheets A6, A6' and the sixth face 1m of veneer sheet in sixth layer of the base material 1-2, as shown in enlarged view of FIG. 34. After the motors 93, 93' are stopped, the suction heads 87, 87' are deactivated by closing their associated shutters (not shown), so that the coated veneer sheet A7, A7' are placed on the base material 1-2, as shown in FIG. 34.

Then moving the chain conveyer 129 by the servo motor 133, the base material 1-2 is moved in arrow direction to a position where the eighth end face 1t of veneer sheet in the eighth layer is substantially in alignment with the adjacent end face 155a of the upper heating plate 155, as shown in FIG. 35(a). Subsequently, the motor 115 is driven so as to move the carrier plate 103 in arrow direction of FIG. 35(a) to a position where the leading end (or right-hand end as seen in the drawing) of the coated veneer sheet A2' on the carrier plate 103 is substantially in alignment with the second end face 1c of the base material 1-2 as shown in FIG. 35(a).

Then, the cylinders 179 are operated so as to lower the second upper auxiliary heating plate 177 for a distance of about 8 mm, as shown in FIG. 35(a).

Subsequently, the electromagnetic valve 171 is opened and then the servo motor 161 is activated so as to lower the upper heating plate 155 until the lower surface of the upper heating plate 155 comes to a position away from the reference position of the base material 1-2 by a distance corresponding to three times as large as the veneer thickness, i.e. to a position where the lower surface of the upper heating plate 155 is brought just into a contact with the seventh face is of the seventh layer of veneer sheet of the base material 1-2, as shown in FIG. 35(b).

The electromagnetic valve 171 is closed after the upper heating plate 155 is positioned and the servo motor 161 is stopped. With the upper heating plate 155 thus positioned, the first and second upper auxiliary heating plates 173 and 177 are placed in contact engagement with the upper surfaces of the coated veneer sheets A6 and A5, respectively, as shown in an enlarged view of FIG. 35(b).

The cylinders 153 are also operated so as to raise the second lower auxiliary heating plate 151 for a distance of about 8 mm, as shown in FIG. 35(b). This is followed by operation of the cylinders 145 to raise the lower heating plate 143 with the carrier plate 103 for hot pressing the veneer sheets A2, A2', A7, A7' to the base material 1-2, as shown in FIG. 35(c).

As shown in FIG. 36(a), the coated veneer sheet A2' is pressed with its right end (as seen in the drawing) in facing relation to the second end face 1c of veneer sheet in the second layer of the base material 1-2 and extends over the second face 1d of veneer sheet in the third layer of the base material 1-2 and part of the previously laminated veneer sheet A3'. Similarly, the coated veneer sheet A7' is pressed with its right end in facing relation to the seventh end face 1n of veneer sheet in the seventh layer of the base material 1-2 and extends over the sixth face 1m of veneer sheet in the sixth layer of the base material 1-2 and part of the previously laminated veneer sheet A6'. Additionally, during this hot pressing, the entire surface area of the coated veneer sheets A2, A2' is pressed by the lower heating plate 143 and the same entire surface area is supported by the upper heating plate 155. On the other hand, the entire surface area of the coated veneer sheets A7, A7' is pressed by the upper heating plate 155. Major part of the same entire surface area is supported by the lower heating plate 143, while the remaining part thereof which extends beyond the left end face of the lower heating plate 143 is supported by the first auxiliary lower heating plate 147. Furthermore, part of the contact area between the veneer sheets A3, A4 which is not covered by the lower heating pate 143 and was hot pressed only for one minute in the previous hot pressing operation receives heat and pressure from the first auxiliary lower heating plate 147 while the same area is supported by the upper heating plate 155 and the first auxiliary upper heating plate 173. The same is true to part of the contact area between the veneer sheets A7, A6 which is not covered by the upper heating plate 155. This part of contact area receives heat and pressure from the first auxiliary upper heating plate 173 and supported by the first and second auxiliary lower heating plates 147, 151. Thus, curing of adhesive in these contact areas is promoted toward complete curing. Hot pressing of FIG. 36(a) is continued for about one minute under the same pressure of about 1 MPa.

Adhesive coated on the veneer sheets A2, A2' begins to be cured by the heat transmitted from the lower heating plate 143 through the carrier plate 103. Additionally, heat from the lower heating plate 143 is also transmitted to the veneer sheets A3, A3' through the veneer sheets A2, A2' or directly by the first lower auxiliary heating plate 147, so that curing of the adhesive on the veneer sheets A3, A3' is furthered during this hot pressing operation. Similarly, adhesive coated on the veneer sheets A7, A7' begins to be cured by the heat transmitted from the upper heating plate 155, and heat transmitted from the same heating plate 155 to the veneer sheet A6, A6' through the veneer sheets A7, A7' or directly by the first upper auxiliary heating plate 173 helps to promote curing the adhesive on the veneer sheets A6, A6'.

After the pressing, the base material 1-2 and the veneer sheets A2, A2', A7, A7' are integrated by gluing although the adhesive is yet to be cured completely. A new base material which includes the added veneer sheets A2, A2', A7, A7' is formed, which will be referred to by reference numeral 1-3.

Though detailed description is omitted, during the above one minute of hot pressing operation, two sets of coated veneer sheets A8, A8' and A1, A1' are prepared in the same manner as the veneer sheets A6, A6' and the veneer sheets A3, A3', respectively.

After one minute of the above hot pressing is over, a series of operation steps is performed for laying and hot pressing two sets of veneer sheets A1, A1' and A8, A8'. Since the manners in which such operations are performed are substantially the same as in the case of veneer sheets A2, A2' and A7, A7', detailed description therefor will be omitted. It is noted, however, that this hot pressing is continued for about three minutes under the same pressure of about 1 Mpa.

During this hot pressing as shown in FIG. 36(b), the coated veneer sheet A1' is pressed with its right end (as seen in the drawing) in facing relation to the first end face 1a of veneer sheet in the first layer of the base material 1-3 and extends over the first face 1b of veneer sheet in the second layer of the base material 1-3 and part of the previously laminated veneer sheet A2'. Similarly, the coated veneer sheet A8' has its right end disposed in facing relation to the eighth end face 1t of veneer sheet in the eighth layer of the base material 1-3 and extends over the seventh face 1s of veneer sheet in the seventh layer of the base material 1-3 and part of the previously laminated veneer sheet A7'. Additionally, during this hot pressing, the entire surface area of the coated veneer sheets A1, A1' is pressed by the lower heating plate 143 and the same entire surface area is supported by the upper heating plate 155. On the other hand, the entire surface area of the coated veneer sheets A8, A8' is pressed by the upper heating plate 155. Major part of the same entire surface area is supported by the lower heating plate 143, while the remaining part thereof which extends beyond the left end face of the lower heating plate 143 is supported by the first auxiliary lower heating plate 147. As will be understood readily from comparison with the illustration of FIG. 36(a), the auxiliary heating plates work effectively also in this case by providing heat and pressure to those parts of contact areas between the veneer sheets A2, A3 and A6, A7 which are not covered by the lower and upper hating plates 143, 155, respectively, and heated only for one minute during the previous hot pressing operation. Furthermore, parts of the contact areas between the veneer sheets A3, A4 and A6, A7 receive direct heat from the second auxiliary heating plates 151, 177. Hot pressing of FIG. 36(b) is continued for about three minutes under the same pressure of about 1 MPa.

After three minutes of the above hot pressing operation is over, the base material 1-3 and the veneer sheets A1, A1', A8, A8' are integrated by gluing although the adhesive is yet to be cured completely. Thus, a new base material 1' is made, as shown in FIG. 37(a), whose end portion is shaped in substantially the same form of flights of steps as the initial base material 1 shown in FIG. 11.

The control unit C then generates signals to cause the upper and lower heating plates 155, 143, the first and second upper auxiliary heating plates 173, 177 and the first and second lower auxiliary heating plates 147, 151 to retract to their original standby positions, respectively, as shown in FIG. 37(a). Subsequently, the motor 115 is operated to drive the belts 111 so as to move the carrier plate 103 in arrow direction of FIG. 37(b) back to its original standby position. Simultaneously, the motor 133 is operated thereby to move the chain conveyer 129 in arrow direction until the base material 1' carried the chain conveyer 129 comes to position where the end face $1k'$ of veneer sheet A6 in the sixth layer of the base material 1' is substantially in alignment with the end face 155a of the upper heating plate 155, as shown in the enlarged view of FIG. 37(b).

Thereafter, a series of steps of operation as described with reference to FIGS. 12 through 37 is repeated as many times as required to produce the desired length of eight-layered LVL board.

In the above description of the preferred embodiment, a laminated veneer assembly having eight layers of veneer sheets each having a thickness of about 4 mm, shown in FIG. 11, is used as the initial base material 1 from one end of which a continuous length of LVL board is to be made. If the veneer sheet thickness or the number of layers is changed, the aforementioned reference position with respect to which the suction heads 87, 87' and the upper heating plate 155 are positioned will be changed. In such a case, the reference position may be established in the same manner as in the above-described preferred embodiment. That is, the reference position may be set at the mid-position of a new initial base material carried on the chain conveyer 129 as measured across base material thickness. Setting of a new reference position becomes necessary also in case when the number of layers is changed. In such case, the length of time for hot pressing may be set longer for the first and last hot pressing steps (or FIG. 20(c) and FIG. 36(b) in the preferred embodiment) than others similar steps in each complete cycle of operation which covers the steps described with reference to FIGS. 12 through 37 in the preferred illustrated embodiment.

While the invention has been described and illustrated with reference to the specific embodiment, it is to be understood that the invention can be practiced in other various changes and modifications without departing from the spirit or scope of the invention, as exemplified below.

In the preferred embodiment, two veneer sheets are prepared as one set for lamination which are disposed one next the other with the adjacent ends thereof set in facing relation to each other, as shown, e.g., in FIG. 2. However, the number of veneer sheets of one set to be prepared may be more than two. Alternatively, a single veneer sheet may be provided as a set of veneer sheet.

Figure 38:
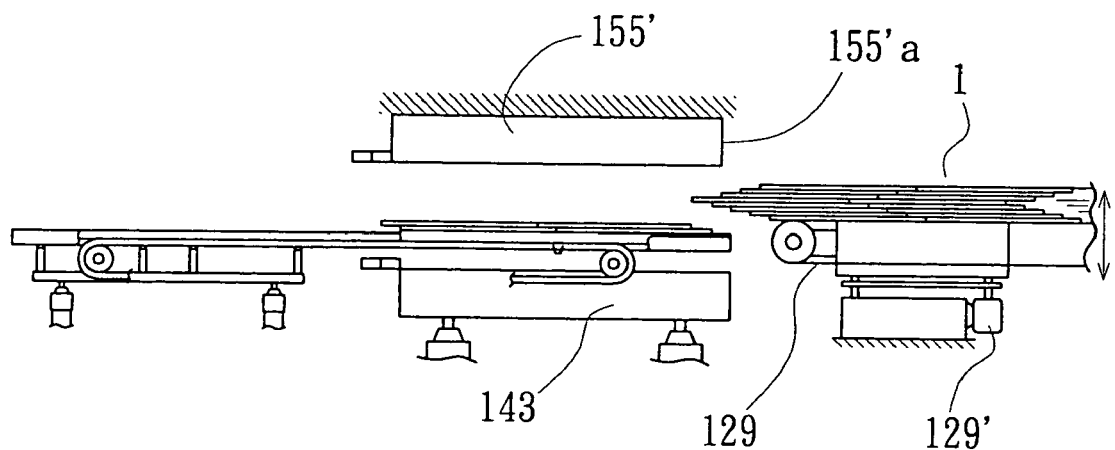
FIGS. 38(*a*) and 38(*b*) are illustrative views showing steps of operation in a modified embodiment of method of manufacturing LVL.
Figure 38:
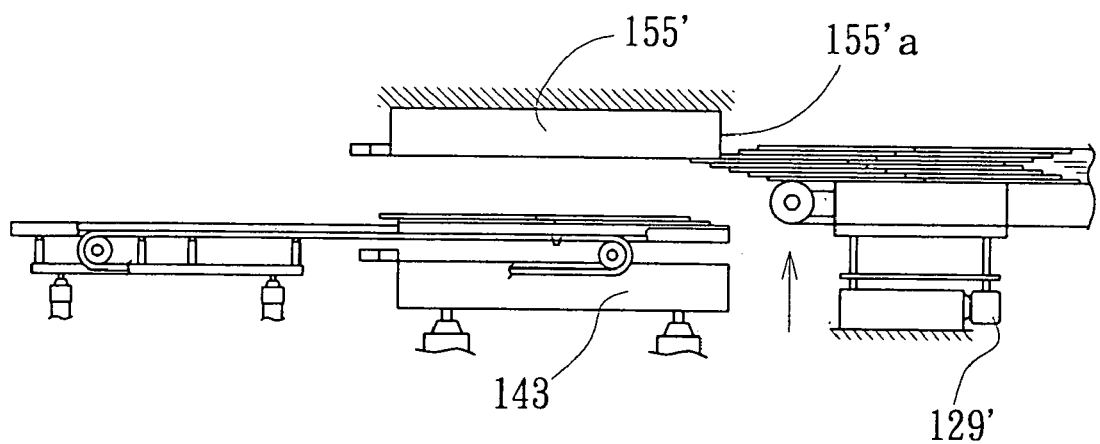

Modified embodiment shown in FIGS. 38(a) and 38(b) differs from the preferred embodiment in that the upper heating plate 155' is stationary and the chain conveyer 129 is movable vertically as indicated by double-headed arrow in FIG. 38(a) so that the base material carried thereon is movable vertically, as well as horizontally. For this purpose, a servo motor 129' and threaded shafts one of which is connected to and rotated by the motor 129' are provided for controllably moving the chain conveyer 129 vertically. The chain conveyer 129 is normally placed in its lowered position as shown in FIG. 38(a) and controllably movable in horizontal direction in the same manner as in the preferred embodiment for positioning of the base material relative to, e.g., the right end face 155'a of the upper heating plate 155'. In hot pressing operation, the chain conveyer 129 having thereon the base material is moved upward by the motor 129' for a distance corresponding to the distance for which the upper heating plate 155 is lowered in the preferred embodiment. By so doing, the laminated veneer assembly is positioned as shown in FIG. 38(b). Then, the lower heating plate 143 is raised for application of pressure of about 1 Mpa.

Figure 39:
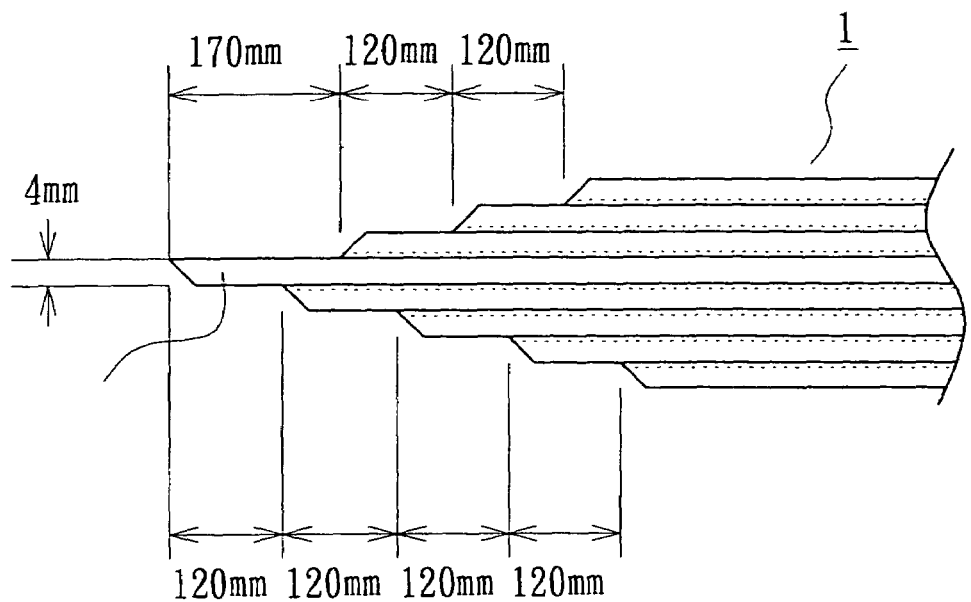
FIGS. 39(*a*) and 39(*b*) are schematic illustrative views showing a modified initial base material and a process of pressing veneer sheets for manufacturing LVL from the modified base material, respectively.
Figure 39:
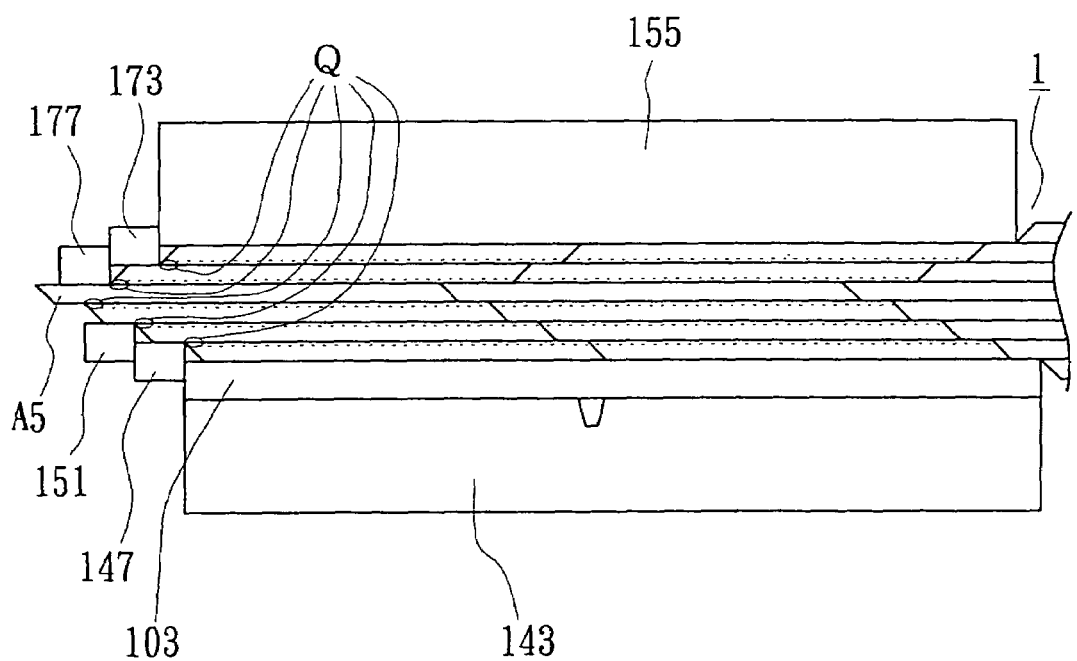

FIG. 39(a) shows an alternative form of initial laminated veneer assembly 1 wherein veneer sheets in the first to fifth layers have one ends thereof scarf-cut or beveled at a predetermined angle with the beveled surfaces facing downward, while veneer sheets in the sixth to eighth layers have one ends thereof beveled at the same angle in opposite direction so that the beveled surfaces thereof face upward. As shown in FIG. 39(b), veneer sheets for lamination to such base material have the opposite ends thereof beveled at the same angle in the same direction so that the opposite beveled surfaces of each veneer sheet extend in parallel to each other. The veneer sheets are laminated in such a way that a lap joint is formed between any two adjacent veneer sheets in the same layer, as clearly shown in FIG. 39(b). Though the portions of veneer sheet ends which are depicted by Q receive only reduced pressure during hot pressing, they will not influence the general strength of the resulting LVL board because the area of such portions is small.

In the preferred embodiment and the modified embodiment of FIG. 39(a), one end of the eight-layered initial is shaped in the form of two flights of steps, one flight of steps formed by the fifth through eighth veneer sheets and facing upward and the other flight of steps formed by the first through fifth veneer sheet and facing downward. The present invention does not limit the initial base material to such a form, but an initial base material may be provided, for example, by using veneer sheets only in the first to fifth layers of the base material of FIG. 11 so that end of the resulting base material has a form of a single flight of steps facing downward. In case of using such initial base material, veneer sheets A4, A4', A5, A5' are laminated substantially in the same manner as in the step of FIG. 20(c). In the step corresponding to that of FIG. 32(b), only veneer sheets A3, A3' are laminated. In the steps corresponding to those of FIGS. 36(a) and 36(b), only veneer sheets A2, A2' and A1, A1' are glued to the base material, respectively.

Though in the preferred embodiment two auxiliary heating plates are provided adjacent to one end of each of the upper and lower heating plates. The present invention does not limit the number of auxiliary heating plates for use, but only one auxiliary heating plate or alternatively more than two similar heating plates may be used.

Furthermore, the arrangement of the upper and lower heating plates may be reversed. That is, a heating plate having cylinders such as 169 and moved by a servo motor such as 161 and having a rotary encoder such as 165 is used as the lower heating plate, while a heating plate moved by cylinders such as 145 may be used as the upper heating plate.

What is claimed is:

1. A method of manufacturing glued laminated wood which is made of a number of wood sheets having a predetermined length, width and thickness and laminated together by hot pressing with a thermosetting adhesive in such a way that a continuous length of multiple-layered board of said glued laminated wood is made in which wood sheets in each layer of the board are arranged in a staggered relation in the lengthwise direction of the board to wood sheets in the adjacent layer, said method comprising the steps of:

(a) providing a number of said wood sheets;

(b) providing an initial base material having a predetermined thickness and an end portion from which said continuous length of the glued laminated wood board is to be formed extending therefrom, said end portion of the initial base material being shaped in the form of a flight of steps having a series of alternate first surfaces extending in the lengthwise direction of said initial base material and second surfaces extending at an angle with respect to said first surfaces, the spaced interval between any two adjacent first surfaces across the thickness of said initial base material being substantially the same as the thickness of each wood sheet, one of said second surfaces which is located at the extremity of said end portion of the initial base material being the outermost second surface thereof;

(c) providing a hot press including a pair of heating plates disposed substantially in facing relation to each other and movable relatively toward and away from the other, each of said heating plates having a pressing area large enough to cover the entire surface area of at least one wood sheet, said hot press further including at least one pair of auxiliary heating plates each disposed at one end of each of said heating plates, movable relatively toward and away from the other and having a length corresponding to the lengthwise dimension of said first surface of the initial base material;

(d) pressing with the heating plates for a predetermined length of time at least two sets of first and second wood sheets, each set including at least one wood sheet, for lamination to the initial base material in such an arrangement that one end of the first wood sheet of said at least two sets is in facing relation to said outermost second surface of the initial base material and one end of the second wood sheet is in facing relation to the second surface of the initial base material which is located most adjacent to said outermost second surface, respectively, and also that the entire surface area of said second wood sheet receives pressure from one heating plate and at least said entire surface area is supported by the other heating plate;

(e) pressing with the heating plates for a predetermined length of time another at least two sets of third and fourth wood sheets, each set including at least one wood sheet, for lamination to the initial base material and also to the previously laminated first and second wood sheets in such an arrangement that one end of the third wood sheet of said another at least two sets is in facing relation to the second surface of the initial base material which is located second most adjacent to said outermost second surface and one end of the fourth wood sheet is in facing relation to the second surface of the initial base material which is located third most adjacent to said outermost second surface, respectively, and also that the entire surface area of said fourth wood sheet receives pressure from said one heating plate and at least said entire surface area is supported by said other heating plate, and simultaneously pressing with at least one of said at least two auxiliary heating plates part of said second wood sheet which extends beyond the other end of the fourth wood sheet;

(f) pressing with the heating plates for a predetermined length of time still another at least two sets of fifth and sixth wood sheets, each set including at least one wood sheet, for lamination to the initial base material and also to the previously laminated third and fourth wood sheets in such an arrangement that one end of the fifth wood sheet of said still another at least two sets is in facing relation to the second surface of the initial base material which is located fourth most adjacent to said outermost second surface and one end of the sixth wood sheet is in facing relation to the second surface of the initial base material which is located fifth most adjacent to said outermost second surface, respectively, and also that the entire surface area of said sixth wood sheet receives pressure from said one heating plate and said entire surface area is supported by said other heating plate, and simultaneously pressing with said at least two auxiliary heating plates parts of said third and fourth wood sheets which extend beyond the other ends of the fifth and sixth wood sheets, respectively;

(g) repeating pressing of still another at least two sets of wood sheets and parts of previously laminated wood sheets substantially in the same manner as described in the step (f) until the total thickness of the laminated wood sheets reaches the thickness of said initial base material, whereby an in-process glued laminated wood board is formed having a new end portion which is shaped in the form of flight of steps similar to that of the end portion of the initial base material; and (h) repeating the steps (d) through (g) for the respective new end portions of successively made in-process glued laminated wood board as many time as required until the desired length of the glued laminated wood board is made.

2. A method of manufacturing glued laminated wood which is made of a number of wood sheets having a predetermined length, width and thickness and laminated together by hot pressing with a thermosetting adhesive in such a way that a continuous length of multiple-layered board of said glued laminated wood is made in which wood sheets in each layer of the board are arranged in a staggered relation in the lengthwise direction of the board to wood sheets in the adjacent layer, said method comprising the steps of:

(a) providing a number of said wood sheets;

(b) providing an initial base material having a predetermined thickness and an end portion from which said continuous length of the glued laminated wood board is to be formed extending therefrom, said end portion of the initial base material being shaped in the form of a flight of steps having a series of alternate first surfaces extending in the lengthwise direction of said initial base material and second surfaces extending at an angle with respect to said first surfaces, the spaced interval between any two adjacent first surfaces across the thickness of said initial base material being substantially the same as the thickness of each wood sheet, one of said second surfaces which is located at the extremity of said end portion of the initial base material being the outermost second surface thereof;

(c) providing a hot press including a pair of plates which are disposed substantially in facing relation to each other and movable relatively toward and away from the other, and at least one of which is heated, each of said plates having a pressing area large enough to cover the entire surface area of at least one wood sheet, said hot press further including at least one auxiliary heating plate disposed at one end of said at least one heated plate, movable relatively toward and away from at least one other auxiliary plate and having a length corresponding to the lengthwise dimension of said first surface of the initial base material;

(d) pressing with the plates for a predetermined length of time at least two sets of first and second wood sheets, each set including at least one wood sheet, for lamination to the initial base material in such an arrangement that one end of the first wood sheet of said at least two sets is in facing relation to said outermost second surface of the initial base material and one end of the second wood sheet is in facing relation to the second surface of the initial base material which is located most adjacent to said outermost second surface, respectively, and also that the entire surface area of said second wood sheet receives pressure from said at least one heated plate and at least said entire surface area is supported by the other plate;

(e) pressing with the plates for a predetermined length of time another set of third wood sheets including at least one wood sheet, for lamination to the initial base material and also to the previously laminated first and second wood sheets in such an arrangement that one end of the third wood sheet is in facing relation to the second surface of the initial base material which is located second most adjacent to said outermost second surface and also that the entire surface area of said third wood sheet receives pressure from said at least one heated plate and at least said entire surface area is supported by the other plate;

(f) pressing with the plates for a predetermined length of time still another set of fourth wood sheets including at least one wood sheet for lamination to the initial base material and also to the previously laminated third sheet in such an arrangement that one end of the fourth wood sheet is in facing relation to the second surface of the initial base material which is located third most adjacent to said outermost second surface and also that the entire surface area of said fourth wood sheet receives pressure from said at least one heated plate and said entire surface area is supported by the other plate, and simultaneously pressing with said at least one auxiliary heating plate part of said third wood sheet which extends beyond the other end of the fourth wood sheet;

(g) repeating pressing of still another at least one set of wood sheets and part of previously laminated wood sheets substantially in the same manner as described in the step (f) until the total thickness of the laminated wood sheets reaches the thickness of said initial base material, whereby an in-process glued laminated wood board is formed having a new end portion which is shaped in the form of a flight of steps similar to that of the end portion of the initial base material; and (h) repeating the steps (d) through (g) for the respective new end portions of successively made in-process glued laminated wood board as many time as required until the desired length of the glued laminated wood board is made.

3. A method according claim 1 or 2, wherein said angle at which the second surface of the initial base material extends with respect to the first surface is a right angle and each wood sheet has its opposite ends cut at a right angle with the opposite surfaces thereof.

4. A method according claim 1 or 2, wherein said second surfaces of the initial base material are beveled at said angle with respect to said first surfaces, each of said wood sheets has opposite ends thereof beveled in the same direction at said angle so that the beveled end surfaces extend in parallel to each other, and any two adjacent wood sheets in each layer are disposed with the beveled ends thereof set in facing relation in an overlapped manner.

5. A method according claim 1 or 2, wherein said each set of wood sheets includes two wood sheets which are disposed one next to the other in a plane with the adjacent ends thereof set in facing relation to each other.

6. A method according claim 1 or 2, wherein said wood sheets include a veneer sheet.

7. A method according claim 6, wherein in the steps of said pressing the veneer sheets are laminated together with the wood grain thereof extending primarily along the length of the glued laminated wood board whereby laminated veneer lumber (LVL) as said glued laminated wood is manufactured.

* * * * *